(12) United States Patent
Hong et al.

(10) Patent No.: US 11,385,722 B2
(45) Date of Patent: Jul. 12, 2022

(54) ROBUST RADAR-BASED GESTURE-RECOGNITION BY USER EQUIPMENT

(71) Applicant: Google LLC, Mountain View, CA (US)

(72) Inventors: Jung Ook Hong, Sunnyvale, CA (US); Patrick M. Amihood, Palo Alto, CA (US); John David Jacobs, San Diego, CA (US); Abel Seleshi Mengistu, Mountain View, CA (US); Leonardo Giusti, San Francisco, CA (US); Vignesh Sachidanandam, Redwood City, CA (US); Devon James O'Reilley Stern, Oakland, CA (US); Ivan Poupyrev, Los Altos, CA (US); Brandon Barbello, Mountain View, CA (US); Tyler Reed Kugler, Palo Alto, CA (US); Johan Prag, Mountain View, CA (US); Artur Tsurkan, San Francisco, CA (US); Alok Chandel, Mountain View, CA (US); Lucas Dupin Moreira Costa, Mountain View, CA (US); Selim Flavio Cinek, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 16/886,626

(22) Filed: May 28, 2020

(65) Prior Publication Data

US 2021/0026454 A1    Jan. 28, 2021

Related U.S. Application Data

(63) Continuation-in-part of application No. PCT/US2019/055731, filed on Oct. 10, 2019, and a
(Continued)

(51) Int. Cl.
*G06F 3/01* (2006.01)
*G06V 40/20* (2022.01)

(52) U.S. Cl.
CPC .............. *G06F 3/017* (2013.01); *G06V 40/28* (2022.01)

(58) Field of Classification Search
CPC combination set(s) only.
See application file for complete search history.

(56) References Cited

U.S. PATENT DOCUMENTS 5,670,987 A   9/1997 Koi et al.
6,215,890 B1  4/2001 Matsuo et al.
(Continued)

FOREIGN PATENT DOCUMENTS

CN    103502911    1/2014
CN    106062777    10/2016
(Continued)

OTHER PUBLICATIONS

"Foreign Office Action", KR Application No. 10-2019-0157391, dated Jan. 29, 2021, 8 pages.
(Continued)

*Primary Examiner* — Hien L Duong
(74) *Attorney, Agent, or Firm* — Colby Nipper PLLC

(57) ABSTRACT

Systems and techniques are described for robust radar-based gesture-recognition. A radar system (104) detects radar-based gestures on behalf of application subscribers. A state machine (2000) transitions between multiple states based on inertial sensor data. A no-gating state (2002) enables the radar system (104) to output radar-based gestures to application subscribers. The state machine (2000) also includes a soft-gating state (2004) that prevents the radar system (104) from outputting the radar-based gestures to the application subscribers. A hard-gating state (2006) prevents the radar
(Continued)

system (104) from detecting radar-based gestures altogether. The techniques and systems enable the radar system (104) to determine when not to perform gesture-recognition, enabling user equipment (102) to automatically reconfigure the radar system (104) to meet user demand. By so doing, the techniques conserve power, improve accuracy, or reduce latency relative to many common techniques and systems for radar-based gesture-recognition.

22 Claims, 24 Drawing Sheets

Related U.S. Application Data continuation-in-part of application No. PCT/US2019/053676, filed on Sep. 27, 2019, and a continuation-in-part of application No. PCT/US2019/049208, filed on Aug. 30, 2019, and a continuation-in-part of application No. PCT/US2019/049216, filed on Aug. 30, 2019, and a continuation-in-part of application No. PCT/US2019/049212, filed on Aug. 30, 2019.

(60) Provisional application No. 62/894,566, filed on Aug. 30, 2019, provisional application No. 62/879,361, filed on Jul. 26, 2019.

(56) References Cited

U.S. PATENT DOCUMENTS

| | | | |
|---|---|---|---|
| 6,727,892 | B1 | 4/2004 | Murphy |
| 6,990,335 | B1 | 1/2006 | Shamoon et al. |
| 8,237,666 | B2 | 8/2012 | Soo et al. |
| 8,373,666 | B2 | 2/2013 | Jung et al. |
| 8,508,347 | B2 | 8/2013 | Pihlaja |
| 8,659,548 | B2 | 2/2014 | Hildreth |
| 9,134,798 | B2 | 9/2015 | Morris et al. |
| 9,207,852 | B1 | 12/2015 | Zhou et al. |
| 9,448,634 | B1 | 9/2016 | Wakeford et al. |
| 9,575,560 | B2 | 2/2017 | Poupyrev et al. |
| 9,629,201 | B2 | 4/2017 | Chen et al. |
| 9,921,660 | B2 | 3/2018 | Poupyrev |
| 10,061,509 | B2 | 8/2018 | Mese et al. |
| 10,088,908 | B1 | 10/2018 | Poupyrev et al. |
| 10,101,874 | B2 | 10/2018 | Kwon et al. |
| 10,139,916 | B2 | 11/2018 | Poupyrev |
| 10,284,541 | B1 | 5/2019 | Subramanian et al. |
| 10,300,370 | B1 | 5/2019 | Amihood et al. |
| 10,356,617 | B2 | 7/2019 | Abernathy et al. |
| 10,394,333 | B2 | 8/2019 | Cheng et al. |
| 11,169,615 | B2 | 11/2021 | Stern et al. |
| 11,281,303 | B2 | 3/2022 | Stern et al. |
| 11,288,895 | B2 | 3/2022 | Chandel et al. |
| 2002/0158838 | A1 | 10/2002 | Smith et al. |
| 2003/0095154 | A1 | 5/2003 | Colmenarez |
| 2003/0122651 | A1 | 7/2003 | Doi et al. |
| 2006/0256082 | A1 | 11/2006 | Cho et al. |
| 2008/0178126 | A1 | 7/2008 | Beeck et al. |
| 2008/0300055 | A1 | 12/2008 | Lutnick et al. |
| 2009/0191968 | A1 | 7/2009 | Johnson et al. |
| 2009/0296930 | A1 | 12/2009 | Krantz et al. |
| 2010/0008031 | A1 | 1/2010 | Reifman |
| 2010/0192102 | A1 | 7/2010 | Chmielewski et al. |
| 2010/0205667 | A1 | 8/2010 | Anderson et al. |
| 2010/0215254 | A1 | 8/2010 | Prokhorov |
| 2010/0306716 | A1 | 12/2010 | Perez |
| 2011/0090761 | A1 | 4/2011 | Nishino et al. |
| 2011/0181509 | A1 | 7/2011 | Rautiainen et al. |
| 2011/0181510 | A1 | 7/2011 | Hakala et al. |
| 2011/0181526 | A1* | 7/2011 | Shaffer .................. G06F 9/451 345/173 |
| 2011/0185318 | A1 | 7/2011 | Hinckley et al. |
| 2011/0304541 | A1 | 12/2011 | Dalal |
| 2011/0310005 | A1 | 12/2011 | Chen et al. |
| 2012/0032834 | A1 | 2/2012 | Weeks et al. |
| 2012/0092284 | A1 | 4/2012 | Rofougaran et al. |
| 2012/0110516 | A1 | 5/2012 | Tumanov |
| 2012/0131229 | A1 | 5/2012 | McCarthy et al. |
| 2012/0185910 | A1 | 7/2012 | Miettinen et al. |
| 2012/0194551 | A1 | 8/2012 | Osterhout et al. |
| 2012/0214594 | A1 | 8/2012 | Kirovski et al. |
| 2012/0229377 | A1 | 9/2012 | Kim et al. |
| 2012/0235790 | A1 | 9/2012 | Zhao et al. |
| 2012/0280900 | A1 | 11/2012 | Wang et al. |
| 2013/0038564 | A1 | 2/2013 | Ho |
| 2013/0106898 | A1 | 5/2013 | Saint-Loubert-Bie et al. |
| 2013/0191791 | A1 | 7/2013 | Rydenhag et al. |
| 2013/0316687 | A1 | 11/2013 | Subbaramoo et al. |
| 2014/0028539 | A1 | 1/2014 | Newham et al. |
| 2014/0118257 | A1 | 5/2014 | Baldwin |
| 2014/0124647 | A1 | 5/2014 | Hsu |
| 2014/0139422 | A1* | 5/2014 | Mistry .................. G06F 1/163 345/156 |
| 2014/0332441 | A1 | 11/2014 | Jayetileke et al. |
| 2014/0333431 | A1 | 11/2014 | Abdelsamie et al. |
| 2014/0358368 | A1 | 12/2014 | Entenmann et al. |
| 2015/0007049 | A1 | 1/2015 | Langlois |
| 2015/0084852 | A1 | 3/2015 | Shon et al. |
| 2015/0088283 | A1 | 3/2015 | Fiedler et al. |
| 2015/0121108 | A1 | 4/2015 | Agrawal et al. |
| 2015/0169071 | A1 | 6/2015 | Jitkoff |
| 2015/0193116 | A1 | 7/2015 | Fadell et al. |
| 2015/0205821 | A1 | 7/2015 | Kogan |
| 2015/0212641 | A1 | 7/2015 | Tanneberger et al. |
| 2015/0277569 | A1 | 10/2015 | Sprenger et al. |
| 2015/0324004 | A1 | 11/2015 | Lee et al. |
| 2015/0346820 | A1 | 12/2015 | Poupyrev et al. |
| 2015/0362986 | A1 | 12/2015 | Lee et al. |
| 2016/0041617 | A1 | 2/2016 | Poupyrev |
| 2016/0041618 | A1 | 2/2016 | Poupyrev |
| 2016/0054803 | A1 | 2/2016 | Poupyrev |
| 2016/0071341 | A1 | 3/2016 | Menzel |
| 2016/0073351 | A1 | 3/2016 | Cardozo et al. |
| 2016/0098089 | A1 | 4/2016 | Poupyrev |
| 2016/0150124 | A1 | 5/2016 | Panda et al. |
| 2016/0170491 | A1 | 6/2016 | Jung |
| 2016/0179205 | A1 | 6/2016 | Katz |
| 2016/0187992 | A1 | 6/2016 | Yamamoto et al. |
| 2016/0216769 | A1 | 7/2016 | Goetz et al. |
| 2016/0252607 | A1 | 9/2016 | Saboo et al. |
| 2016/0261760 | A1 | 9/2016 | Aso et al. |
| 2016/0275348 | A1 | 9/2016 | Slaby et al. |
| 2016/0282934 | A1 | 9/2016 | Willis et al. |
| 2016/0306491 | A1 | 10/2016 | Lee et al. |
| 2016/0320854 | A1 | 11/2016 | Lien et al. |
| 2017/0010658 | A1 | 1/2017 | Tanaka et al. |
| 2017/0021728 | A1 | 1/2017 | Holger et al. |
| 2017/0052618 | A1 | 2/2017 | Lee et al. |
| 2017/0097413 | A1 | 4/2017 | Gillian et al. |
| 2017/0097684 | A1 | 4/2017 | Lien |
| 2017/0115738 | A1 | 4/2017 | Wei |
| 2017/0115739 | A1* | 4/2017 | Wei .................. G06F 3/017 |
| 2017/0168595 | A1 | 6/2017 | Sakaguchi et al. |
| 2017/0220843 | A1 | 8/2017 | Apostolos et al. |
| 2017/0243389 | A1 | 8/2017 | Wild et al. |
| 2017/0289766 | A1 | 10/2017 | Scott et al. |
| 2017/0299710 | A1 | 10/2017 | Shin et al. |
| 2017/0337431 | A1 | 11/2017 | Vang et al. |
| 2017/0358940 | A1 | 12/2017 | Parikh et al. |
| 2018/0004301 | A1 | 1/2018 | Poupyrev |
| 2018/0040144 | A1 | 2/2018 | Li |
| 2018/0043246 | A1 | 2/2018 | Chang |
| 2018/0052518 | A1 | 2/2018 | Zhu et al. |
| 2018/0082656 | A1 | 3/2018 | Ito et al. |
| 2018/0117447 | A1 | 5/2018 | Tran |
| 2018/0157330 | A1 | 6/2018 | Gu et al. |
| 2018/0164893 | A1 | 6/2018 | Sperrhake et al. |
| 2018/0164942 | A1* | 6/2018 | Huffman .................. G06F 3/0416 |
| 2018/0173323 | A1 | 6/2018 | Harvey et al. |
| 2018/0211024 | A1 | 7/2018 | Zhao et al. |
| 2018/0329050 | A1 | 11/2018 | Amihood et al. |
| 2018/0343023 | A1* | 11/2018 | Park .................. G06F 1/163 |

(56) References Cited

U.S. PATENT DOCUMENTS

| | | | |
|---|---|---|---|
| 2019/0011993 A1 | 1/2019 | Ette et al. | |
| 2019/0072410 A1 | 3/2019 | Tang | |
| 2019/0079590 A1 | 3/2019 | Tomizawa et al. | |
| 2019/0087621 A1 | 3/2019 | Khuri-Yakub et al. | |
| 2019/0129520 A1 | 5/2019 | Shin et al. | |
| 2019/0138109 A1 | 5/2019 | Poupyrev et al. | |
| 2019/0162010 A1 | 5/2019 | Rafrafi et al. | |
| 2019/0175077 A1* | 6/2019 | Zhang | G06F 3/017 |
| 2019/0187265 A1 | 6/2019 | Barbello et al. | |
| 2019/0260661 A1 | 8/2019 | Amini et al. | |
| 2019/0278339 A1 | 9/2019 | Cooper et al. | |
| 2019/0286806 A1 | 9/2019 | Robinson et al. | |
| 2019/0354668 A1 | 11/2019 | Flautner et al. | |
| 2019/0357049 A1 | 11/2019 | Tali et al. | |
| 2019/0389563 A1 | 12/2019 | Swain | |
| 2020/0081560 A1 | 3/2020 | Geller et al. | |
| 2020/0142645 A1 | 5/2020 | Wibbels et al. | |
| 2020/0159897 A1 | 5/2020 | Schmitt et al. | |
| 2020/0204541 A1 | 6/2020 | Nair et al. | |
| 2020/0219338 A1 | 7/2020 | Chen et al. | |
| 2020/0364967 A1 | 11/2020 | Spice | |
| 2020/0366742 A1 | 11/2020 | Van Os et al. | |
| 2020/0371660 A1* | 11/2020 | Chen | G06F 3/04883 |
| 2020/0372239 A1 | 11/2020 | Schmitt et al. | |
| 2020/0410072 A1 | 12/2020 | Giusti et al. | |
| 2021/0019441 A1 | 1/2021 | Neves Creto et al. | |
| 2021/0025976 A1 | 1/2021 | Alok et al. | |
| 2021/0027049 A1 | 1/2021 | Chandel et al. | |
| 2021/0029542 A1 | 1/2021 | Prag et al. | |
| 2021/0064142 A1 | 3/2021 | Stern et al. | |
| 2021/0064143 A1 | 3/2021 | Stern et al. | |
| 2021/0064144 A1 | 3/2021 | Stern et al. | |
| 2021/0064145 A1 | 3/2021 | Stern et al. | |
| 2021/0064146 A1 | 3/2021 | Stern et al. | |
| 2021/0103337 A1 | 4/2021 | Jeppsson et al. | |
| 2021/0103348 A1 | 4/2021 | Jeppsson et al. | |
| 2021/0158138 A1 | 5/2021 | Hazra et al. | |
| 2021/0314250 A1 | 10/2021 | Laplante et al. | |
| 2021/0342008 A1 | 11/2021 | Sachidanandam et al. | |
| 2022/0026993 A1 | 1/2022 | O'Reilley et al. | |
| 2022/0100283 A1 | 3/2022 | Stern et al. | |

FOREIGN PATENT DOCUMENTS

| | | |
|---|---|---|
| CN | 106339076 | 1/2017 |
| CN | 106537173 | 3/2017 |
| CN | 107710012 | 2/2018 |
| CN | 108781308 | 11/2018 |
| DE | 202017104779 | 11/2017 |
| EP | 2385450 | 11/2011 |
| EP | 3267291 | 1/2018 |
| GB | 2548964 | 10/2017 |
| GB | 2575185 | 1/2020 |
| JP | 2016076061 | 5/2016 |
| JP | 2018185873 | 11/2018 |
| KR | 20150033182 | 4/2015 |
| KR | 20150112708 | 10/2015 |
| KR | 101683868 | 12/2016 |
| KR | 20180071398 | 6/2018 |
| KR | 20180115348 | 10/2018 |
| WO | 2015196063 | 12/2015 |
| WO | 2016022764 | 2/2016 |
| WO | 2019118017 | 6/2019 |
| WO | 2019146032 | 8/2019 |
| WO | 2019206091 | 10/2019 |
| WO | 2020263250 | 12/2020 |
| WO | 2021021218 | 2/2021 |
| WO | 2021021219 | 2/2021 |
| WO | 2021021220 | 2/2021 |
| WO | 2021021224 | 2/2021 |
| WO | 2021040742 | 3/2021 |
| WO | 2021040745 | 3/2021 |
| WO | 2021040747 | 3/2021 |
| WO | 2021040748 | 3/2021 |
| WO | 2021040749 | 3/2021 |

OTHER PUBLICATIONS

"Intelligent Rendering of Readable Content onto Display Devices", Published on IP.com on Sep. 21, 2010, Sep. 21, 2010, 4 pages.
"International Search Report and Written Opinion", Application No. PCT/US2019/039306, dated Mar. 11, 2020, 17 pages.
"International Search Report and Written Opinion", Application No. PCT/US2019/049233, dated Apr. 20, 2020, 19 pages.
"International Search Report and Written Opinion", Application No. PCT/US2019/049236, dated May 26, 2020, 17 pages.
"International Search Report and Written Opinion", Application No. PCT/US2019/049204, dated May 4, 2020, 15 pages.
"International Search Report and Written Opinion", Application No. PCT/US2019/049164, dated May 6, 2020, 14 pages.
"International Search Report and Written Opinion", Application No. PCT/US2019/049225, dated May 6, 2020, 15 pages.
"Non-Final Office Action", U.S. Appl. No. 16/601,421, filed Oct. 2, 2020, 15 pages.
"Pursuant to MPEP § 2001.6(b) the applicant brings the following co-pending application to the Examiner's attention: U.S. Appl. No. 16/601,421, filed Oct. 14, 2019".
"Final Office Action", U.S. Appl. No. 16/871,945, filed Aug. 25, 2021, 46 pages.
"Foreign Office Action", CN Application No. 201980006096.3, Jul. 14, 2021, 18 pages.
"Foreign Office Action", KR Application No. 10-2019-0157391, Jul. 29, 2021, 9 pages.
"Non-Final Office Action", U.S. Appl. No. 16/912,635, filed Jun. 11, 2021, 14 pages.
"Notice of Allowance", U.S. Appl. No. 16/912,307, filed Jun. 23, 2021, 8 pages.
"Notice of Allowance", U.S. Appl. No. 16/912,635, filed Aug. 19, 2021, 7 pages.
Park, "Development of Kinect-Based Pose Recognition Model for Exercise Game", May 2016, pp. 303-310.
"Final Office Action", U.S. Appl. No. 16/601,421, filed Mar. 30, 2021, 17 pages.
"Foreign Office Action", KR Application No. 10-2019-0157394, dated Mar. 25, 2021, 10 pages.
"Office Action", U.S. Appl. No. 16/912,307, filed Mar. 19, 2021, 11 pages.
"Non-Final Office Action", U.S. Appl. No. 16/601,452, filed Mar. 24, 2021, 13 pages.
"Non-Final Office Action", U.S. Appl. No. 16/912,373, filed Apr. 1, 2021, 15 pages.
"Non-Final Office Action", U.S. Appl. No. 16/871,945, filed May 7, 2021, 41 pages.
"Non-Final Office Action", U.S. Appl. No. 16/871,945, filed Mar. 8, 2021, 41 pages.
Poupyrev, "Welcome to Project Soli—Youtube", Retrieved at: https://www.youtube.com/watch?v=0QNiZfSsPc0, May 29, 2015, 1 page.
Yeeun, "Brain Out—Blog", Retrieved at: https://blog.naver.com/junye2147/221658923923, Sep. 25, 2019, 29 pages.
"ControlAir on the Mac App Store", retrieved from https://apps.apple.com/om/app/controlair/id950009491 on Jun. 25, 2019, 2 pages.
"International Search Report and Written Opinion", PCT Application No. PCT/US2019/049208, dated Mar. 26, 2020, 13 pages.
"International Search Report and Written Opinion", PCT Application No. PCT/US2019/049212, dated Mar. 26, 2020, 14 pages.
"International Search Report and Written Opinion", PCT Application No. PCT/US2019/055731, dated Mar. 26, 2020, 15 pages.
"International Search Report and Written Opinion", PCT Application No. PCT/US2019/049216, dated Apr. 2, 2020, 14 pages.
"International Search Report and Written Opinion", PCT Application No. PCT/US2019/053676, dated Apr. 2, 2020, 14 pages.
Aboussouan, "Super-Resolution Image Construction Using an Array Camera", Technical Disclosure Commons; Retrieved from http://www.tdcommons.org/dpubs_series/643, Aug. 18, 2017, 7 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
Bardram, et al., "Context-Aware User Authentication—Supporting Proximity-Based Login in Pervasive Computing", Centre for Per-

(56) References Cited

OTHER PUBLICATIONS vasive Computing; Department of Computer Science, University of Aarhus; A.K. Dey et al. (Eds.): UbiComp 2003, LNCS 2864; © Springer-Verlag Berlin Heidelberg, 2003, pp. 107-123.
Colgan, "How Does the Leap Motion Controller Work?", Retrieved from http://blog.leapmotion.com/hardware-to-software-how-does-the-leap-motion-controller-work/ on Jun. 25, 2019, Aug. 9, 2014, 10 pages.
Karagozler, et al., "Embedding Radars in Robots to Accurately Measure Motion", Technical Disclosure Commons; Retrieved from http://www.tdcommons.org/dpubs_series/454, Mar. 30, 2017, 8 pages.
Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
Oh, et al., "Gesture Sensor for Mobile Devices", Samsung Electronics Co., Ltd; White Paper, 2013, 12 pages.
"Extended European Search Report", EP Application No. 21191070.8, dated Dec. 1, 2021, 13 pages.
"Foreign Office Action", KR Application No. 10-2021-7037578, dated Jan. 19, 2022, 6 pages.
"Foreign Office Action", KR Application No. 10-2019-0157391, dated Jan. 26, 2022, 10 pages.
"Foreign Office Action", EP Application No. 19797449.6, dated Feb. 8, 2022, 8 pages.
"International Preliminary Report on Patentability", Application No. PCT/US2019/049208, dated Feb. 1, 2022, 8 pages.
"International Preliminary Report on Patentability", Application No. PCT/US2019/049212, dated Feb. 1, 2022, 9 pages.
"International Preliminary Report on Patentability", Application No. PCT/US2019/049216, dated Feb. 1, 2022, 9 pages.
"International Preliminary Report on Patentability", Application No. PCT/US2019/053676, dated Feb. 1, 2022, 9 pages.
"International Preliminary Report on Patentability", Application No. PCT/US2019/055731, dated Feb. 1, 2022, 9 pages.
"International Preliminary Report on Patentability", Application No. PCT/US2019/039306, dated Dec. 28, 2021, 11 pages.
"Non-Final Office Action", U.S. Appl. No. 16/912,534, filed Jan. 6, 2022, 21 pages.
"Non-Final Office Action", U.S. Appl. No. 16/912,603, filed Feb. 3, 2022, 14 pages.
"Non-Final Office Action", U.S. Appl. No. 16/912,373, dated Dec. 24, 2021, 6 pages.
"Non-Final Office Action", U.S. Appl. No. 16/871,945, dated Dec. 24, 2021, 8 pages.
"Notice of Allowance", U.S. Appl. No. 16/912,635, filed Jan. 28, 2022, 5 pages.
"Final Office Action", U.S. Appl. No. 16/601,452, filed Sep. 30, 2021, 15 pages.
"Final Office Action", U.S. Appl. No. 16/912,373, filed Oct. 8, 2021, 11 pages.
"Foreign Notice of Allowance", KR Application No. 10-2019-0157394, dated Sep. 24, 2021, 3 pages.
"Non-Final Office Action", U.S. Appl. No. 16/601,421, filed Sep. 14, 2021, 29 pages.
"Non-Final Office Action", U.S. Appl. No. 16/879,662, filed Sep. 16, 2021, 12 pages.
"Non-Final Office Action", U.S. Appl. No. 16/965,735, filed Nov. 23, 2021, 12 pages.
"Non-Final Office Action", U.S. Appl. No. 16/872,055, filed Nov. 23, 2021, 25 pages.
"Notice of Allowance", U.S. Appl. No. 16/879,662, filed Nov. 17, 2021, 7 pages.
"Final Office Action", U.S. Appl. No. 16/872,055, dated Apr. 15, 2022, 24 pages.
"Foreign Notice of Allowance", KR Application No. 10-2021-7037578, dated Apr. 11, 2022, 3 pages.
"Foreign Office Action", IN Application No. 202147051694, dated Mar. 28, 2022, 6 pages.
"Foreign Office Action", EP Application No. 19769329.4, dated Mar. 28, 2022, 9 pages.
"Foreign Office Action", IN Application No. 202147051775, dated Apr. 18, 2022, 5 pages.
"Foreign Office Action", IN Application No. 202147055373, dated Apr. 26, 2022, 6 pages.
"Foreign Office Action", IN Application No. 202147051918, dated Apr. 27, 2022, 7 pages.
"Foreign Office Action", IN Application No. 202147055371, dated Apr. 28, 2022, 6 pages.
"Foreign Office Action", KR Application No. 10-2021-7037833, dated Apr. 29, 2022, 8 pages.
"International Preliminary Report on Patentability", Application No. PCT/US2019/049225, dated Mar. 1, 2022, 10 pages.
"International Preliminary Report on Patentability", Application No. PCT/US2019/049236, dated Mar. 1, 2022, 10 pages.
"International Preliminary Report on Patentability", Application No. PCT/US2019/049233, dated Mar. 1, 2022, 13 pages.
"International Preliminary Report on Patentability", Application No. PCT/US2019/049164, dated Mar. 1, 2022, 9 pages.
"International Preliminary Report on Patentability", Application No. PCT/US2019/049204, dated Mar. 1, 2022, 9 pages.
"Notice of Allowance", U.S. Appl. No. 16/871,945, filed Apr. 13, 2022, 14 pages.
"Notice of Allowance", U.S. Appl. No. 16/912,373, filed Apr. 20, 2022, 8 pages.

\* cited by examiner

ROBUST RADAR-BASED GESTURE-RECOGNITION BY USER EQUIPMENT

RELATED APPLICATIONS

This application is a continuation in part of, and claims priority to PCT Patent Application Serial No. PCT/US2019/055731 filed Oct. 10, 2019 entitled "ROBUST RADAR-BASED GESTURE-RECOGNITION BY USER EQUIPMENT", PCT Patent Application Serial No. PCT/US2019/053676 filed Sep. 27, 2019 entitled "CONTEXT-SENSITIVE CONTROL OF RADAR-BASED GESTURE-RECOGNITION", which, in turn, claims priority under 35 U.S.C. § 119(e) to U.S. Provisional Patent Application No. 62/894,566 filed Aug. 30, 2019 entitled "Radar-Based Gesture-Recognition With Context-Sensitive Gating and Other Context-Sensitive Controls" and U.S. Provisional Patent Application No. 62/879,361 filed Jul. 26, 2019 entitled "Authentication Management Using IMU and Radar", and further is a continuation in part of, and claims priority to PCT Patent Application Serial No. PCT/US2019/049208 filed Aug. 30, 2019 entitled "MAINTAINING AN AUTHENTICATED STATE", PCT Patent Application Serial No. PCT/US2019/049212 filed Aug. 30, 2019 entitled "REDUCING A STATE BASED ON IMU AND RADAR", and PCT Patent Application Serial No. PCT/US2019/049216 filed Aug. 30, 2019 entitled "AUTHENTICATION MANAGEMENT THROUGH IMU AND RADAR", which, in turn, also claims priority under 35 U.S.C. § 119(e) to U.S. Provisional Patent Application No. 62/879,361 filed Jul. 26, 2019 entitled "Authentication Management Using IMU and Radar", the disclosures of which are incorporated in their entireties by reference herein.

BACKGROUND

Some computing devices (also referred to as "user equipment") include a radar system for detecting input. For example, the radar system provides a radar field from which the radar system recognizes two-dimensional and three-dimensional (also referred to as "touch-independent") radar-based gestures made within or through the radar field. The radar system may constantly evaluate reflections within the radar field, frequently transitioning into a gesture-recognition state to interpret what could be radar-based gesture inputs. Transitioning to a gesture-recognition state in response to an unintended or false-positive radar input, however, wastes electrical power and may cause a malfunction if a mistakenly-recognized radar-based gesture triggers or is used to perform a function.

SUMMARY

This document describes techniques and systems for radar-based gesture-recognition with context-sensitive gating and other context-sensitive controls. The techniques and systems use sensor data from a plurality of sensors to define the context of a user equipment. The plurality of sensors may include low-power sensor devices such as an inertial measurement unit (IMU) and exclude high-power sensor devices, such as a camera. The sensor data can be inertial sensor data from an IMU, proximity data from a proximity sensor, radar data from a radar system, or any other sensor data. The sensor data defines the context of the user equipment, such as a user activity or characteristic of a computing environment. In certain contexts, when a radar system is unreliable or less reliable for radar-based gesture-recognition, the techniques and systems enable the user equipment to automatically disable or "gate" radar-based gesture-recognition. To do so, the user equipment may restrict inputs to, or outputs from, a gesture-recognition model. The user equipment may also disable the gesture-recognition model to prevent the radar system from performing radar-based gesture-recognition altogether. The user equipment can re-enable radar-based gesture-recognition when the context changes to a different context that is not likely to cause errors in gesture-recognitions or cause false positives. If the user equipment is operating in a context where radar-based gestures are unlikely, the user equipment automatically gates gesture-recognitions. Gating the gesture-recognitions prevents applications or other subscribers executing at the user equipment from performing functions in response to radar inputs obtained while gating. By so doing, the techniques prevent false-positive gesture-recognitions from triggering operations by subscribers of the gesture-recognitions. Preventing false-positives conserves power and improves usability and user satisfaction for computing systems using radar-based gesture-recognition systems.

For example, an apparatus is described including: a radar system that detects radar-based gestures on behalf of application subscribers; an inertial measurement unit that receives inertial sensor data; and a state machine that transitions between multiple states for controlling the radar system based on the inertial sensor data and context-sensitive transition functions, the state machine including: a no-gating state in which the state machine enables the radar system to output indications of the radar-based gestures to application subscribers; a soft-gating state in which the state machine prevents the radar system from outputting the indications of the radar-based gestures to the application subscribers; and a hard-gating state in which the state machine prevents the radar system from detecting the radar-based gestures.

This document also describes a method performed by the above-summarized apparatus and other methods set forth herein as well as computer-readable media having instructions for performing the method and other methods set forth herein. This document also describes systems and means for performing these methods.

This summary is provided to introduce simplified concepts for radar-based gesture-recognition with context-sensitive gating and other context-sensitive controls, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of radar-based gesture-recognition with context-sensitive gating and other context-sensitive controls are described in this document with reference to the following drawings. The same numbers are used throughout the drawings to reference like features and components:

FIG. 6-1 illustrates an example radar system as part of user equipment.

FIG. 6-2 illustrates an example transceiver and processor.

FIG. 6-3 illustrates an example relationship between power consumption, a gesture-frame update rate, and a response delay.

FIG. 6-4 illustrates an example framing structure.

DETAILED DESCRIPTION

Overview

Figure 1:
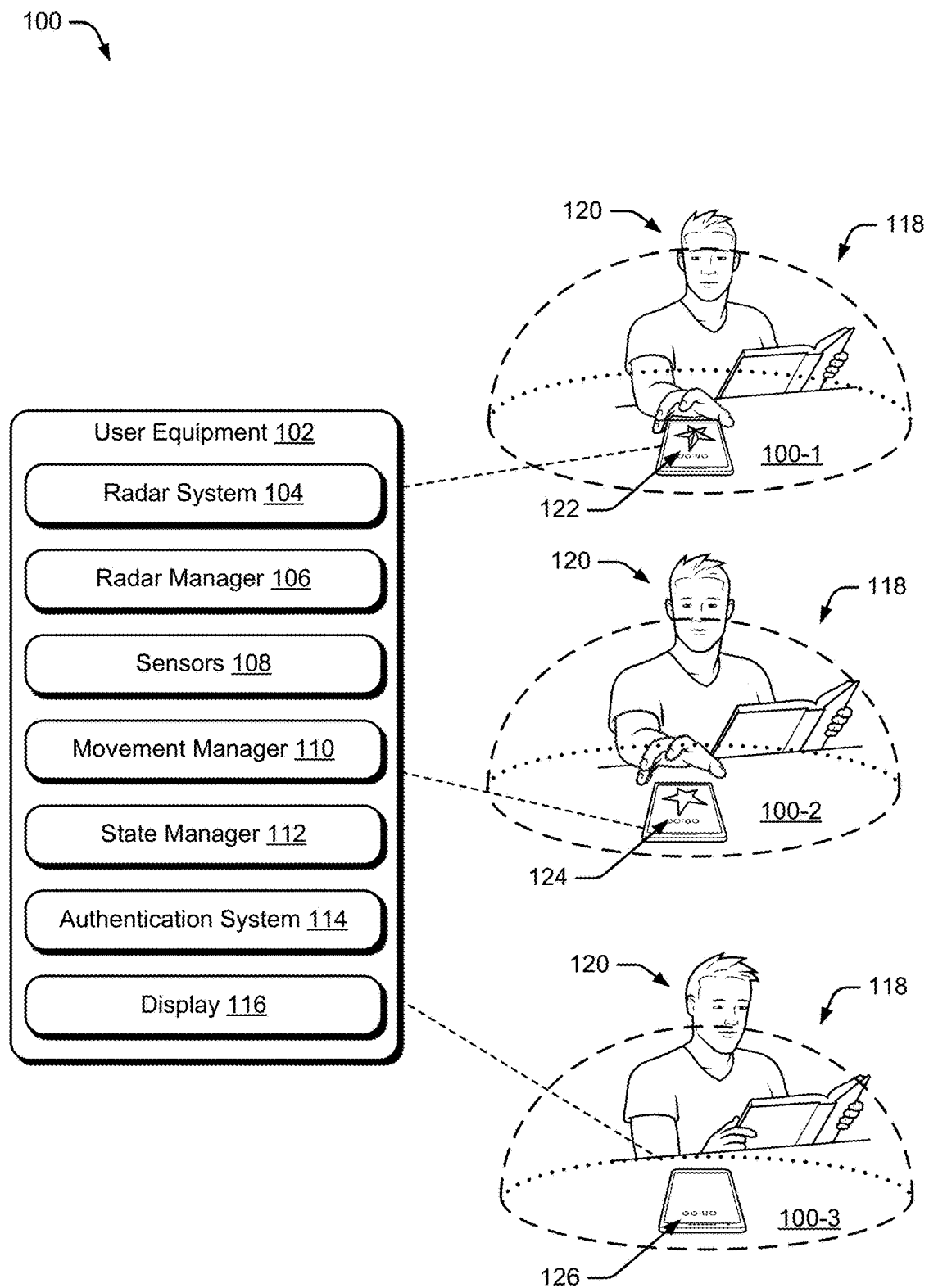
FIG. 1 illustrates an example environment in which techniques for radar-based gesture-recognition with context-sensitive gating and other context-sensitive controls can be implemented.

This document describes techniques and systems for radar-based gesture-recognition with context-sensitive gating and other context-sensitive controls. As an example, a user equipment (UE) (e.g., a computing device) includes a radar system for, among other uses, detecting input from a user. The UE receives sensor data from a plurality of sensors, such as a proximity sensor or a movement sensor, to develop a context of the UE.

The context defines a user activity, device characteristics, or an operating environment of the UE. The context can specify orientation, acceleration, position, or proximity to an object. Location, temperature, luminance, pressure, and other environmental characteristics can also define a context. The plurality of sensors may include a movement sensor, such as an inertial measurement unit (IMU) for generating inertial data defining movement of the UE. The plurality of sensors can include a proximity sensor, a light sensor, or a temperature sensor, to name just a few. When the radar system is operating in a proximity mode (with or without gesture-recognition enabled), the radar system is the proximity sensor. The UE may rely sensors that provide accurate sensor data while consuming as little electrical power as possible, especially for UE's relying on battery power.

Based on the context defined by the sensor data, the UE determines whether to prevent the radar system from recognizing radar-based gestures and/or whether to prevent components of the UE from using a recognized radar-based gesture to perform a function. Gating gesture-recognitions made by the radar system prevent the UE from wasting computing resources and electrical power interpreting radar-based gestures or performing functions (even malfunctioning) in response to a gesture-recognition made from unintentional or non-user input.

Without gating, a UE over-interprets radar-based gestures from radar data, thereby wasting computational resources processing false gestures or even malfunctioning in response thereto. By gating the output from the radar system based on context, the disclosed techniques and systems enable a UE to conserve power, improve accuracy, improve user satisfaction and usability, or reduce latency relative to other techniques and systems for radar-based gesture-recognitions.

By way of one example, assume that sensor data obtained by a smartphone indicates a user is holding the smartphone. The techniques and systems enable a radar system of the smartphone to recognize radar-based gestures in this context as the likelihood is high that the user will input radar-based gestures to the smartphone while holding it. The sensor data subsequently indicates that the user is also walking with the smartphone. The smartphone continues to recognize radar-based gestures with the radar system in this context as well because even while walking, the user is likely to want to intentionally gesture at the smartphone while holding the smartphone. The sensor data next indicates that the user is still walking but no longer holding the smartphone, the smartphone is oriented away from the user, and/or the smartphone is occluded by an object (e.g., a backpack compartment). As the user is not likely to interact with the smartphone while in the backpack compartment, for example, the techniques and systems enable the smartphone to disable the radar system, or at least tune the radar system to prevent the radar system from being used to recognize radar-based gestures in this context. When the smartphone recognizes a new context, the smartphone reevaluates whether to enable radar-based gesture-recognition and enables radar-based gesture-recognition by the radar system when the context is appropriate for radar-based gesture-recognition.

Eventually, the user places the smartphone on a surface, such as a desk, and the sensor data indicates the user is not holding the smartphone and the smartphone is oriented with the screen facing up. If proximity data indicates the user is reaching over the smartphone, the smartphone selectively enables or prevents the radar system from recognizing radar-based gestures based on what the user does next. If the smartphone detects movement indicating the user is picking up the smartphone after having reached over the smartphone, the smartphone recognizes radar-based gestures with the radar system. If the smartphone does not detect movement indicating the user is picking up the smartphone after having reached over the smartphone (e.g., the user is grabbing a cup of coffee on the desk next to the smartphone), the smartphone prevents gesture-recognition using the radar system.

These are only some examples of how the described techniques and devices may be used to gate radar-based gesture-recognitions. Other examples and implementations are described throughout this document. The document now turns to an example operating environment, after which example devices, methods, and systems are described.

Operating Environment

FIG. 1 illustrates an example environment 100 in which techniques for context-sensitive gating and other context-sensitive controls of radar-based gesture-recognitions can be implemented. The example environment 100 includes a user equipment (UE) 102 (e.g., a smartphone), which includes, or is associated with, a radar system 104, a radar manager 106, a plurality of sensors 108, a movement manager 110, a state manager 112, an authentication system 114, and a display 116.

In the example environment 100, the radar system 104 provides a radar field 118 by transmitting one or more radar signals or waveforms as described below with reference to FIGS. 7-9. The radar field 118 is a volume of space from which the radar system 104 can detect reflections of the radar signals and waveforms (e.g., radar signals and waveforms reflected from objects in the volume of space, also referred to generally herein as radar data). The radar system 104 also enables the UE 102, or another electronic device, to sense and analyze this radar data from reflections within the radar field 118, for example, to recognize radar-based gestures (e.g., touch-independent gestures) made by a user in the volume space. The radar field 118 may take any of a variety of shapes and forms. For example, a radar field 118 may have a shape as described with reference to FIGS. 1 and 7. In other cases, the radar field 118 may take the shape of a radius extending from the radar system 104, a volume around the radar system 104 (e.g., a sphere, a hemisphere, a partial sphere, a beam, or a cone), or a non-uniform shape (e.g., to accommodate interference from obstructions in the radar field 118). The radar field 118 may extend any of a variety of distances from the radar system 104 such as inches to twelve feet (less than a third of a meter to four meters). The radar field 118 may be predefined, user-selectable, or determined via another method (e.g., based on power requirements, remaining battery life, or another factor).

The reflection from the user 120 in the radar field 118 enables the radar system 104 to determine various information about the user 120, such as the body position and posture of the user 120, which may indicate a variety of different nonverbal body language cues, body positions, or body postures, which can be recognized by the radar system 104 as touch-independent gestures made by the user 120. The cues, positions, and postures may include an absolute position or distance of the user 120 with reference to the UE 102, a change in the position or distance of the user 120 with reference to the UE 102 (e.g., whether the user 120 or the user's hand or object held by the user 120 is moving closer to or farther from the UE 102), the velocity of the user 120 (e.g., a hand or a non-user object) when moving toward or away from the UE 102, whether the user 120 turns toward or away from the UE 102, whether the user 120 leans toward, waves toward, reaches for, or points at the UE 102, and so forth. These reflections can also be analyzed to determine, or to add confidence to, authentication, such as an identity of a human through analysis of the radar data (e.g., scattering centers of a user's face). These reflections can be used by the UE 102 to define a context (e.g., an operating environment of the UE 102) for performing context-sensitive gating and other context-sensitive controls of radar-based gesture-recognitions. These reflections can also be used to determine or to add confidence to, touch-independent gestures recognized by the radar system 104 as the user 120 provides input to the UE 102.

The radar manager 106 is configured to determine, based on radar data from the radar system 104, a user's intent to engage, disengage, or maintain engagement with the UE 102. A user's intent can be deduced from touch-independent gestures recognized by the radar system 104, e.g., the various cues, positions, postures, and distances/velocities noted above, such as based on an arm or hand gesture (e.g., a hand or arm reach toward, swipe over), an eye gesture (e.g., a movement of eyes to look at), or a head gesture (e.g., movement of a head or face oriented toward the UE 102). For a hand or arms reach, the radar manager 106 determines that the user is reaching their hand or orienting their arm in such a way as to indicate a likely intent to touch or pick up the UE 102. Examples include a user reaching toward a volume button on a wirelessly attached speaker, a reach toward a wireless or wired mouse associated with a tablet computer, or a reach toward the UE 102 itself. This reach toward can be determined based on a hand movement alone, an arm and hand movement, or an arm bending or straightening in a manner that permits a hand of the arm to touch or grab the UE 102.

A user's intent to engage can also be deduced based on a user's movement of their or their head or eyes to look at, or orient their or their face toward, the UE 102 or, in some cases, an associated peripheral of the UE 102. For a movement of a user's eyes to look toward the UE 102, the radar manager 106 determines that the user's eyes are looking in the direction of the UE 102, such as through tracking of the user's eyes. For movement of the user's head to orient their or their face toward the UE 102 (e.g., a facial orientation), the radar manager 106 determines that various points (e.g., scattering centers as noted below) are now oriented such that the user's face is pointing toward the UE 102. Thus, a user need not perform an action designed to control or activate the UE 102, such as activating (pressing) on a button on the UE 102, or a touch-dependent gesture (e.g., on a touchpad or screen) or touch-independent gesture (e.g., using the radar system 104) in order for the radar manager 106 to determine that the user intends to engage (or disengage or maintain engagement) with the UE 102.

As noted above, the radar manager 106 is also configured to determine a user's intent to disengage with the UE 102. The radar manager 106 determines a user's intent to disengage similarly to a user's intent to engage, though deduced from radar data indicating lack of a touch-independent gesture, or that the user's hand or arm is moving away from the UE 102 (e.g., retracting), movement of eyes to look away from, or movement of the head or face away from the UE 102 (e.g., a facial orientation change away from looking at the UE 102). Additional manners through which to determine a user's intent to disengage are not only the opposite or cessation of engagement noted above, but also radar data indicating that the user has walked away, moved their or their body away from, or has engaged with a different, unassociated object or device. Thus, the radar manager 106 may determine an intent to disengage with the UE 102 based on determining an intent to engage, by the user, with some other object, device, or user equipment. Assume, for example, that a user is looking at and interacting with a smartphone. Example intents to engage that indicate an intent to disengage with that smartphone include the user looking, instead of at the smartphone, at a television screen, beginning to talk to a nearby physically-present person, or reaching toward another device with which engagement is likely to replace the engagement with the smartphone, such as an e-book or media player.

The radar manager 106 is also configured to determine a user's intent to maintain engagement with the UE 102. This maintaining of engagement can be active or passive. For active engagement, the radar manager 106 may determine, based on radar data, that the user is interacting through touch-independent gestures, and so forth. The radar manager 106 may also or instead determine active engagement through non-radar data (e.g., performed with assistance from other components of the UE 102). These non-radar data include indications that the user is inputting data to or controlling the UE 102 or a peripheral. Thus, through touch, typing, or audio data, the user is determined to be touching (e.g., tapping on a soft keyboard or performing a gesture) through a touch-screen input of the display 116, typing on a peripheral keyboard, or is determined to be dictating an audio input. For passive maintaining of engagement, the radar manager 106 determines, independently or through assistance of other components of the UE 102, that the user is consuming content or providing the UE 102 to others to consume content, such as pointing their or their face toward the UE 102, looking at the display 116, or is holding the UE 102 in such a way as to orient the UE 102's display to be visible by the user or a third party. Other examples of maintaining passive engagement include a user's presence, such as through the radar manager 106 determining that the user 120 is within reach of (e.g., two, one and a half, one, or one-half of one meter from) the UE 102. Details of example ways in which the radar manager 106 determines a user's intent to engage, disengage, or maintain engagement are described below.

Further still, the radar manager 106, using radar data from the radar system 104, may also determine gestures performed by a user. These gestures can involve the user touching some surface, such as a table, the display 116, or their or their shirt sleeve, or touch-independent gestures. Touch-independent gestures can be performed in the air, in three dimensions, and/or without necessitating a hand or fingers touch an input device but are not precluded from touching some object. These gestures can be recognized or determined based on the radar data obtained by the radar system 104 and then output to applications or other subscribers executing at the UE 102 or used as input to perform an operation, such as to indicate engagement with, the UE 102.

Example gestures include those similar to sign language (e.g., ASL or American Sign Language), which are varied, complex single hand or multi-hand gestures, or simple multi-hand or single-hand gestures, such as to swipe left, right, up, or down, flat-hand-raise or lower (e.g., to raise or lower music volume of the UE 102 or a television or stereo, controlled through the UE 102), or to swipe forward or backward (e.g., left-to-right or right-to-left) to change music and video tracks, snooze alarms, dismiss phone calls, or even play games. These are but a few of the many example gestures and functions controllable by these gestures and which are enabled through the radar system 104 and the radar manager 106. Thus, while this document is directed to in some aspects to engagement and state management, nothing in this document should be misconstrued to indicate that the engagement and state management aspects cannot be used to additionally or alternatively configure the radar system 104 and the radar manager 106 to perform gesture-recognition.

The display 116 can include any suitable display device, such as a touchscreen, a liquid crystal display (LCD), thin-film transistor (TFT) LCD, an in-plane switching (IPS) LCD, a capacitive touchscreen display, an organic light-emitting diode (OLED) display, an active-matrix organic light-emitting diode (AMOLED) display, super AMOLED display, and so forth. As noted, the display 116 can be powered at various levels, such as at full saturation with touch-input powered, reduced saturation without touch-input powered, and with low-saturation and low-power (e.g., a gray clock) or no power.

The plurality of sensors 108 can be any of a variety of sensor devices configured to generate sensor data indicative of a context of the UE 102, or in other words, an indication of an operating environment or surroundings of the UE 102. The plurality of sensors 108 include an inertial measurement unit (IMU) to measure movement, which is here defined to include specific force, angular rate, orientation, vibrations, acceleration, velocity, and position, including pitch, roll, and yaw for each of three axes (e.g., X, Y, and Z). An IMU is but one example of the sensors 108. Other examples of the plurality of sensors 108 for sensing movement include an accelerometer, gyroscope, and/or magnetometer. The plurality of sensors 108 can include a proximity sensor, a light sensor, a positioning sensor, a compass, a temperature sensor, a barometric pressure sensor, or any other sensor to detect presence or proximity to an object. The plurality of sensors 108 may include a proximity sensor, such as the radar system 104, operating in a proximity mode as opposed to a gesture-recognition mode or another mode.

The UE 102 may rely primarily on battery power, and as such, the plurality of sensors 108 may exclude high-power sensors like cameras and instead, primarily include low-power sensors that provide accurate sensor data for developing accurate contexts. By avoiding use of high-power sensors like cameras to drive gating decisions, instead using sensor data from low-power sensors like IMUs, the UE 102 operates more efficiently, using less power to make gating decisions than if cameras are used.

The movement manager 110 is configured to determine, based on inertial data or other sensor data obtained from the sensors 108, movements of the UE 102. The movement manager is configured to determine movements of the UE 102 to enable the UE 102 to define a context. Example movements include the UE 102 being lifted (e.g., picked up), oriented toward or away from the user 120, and vibrations. Example movements can indicate cessation of physical contact by the user 120 of the UE 102, placement of the UE 102 on a non-living object (e.g., a table, car console, couch arm, pillow, floor, docking station), and placement of the UE 102 within an enclosed container, e.g., a pocket, bag, or purse. Further example movements include those indicating the UE 102 is being held, movements indicating the UE 102 is being held by a person who is walking, riding a bicycle, riding in a vehicle, or otherwise moving, movements indicating how the UE 102 is being held, such as a carry-orientation of being in landscape, portrait-up, portrait-down, or a combination thereof. Example movements further include the UE 102 not being held, or movements indicating the UE 102 is not being held but carried on the person who is walking, etc.

These movements can indicate a user's potential engagement, disengagement, or maintained engagement with the UE 102. For example, the movement of the UE 102 may indicate that the user equipment is moving or orienting toward or is being moved/oriented away from the user 120, is moving too rapidly or changing movement too rapidly to be interacted with for many likely types of user engagement, is being held by the user 120 (via natural human movements, respiration, heartbeat), or is vibrating due to a mechanical or non-user source (e.g., a vehicle's vibration, ambient sounds shaking the UE 102, music causing the UE 102 to vibrate). Thus, orienting away, which would indicate a potential disengagement with the UE 102, may include an orientation change of the UE 102 such that a prior orientation where the user 120 was likely to have been looking at the display 116, is now unlikely to be doing so. The user 120 typing or reading at one orientation, and then turning the phone over, or sideways, or placing in a pocket, etc., is but one example of a movement indicating an orienting away and thus a potential disengagement. Example movements that may indicate maintained engagement include vibrations indicating that a user is maintaining a hold or placement of the UE 102 or is maintaining their or their orientation relative to the UE 102 where that orientation previously indicated or was coincident with, engagement with the UE 102.

The radar system 104 relies on the radar manager 106, the movement manager 110, and the sensors 108 to define a context of the UE 102 that is used to drive gating decisions made by the radar system 104. The sensor data generated by the sensors 108, in combination with the movements and the user intents determined by the movement manager 110 and the radar manager 106, helps define the context of the UE 102.

Movements determined by the movement manager 110 may indicate how or if a user 120 is interacting with the UE 102. Accelerations or vibrations detected by the movement manager 110 can correspond to similar vibrations and accelerations observed when the user 120 is walking or otherwise moving with the UE 102 and therefore the movements may indicate how the user is walking or moving. Changes in movement determined by the movement manager 110 can indicate changes in carrying position and orientation, as further information about how or if the user 120 is interacting with the UE 102. Patterns of movement or lack of movement inferred by the movement manager 110 may be similar to movements typically observed when the user 120 is viewing or holding the UE 102 in a holding context. The movements and patterns of movement can indicate a stowed context under such conditions when the UE 102 is contained in a pocket of clothing worn by the user 120 or in a backpack or briefcase, an overhead storage bin in an airplane or train, a console or glove box of a vehicle, or other storage enclosure.

The context can be defined by other information beyond movement. For example, a proximity sensor or the radar system 104 can detect whether the radar system 104 (or other part of the UE 102) is occluded by an object in proximity to the UE 102. Evidence of occlusion may indicate the UE 102 is in a stowed context, and lack of occlusion may indicate otherwise. Other sensors such as ambient light sensors, barometers, location sensors, optical sensors, infrared sensors, and the like can provide signals to the UE 102 that further define the operating environment or context of the UE 102 to improve gesture-recognition and other described techniques. Relative elevations, shadows, ambient sounds, ambient temperatures, and the like are further examples of signals that can be captured by the radar system 104 through the sensors 108 to enable the UE 102 to define a context.

The state manager 112 manages states of the UE 102, such as power, access, and information states, and in some examples, manages the states based on the context defined above. This management of the UE 102 and its components is performed partly on determinations made by the radar manager 106 and the movement manager 110, sensor data from the sensors 108, and a context defined therefrom. For example, the state manager 112 can manage power to a component of the authentication system 114, such as by altering the UE 102's display 116 to power up in anticipation of receiving touch input from the user 120 to input a password, a computer processor to perform calculations used in authentication, or an imaging system to perform image-based facial authentication, radar (e.g., the radar system 104), or other components. The state manager 112 may direct the radar manager 106 to place the radar system 104 in a proximity or a disabled mode when radar-based gesture-recognition is gated and to place the radar system 104 in an enabled or a gesture-recognition mode when radar-based gesture-recognition is not gated.

As noted, this managing of the UE 102 is based on determinations by the radar manager 106 and the movement manager 110, which determine an intent to engage, disengage, or maintain engagement and movement of the UE 102, respectively. The state manager 112 can do so based on these determinations alone or also based on other information that defines the context of the UE 102, including a current state, current engagement, applications running and the content shown by these applications, and so forth. The state manager 112, by accounting for the context, can improve the accuracy, robustness, and speed of an overall determination that the user's intent is to engage, disengage, or maintain engagement with the UE 102.

The "multiple determinations" (e.g., that of the radar manager 106 and the movement manager 110) to define a context can be performed concurrently or in stages as part of managing the states of the UE 102, or one of these may alone be used. For example, assume that the UE 102 is at a low-power state for components used to authenticate. The radar manager 106 may determine that the user 120 is intending to authenticate with the UE 102 based on a movement toward or a reach toward the UE 102. In some cases, this alone is considered by the state manager 112 to be an insufficient context for the state manager 112 to cause the UE 102 to be altered to a high-power state (e.g., for authenticating, for interpreting radar-based gestures). Thus, the state manager 112 can cause some of the authentication components to be powered up to an intermediate state, rather than a high-power state (e.g., the high-power state 504-1 of FIG. 5). For example, in cases where the authentication system 114 uses infrared sensors to perform facial recognition, the state manager 112 can power these sensors and the display 116 to a higher power, in anticipation of authenticating the user, and in the case of the display 116, indicating to the user that the UE 102 is "waking up" and therefore is increasingly responsive. As an additional step, the state manager 112 can wait until the movement manager 110 determines that the context indicates the user has moved, picked up, lifted, and so forth the UE 102 before fully powering on the authentication components, here the infrared sensors. While not required, the state manager 112 may cause the authentication to be attempted by the components without further input from the user, thereby making authentication seamless for the user 120.

In some cases, however, the state manager 112 determines to power up or otherwise prepare the state of the UE 102 responsive to both inertial data and radar data, e.g., the radar manager 106 determining that the user intends to engage and the movement manager 110 determining that the user is picking up the UE 102.

Thus, the state manager 112 can wait until a higher level of confidence that the user's intent is to engage by picking up the UE 102, such as an indication by the movement manager 110 that the user has just started to touch the UE 102. In such a case, the state manager 112 may increase power based on just the radar manager 116's determination but may do so to an intermediate-power level of a display or the authentication system 114 or component thereof, instead of waiting until the movement manager 110 indicates a touch by the user to fully power these components. As noted, however, the state manager 112 may alter states to higher power levels solely on determination of an intent to engage based on radar data or lower those levels solely on determination of an intent to disengage based on radar data.

One of many example ways in which the state manager 112 can manage states of the UE 102 is shown in FIG. 1 at example environments 100-1, 100-2, and 100-3.

In the environment 100-1, assume that the user 120 is authenticated and that the UE 102 is in a high-level state for power, access, and information. This authentication is indicated to the user 120 through the display 116 showing a high-saturation and high-luminosity star symbol (shown in the environment 100-1 at 122). At the environment 100-1, the user 120 places the UE 102 down on the table. This placing of the UE 102 on the table results in the sensors 108 sensing, and then providing inertial data, to the movement manager 110. The movement manager 110 determines, based on this inertial data, that the UE 102 has moved but is now resting still. The UE 102 was in a moving context and is now in a stationary context. At this point the movement manager 110 may pass this movement determination to the radar system 104, the radar manager 106, or the state manager 112, but in either three cases this is a data point for determining whether or not to reduce the states from high levels to intermediate or lower levels. As noted, reducing these states can save power, keep information private and access secure, and still provide a seamless user experience for the user 120. For example, based on the movement determination, the radar system 104 forms a context for managing its output. In the environment 100-1, where some slight movement is detected, but the user 120 is not holding the UE 102, the radar system 104 can determine the environment 100-1 where the UE 120 is resting on a flat, stationary surface. Because the context for the UE 120 is a stationary context, other than slight movement, the context satisfies requirements for radar-based gesture-recognition.

Continuing this example, consider environment 100-2, where the user 120 retracts their hand from the UE 102. This retraction is sensed and analyzed by the radar system 104 and the radar manager 106, respectively. By so doing, the radar manager 106 determines that the user 120 is intending to disengage from the UE 102. Based on this determination from the radar manager 106 and the movement determination from the movement manager 110, the state manager 112 may reduce one or more of the states of the UE 102. Here this reduction is intended to correspond to the user's 120 level of engagement with the UE 102. This reduction by the state manager 112 is to an intermediate level of power by reducing the saturation and luminosity of the display 116, shown at a low-luminosity and saturation star symbol (shown at 124). Note that the state manager 112 can reduce the states to a low level of power, access, and/or information, but here the state manager 112 reduces the states to an intermediate level, as the intent to disengage from the radar manager 106 indicates that the user 120 is retracting their or their arm, but that their body is still oriented toward the UE 102 and the user 120 is still looking at the UE 102. This is one example of tailoring the states to a user's engagement, as the retraction indicates a certain level of disengagement, but may, on its own, indicate either some continuing engagement or some level of uncertainty in the disengagement determination by the radar manager 106. For example, the retraction determination can be used as proximity information for defining a second context of the UE 102. The radar system 104 forms the second context for managing its gesture-recognition capability in the environment 100-2. Where a retract is detected without any movement to the UE 102, the radar system 104 can determine the environment 100-2 is a stowed context that does not satisfy requirements for touch-independent gesture-recognition as the context indicates the device is now out of the user's 120 reach.

Concluding this example, consider the environment 100-3. Here the user 120 is reading their book, with the UE 102 lying on the table. The user 120 orients their body at some angle away from the UE 102 and toward their book, and the user 120 is looking at the book, not the UE 102. Based on this additional information about the user's 120 orientation, the radar manager 106 determines that the user 120 is intending to (and likely has) disengaged from the UE 102. At this point, the radar manager 106 provides this additional intent to disengage determination to the state manager 112, which then lowers the states of the UE 102 to a low level, shown with lower power usage at the display 116 (showing only time of day at low-luminosity and saturation at 126). While not shown, the state manager 112 also de-authenticates the user 120 (e.g., locks the UE 102). This additional information about the user's 120 orientation or the determination that the user 120 is intending to disengage from the UE 102 can be used as proximity information for defining a third context of the UE 102. The radar system 104 forms the third context in response to detecting an intent to disengage and read a book. The radar system 104 can determine the environment 100-3 is a not context that satisfies requirements for radar-based gesture-recognition as the context indicates the device is now out of the user's 120 proximate influence.

As shown in this example, the techniques described herein can manage states of a user equipment to provide a seamless user experience involving authentication and radar-based gesture-recognition. The techniques enable doing so with reduced power consumption and greater privacy and security over other techniques. The state management can achieve maintaining or increasing levels of power, access, and information. As further shown, without gating, the UE 102 may over-interpret radar-based gestures from radar data obtained by the radar system 104, thereby wasting computational resources processing and subsequently discarding false gestures. By gating the gesture-recognitions of the radar system 104 based on context, the disclosed techniques and systems enable the UE 102 to conserve power, improve accuracy, or reduce latency interpreting and responding to radar-based inputs, relative to other techniques and systems for radar-based gesture-recognitions.

Figure 2:
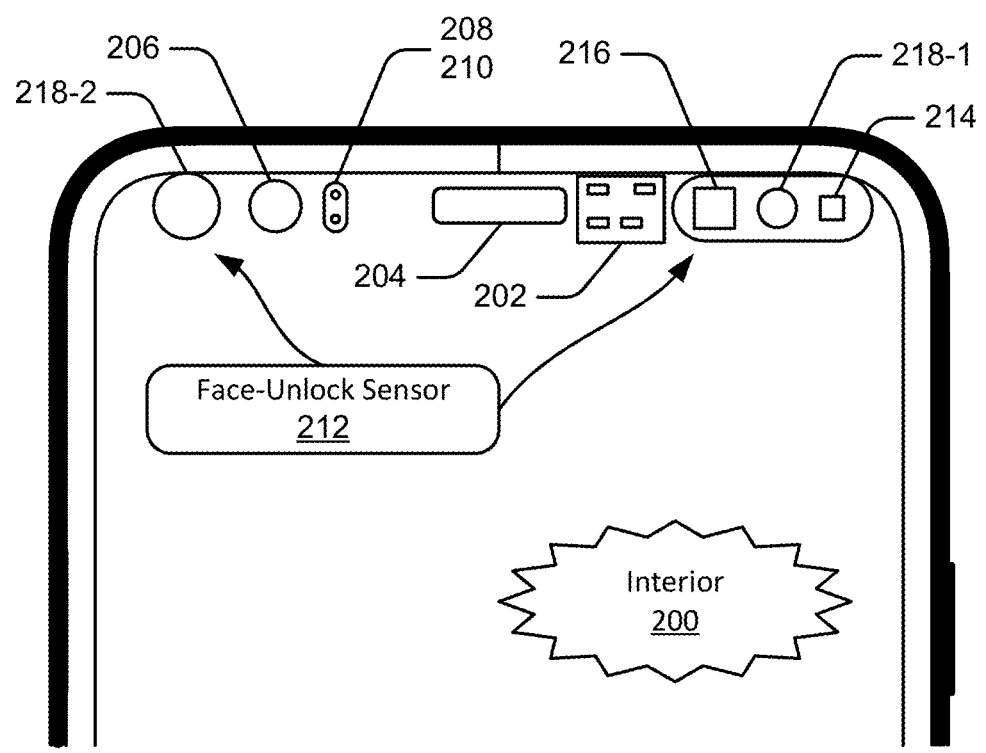
FIG. 2 illustrates an example of the authentication system set forth in FIG. 1.

In more detail, consider one example of the authentication system 114, shown in FIG. 2. This is but one example, as other authentication systems controllable by the state manager 112 are considered, such as password-entry through a touch-sensitive display, radar authentication using the radar system 104, or a finger-print reader, to name just a few.

This example of the authentication system 114 is illustrated showing an interior 200 of the UE 102 (shown as a smartphone). In the depicted configuration, the UE 102 includes a radar integrated circuit 202 of the radar system 104, a speaker 204, a front-facing camera 206, and as examples of the sensors 108, a proximity sensor 208 and an ambient light sensor 210. As further examples of the sensors 108, the UE 102 also includes a face-unlock sensor 212, which includes a near-infrared (NIR) flood illuminator 214 and a near-infrared (NIR) dot projector 216, both of which project infrared or near-infrared light on a user. The face-unlock sensor 212 also includes two NIR cameras 218-1 and 218-2, which are positioned on opposite sides of the UE 102. The NIR cameras 218-1 and 218-2 sense the infrared and near-infrared light that is reflected by the user. This reflected near-infrared light can be used to determine facial features and, with these features, determine if the user is authentic based on comparison with previously-stored facial-feature information. The NIR flood illuminator 214, for example, "floods" an environment with NIR light, which provides, on receiving the reflection from the user (and other objects), an image. This image includes, even in low or no ambient light, the face of a user, and thus can be used to determine facial features. The NIR dot projector 216 provides NIR light reflections that can be analyzed to determine depth of objects, including features of a user's face. Thus, a depth map (e.g., a spectrum depth map) for the user can be created (e.g., previously when setting up facial authentication) and a current depth map can be determined and compared to the stored, previously-created depth map. This depth map aids in preventing authentication of a picture or other two-dimensional rendering of a user's face (rather than the person's actual face).

This mapping of a user's facial features can be stored securely on the UE 102 and, based on a user's preferences, be both secure on the UE 102 and prevented from being made available to external entities.

The authentication system 114 includes the face-unlock sensor 212, but can also include other components, such as the front-facing camera 206, the proximity sensor 208 and the ambient light sensor 210, as well as processors to analyze the data, memory (which may have multiple power states as well) to store, cache, or buffer the sensor data, and so forth.

The face-unlock sensor 212 senses IR (infrared) and NIR (near-infrared) data to perform facial recognition, which is one way in which the techniques may authenticate the user and therefore alter an access state (e.g., to unlock the UE 102) as noted in the methods described below. To conserve power, the face-unlock sensor 212 operates in a low-power state (which can also be simply off) when not in use. In particular, the NIR flood illuminator 214 and the NIR dot projector 216 do not radiate in the off-state. However, a warm-up sequence associated with transitioning from a low or no-power state to an intermediate-power state and/or a high-power state can be used for the NIR flood illuminator 214 and the NIR dot projector 216. By powering up one or both of these components, the latency in authenticating the user can be reduced, sometimes by a half-second or more. Given the tens or even hundreds of times many users authenticate their devices each day, this can save the users time and improve their experience. As noted herein, this time delay is reduced by the radar manager 106 determining that the user is intending to engage with their or their device based on radar data provided by the radar system 104. This is managed by the state manager 112. In effect, the techniques proactively detect the user's intent to engage and initiate the warm-up sequence. The techniques may do so even prior to the user touching the UE 102, though this is not required. Thus, the techniques enable the NIR flood illuminator 214 and the NIR dot projector 216 to be sufficiently powered to be used in authenticating the user, which reduces time spent by the user waiting for facial recognition to complete.

Figure 3:
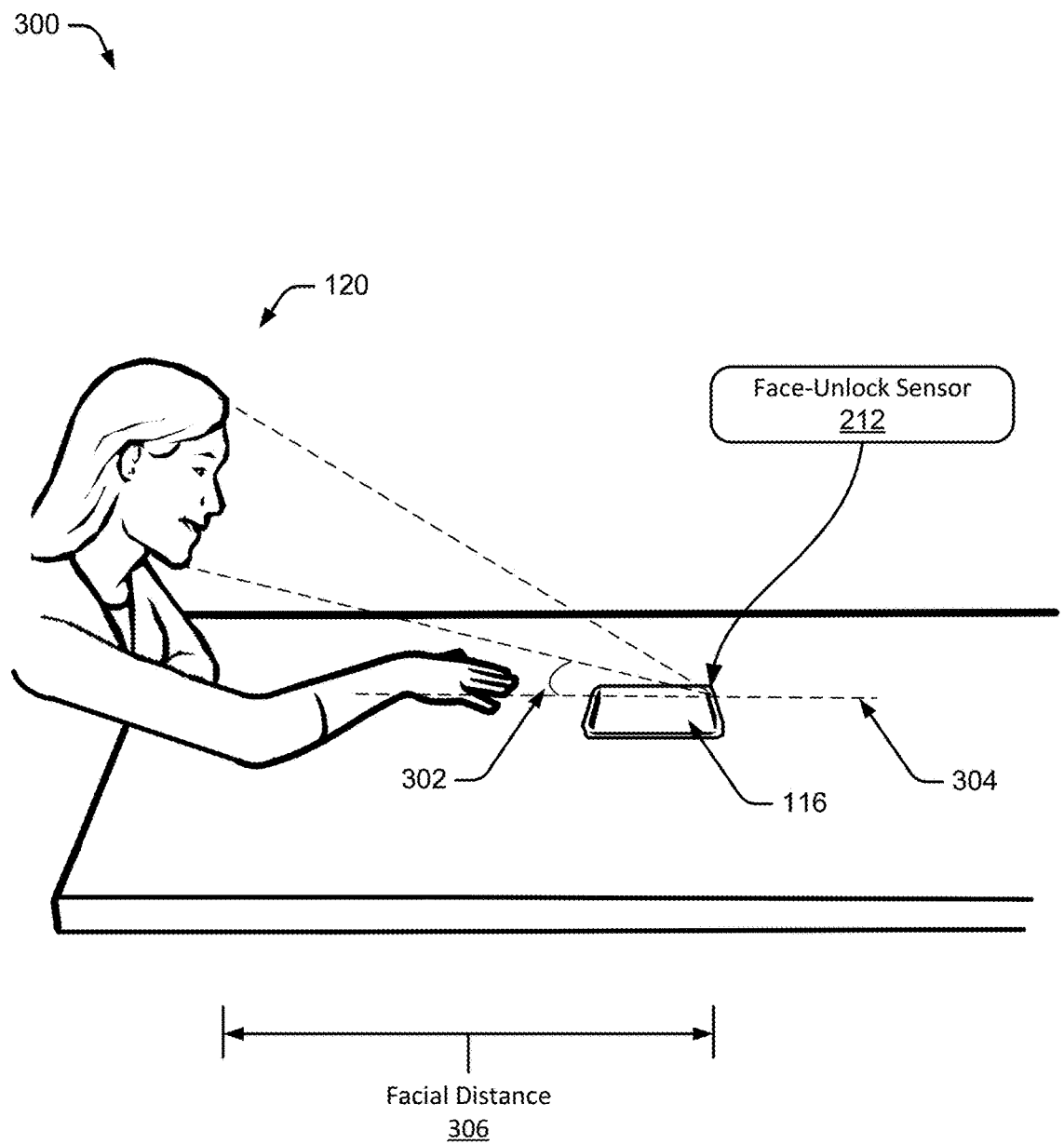
FIG. 3 illustrates an example user authenticated by the authentication system of FIG. 2.

Before moving on to other components in the UE 102, consider an aspect of the face-unlock sensor 212. This example component of the authentication system 114 can authenticate a user using facial recognition in as little as ten degrees relative to the plane of the display 116. Thus, the user need not pick up the phone and turn the sensors to their or their face, such as at an angle of 70 to 110 or 80 to 100 degrees, instead, the authentication system 114, using the face-unlock sensor 212, is configured to authenticate the user before they even picks up the UE 102. This is illustrated in FIG. 3, which shows the user 120, with portions of their face that are used in facial recognition (e.g., their chin, nose, or cheekbones) at an angle, which can be as little as ten degrees relative to plane 304 of the display 116. Also shown, the user 120 is authenticated while having their face more than one meter away from the face-unlock sensor 212, shown at facial distance 306. By so doing, the techniques permit nearly seamless and immediate authentication, even with the UE 102 oriented upside-down or at odd angles.

Figure 4:
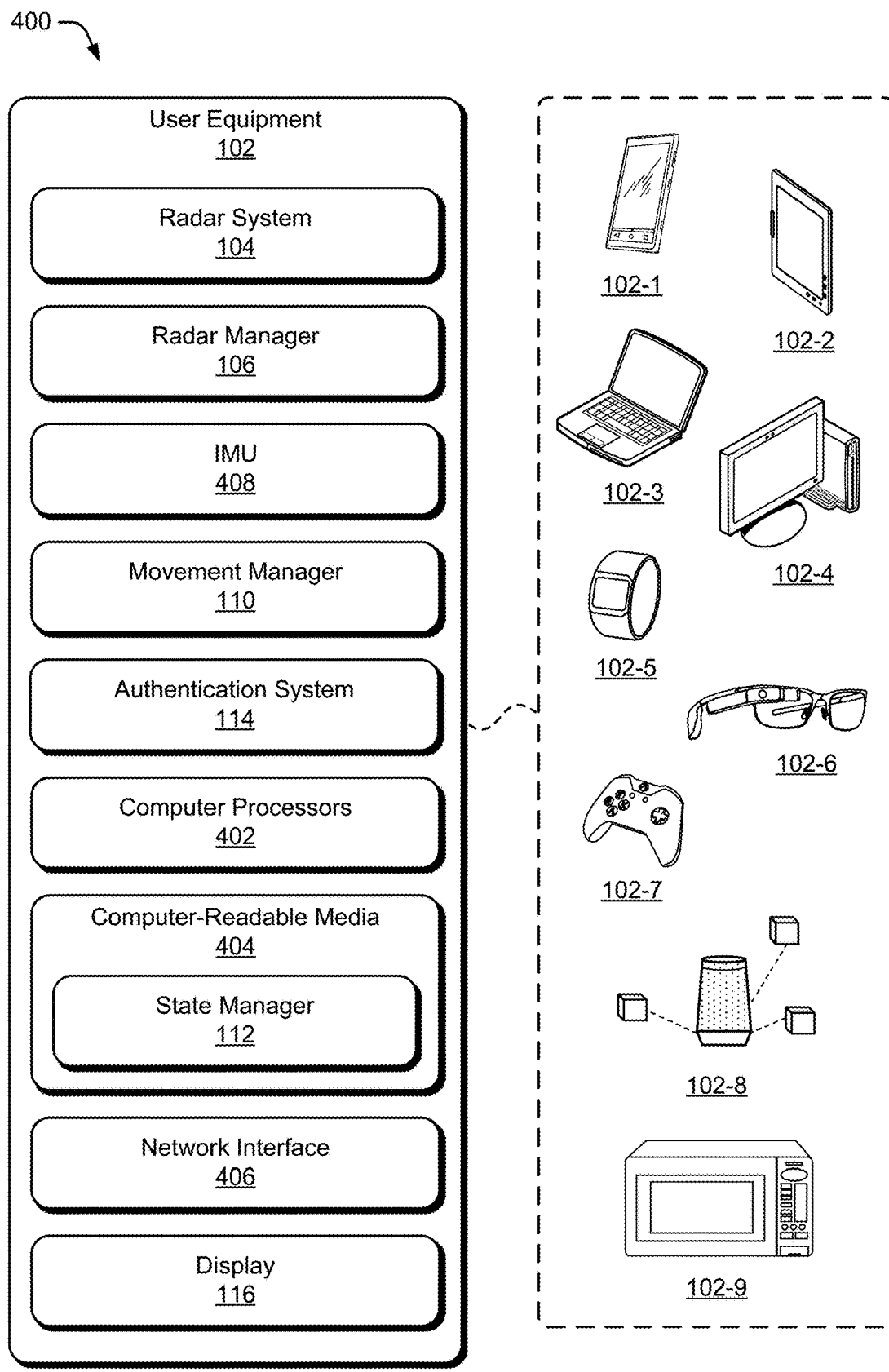
FIG. 4 illustrates an implementation of the user equipment of FIG. 1 that can alter states, including a power state of an authentication system responsive to determinations of a user's intent to engage with a user equipment.

In more detail, consider FIG. 4, which illustrates an example implementation 400 of the UE 102 (including the radar manager 106, the movement manager 110, and the state manager 112) that can implement techniques for authentication management through IMU and radar. The UE 102 of FIG. 4 is illustrated with a variety of example devices, including a UE 102-1, a tablet 102-2, a laptop 102-3, a desktop computer 102-4, a computing watch 102-5, computing spectacles 102-6, a gaming system 102-7, a home-automation and control system 102-8, and a microwave 102-9. The UE 102 can also include other devices, such as televisions, entertainment systems, audio systems, automobiles, drones, trackpads, drawing pads, netbooks, e-readers, home security systems, and other home appliances. Note that the UE 102 can be wearable, non-wearable but mobile, or relatively immobile (e.g., desktops and appliances).

The UE 102 includes an inertial measurement unit 408 as an example of the sensors 108 described above. Exemplary overall lateral dimensions of the UE 102 can be, for example, approximately eight centimeters by approximately fifteen centimeters. Exemplary footprints of the radar system 104 can be even more limited, such as approximately four millimeters by six millimeters with antennas included. The requirement of such a limited footprint for the radar system 104, which is needed to accommodate the many other desirable features of the UE 102 in such a space-limited package combined with power and processing limitations, can lead to compromises in the accuracy and efficacy of radar-based gesture-recognition, at least some of which can be overcome in view of the teachings herein.

The UE 102 also includes one or more computer processors 402 and one or more computer-readable media 404, which includes memory media and storage media. Applications and/or an operating system (not shown) implemented as computer-readable instructions on the computer-readable media 404 can be executed by the computer processors 402 to provide some or all of the functionalities described herein, such as some or all of the functions of the radar manager 106, the movement manager 110, and the state manager 112 (shown within the computer-readable media 404, though this is not required).

The UE 102 may also include a network interface 406. The UE 102 can use the network interface 406 for communicating data over wired, wireless, or optical networks. By way of example and not limitation, the network interface 406 may communicate data over a local-area-network (LAN), a wireless local-area-network (WLAN), a personalarea-network (PAN), a wide-area-network (WAN), an intranet, the Internet, a peer-to-peer network, point-to-point network, or a mesh network.

In aspects, the radar system 104 is implemented at least partially in hardware. Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 operates as a monostatic radar by transmitting and receiving its own radar signals. In some implementations, the radar system 104 may also cooperate with other radar systems 104 that are within an external environment to implement a bistatic radar, a multi-static radar, or a network radar. Constraints or limitations of the UE 102, however, may impact a design of the radar system 104. The UE 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below.

Figure 5:
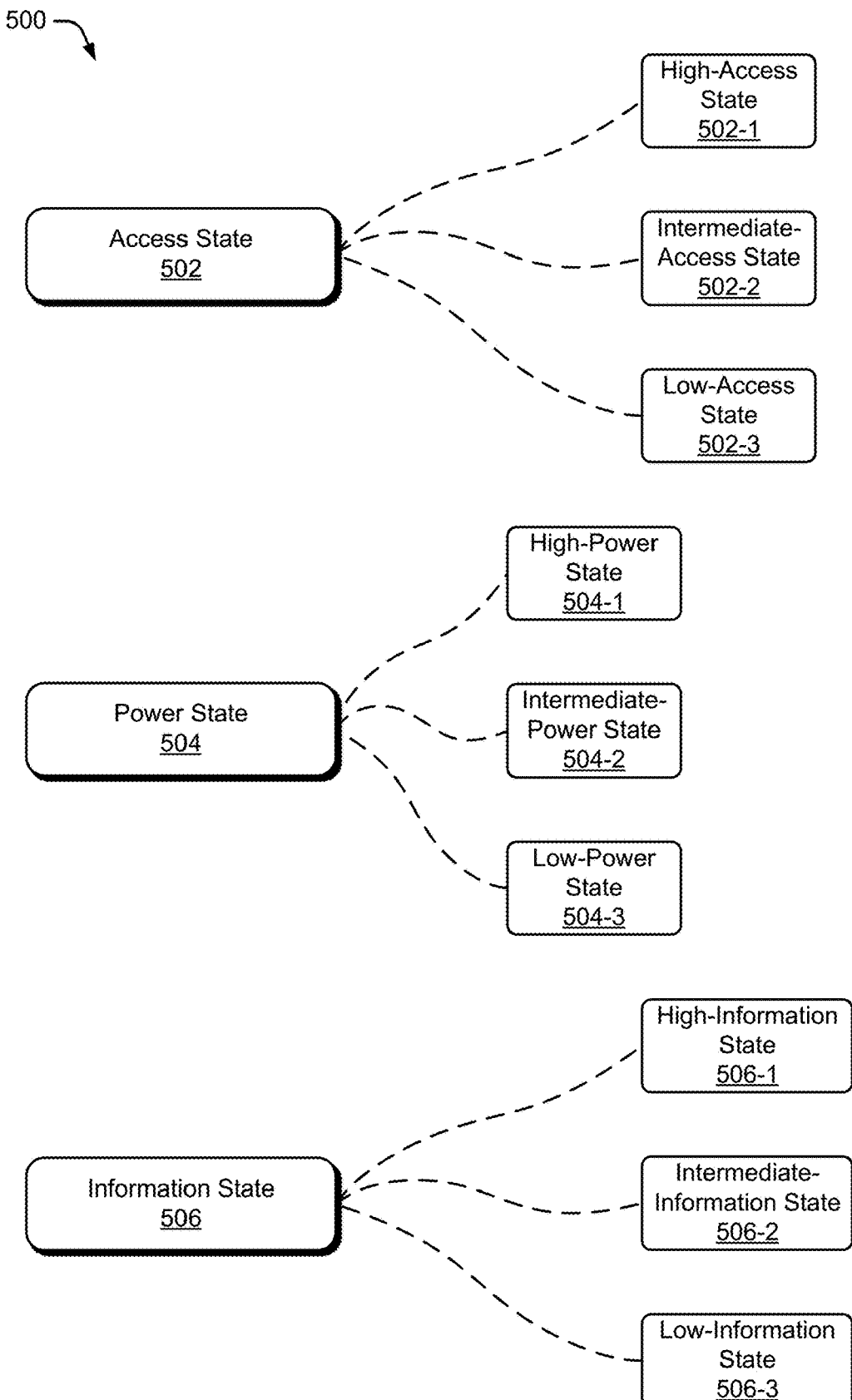
FIG. 5 illustrates example information, power, and access states of a user equipment.

Prior to setting out additional example ways in which the state manager 112 may act, consider FIG. 5, which illustrates the many information, power, and access states in which the UE 102 may operate, and which can be managed by the state manager 112.

FIG. 5 illustrates access, information, and power states in which the UE 102 may operate, each of which can be managed by the described techniques. These example levels and types of device states 500 are shown in three levels of granularity for visual brevity, though many levels of each are contemplated for access state 502, power state 504, and information state 506. The access state 502 is shown with three examples levels of granularity, high-access state 502-1, intermediate-access state 502-2, and low-access state 502-3. Similarly, the power state 504 is shown three examples levels of granularity, high-power state 504-1, intermediate-power state 504-2, and low-power state 504-3. Likewise, the information state 506 is shown three examples levels of granularity, high-information state 506-1, intermediate-information state 506-2, and low-information state 506-3.

In more detail, the access state 502 is concerned with the access rights available to a user of the device to the data, applications, and functions of the UE 102. This access can be high, sometimes referred to as an "unlocked" state for the UE 102. This high access level can include simply the applications and functions of the device, or may also include access to various accounts, such as bank accounts, social media accounts, and so forth that are accessible through the UE 102. Many computing devices, such as the UE 102, require authentication to provide high access, such as the high-access state 502-1. Various intermediate levels of access (e.g., 502-2) can be permitted by the UE 102, however, such as a state permitting a user to access some but not all accounts, services, or components of the UE 102. Examples include allowing a user to take pictures but not to access previously-captured pictures. Other examples include allowing the user to answer a telephone call but not access a contact list when making a telephone call. These are but a few of the many intermediate rights that the UE 102 can permit, shown with the intermediate-access state 502-2. Lastly, the access state 502 can refrain from permitting access, shown as the low-access state 502-3. In this case the device may be on, send notifications like an alarm to wake up a user, and so forth, but not permit access to functions of the UE 102 (or the UE 102 may simply be off, and thus permit no access).

The power state 504 is shown with three examples levels of granularity, the high-power state 504-1, the intermediate-power state 504-2, and the low-power state 504-3. The power state 504 is concerned with an amount of power to one or more components of the UE 102, such as the radar system 104, the display 116, or other power-consuming components, such as processors, cameras, microphone, voice assistant, touchscreen, sensors, radar, and components that are part of the authentication system 114 (which may include the previous components listed as well). In the context of powering up a component, as well as the power states 504 generally, the terms power, powering up, increasing power, reducing power, and so forth can include, control of a power-management integrated circuit (PMIC); managing power rails extending from the PMIC; opening and closing switches between a power rail, the PMIC, and one or more circuit components (e.g., the mentioned NIR components, cameras, displays, and radar); and providing a supply voltage to accurately and safely operate a component, which may include ramping or distributing an applied voltage or managing current in-rush.

Regarding the radar system 104, the power state 504 can be reduced by collecting radar data at different duty cycles (e.g., lower frequencies may use less power and higher frequencies may use more power), turning various components off when the components are not active, or adjusting a power amplification level. By so doing, the radar system 104 may use approximately 90 mW of power at the high-power state 504-1, 30 to 60 mW at the intermediate-power state 504-2, or less than 30 mW at the low-power state 504-3 (e.g., the radar system 104 can operate from 2 to 20 mW while still providing some usable radar data, such as user presence). Each of these levels of power usage permit different resolutions and distance. Additional details regarding power management of the radar system 104 (and the UE 102) are described with reference to FIG. 6-1.

In the context of altering states noted above, the state manager 112, based on the determinations by the radar manager 106 and the movement manager 110, may power-up or power-down various components of the UE 102.

For example, the state manager 112 can alter the power of the authentication system 114 or the display 116 from a lower-power state (e.g., the low-power state 504-3 to the intermediate-power state 504-2 or either of these to the high-power state 504-1). By so doing, the UE 102 may more-quickly or more-easily engage with a user or authenticate the user. Thus, the state manager 112 may alter the power-state 504 to be a higher or lower power than is currently the case for that system of the UE 102 or for particular power-consuming entities associated with the UE 102. Example components are described further as part of FIG. 2 above, including powering up or down the face-unlock sensor 212 and its components, the NIR flood illuminator 214 and the NIR dot projector 216, as well as the NIR cameras 218-1 and 218-2, reducing power to these components, a display, microphone, touch-input sensor, and so forth.

The third example state of the UE 102 is the information state 506, which is illustrated with the high-information state 506-1, the intermediate-information state 506-2, and the low-information state 506-3. In more detail, the information state 506 is concerned with an amount of information provided to a user, e.g., the user 120 of FIG. 1. In the context of notifications, the high-information state 506-1 provides a highest level of information, and generally assumes that the UE 102 is unlocked or otherwise authenticated or has a user preference for providing high levels of information even without authentication. Examples include, for the high-information state 506-1, showing a caller's name, number, and even associated image when a call is received. Similarly, when a text or email is received, or other type of message, the content is automatically presented through the display 116 or audio speakers, a peripheral, and so forth. This assumes a high-level of engagement, though a user's preferences can determine what engagement is required. Here it is assumed that there is some correlation between the user's engagement and the amount of information provided, and therefore, the techniques, by determining engagement, can tailor the information presented to that determination. Examples of reduced information, e.g., the intermediate-information state 506-2, include presenting a ring tone when a call is received but not the caller's name/identification, indicating that text message or email has been received but only the subject line, or only the address, or part of the content in the body but not all of it, and so forth. The low-information state 506-3 presents little to no information that is personally associated with the user 120, but can include information that is generic or widely considered common knowledge or non-sensitive, such as the display 116 showing a current date, time, weather condition, battery-power status, or that the UE 102 is on. Other examples of the low-information state 506-3 include a blank or black screen when a text message is received with an audible "ping" indicating only that a message has been received, or a ring tone for a call, but not the name, number, or other information about the caller.

Figures 1, 6:
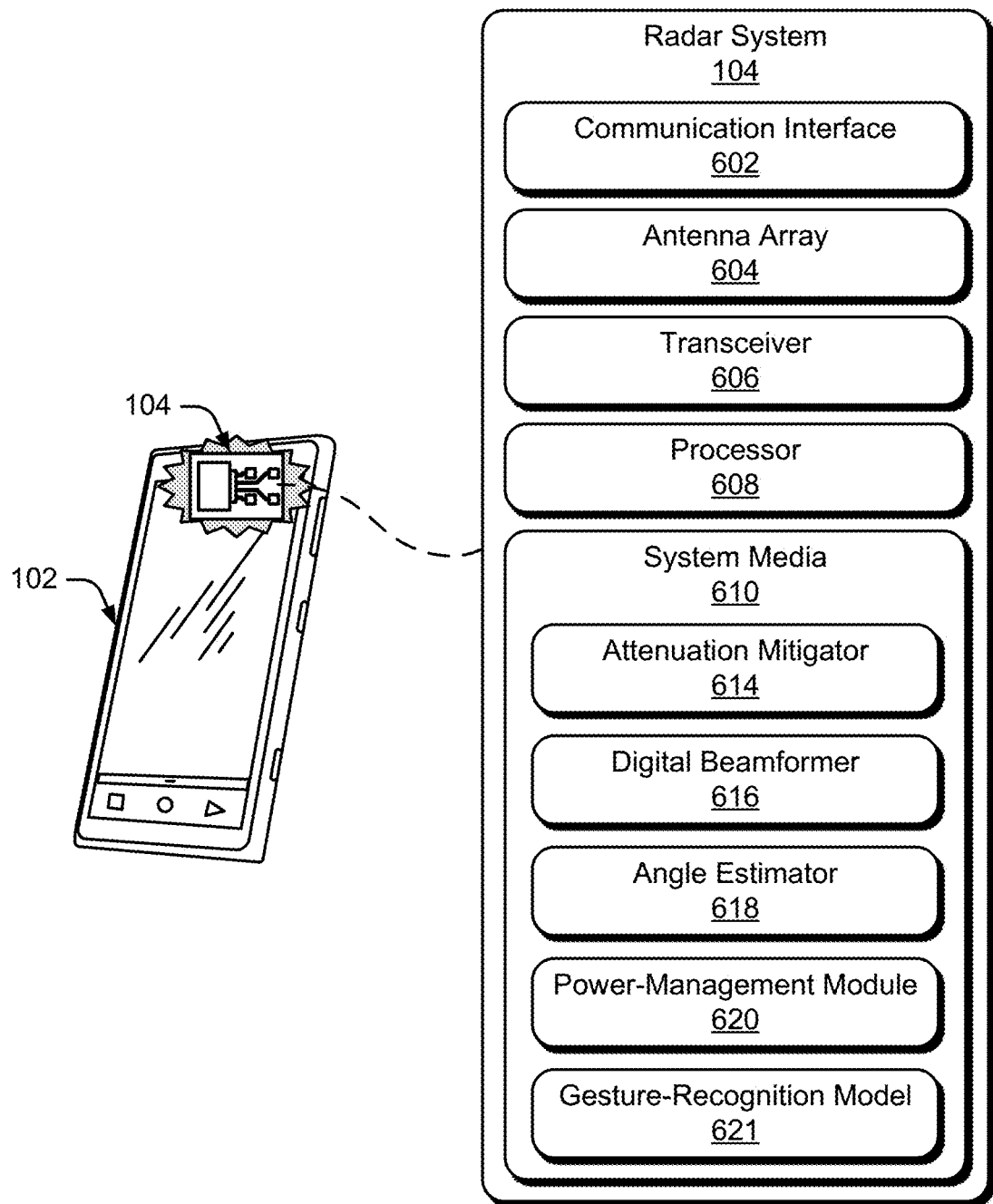
Figure 6:
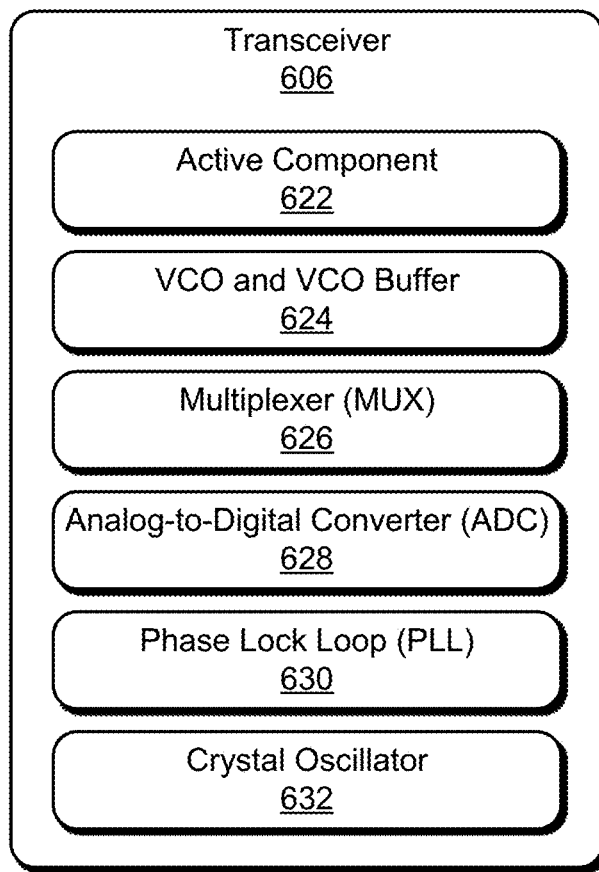
Figure 2:
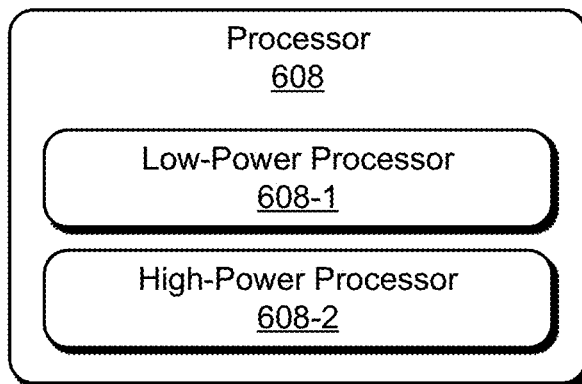
Figure 6:
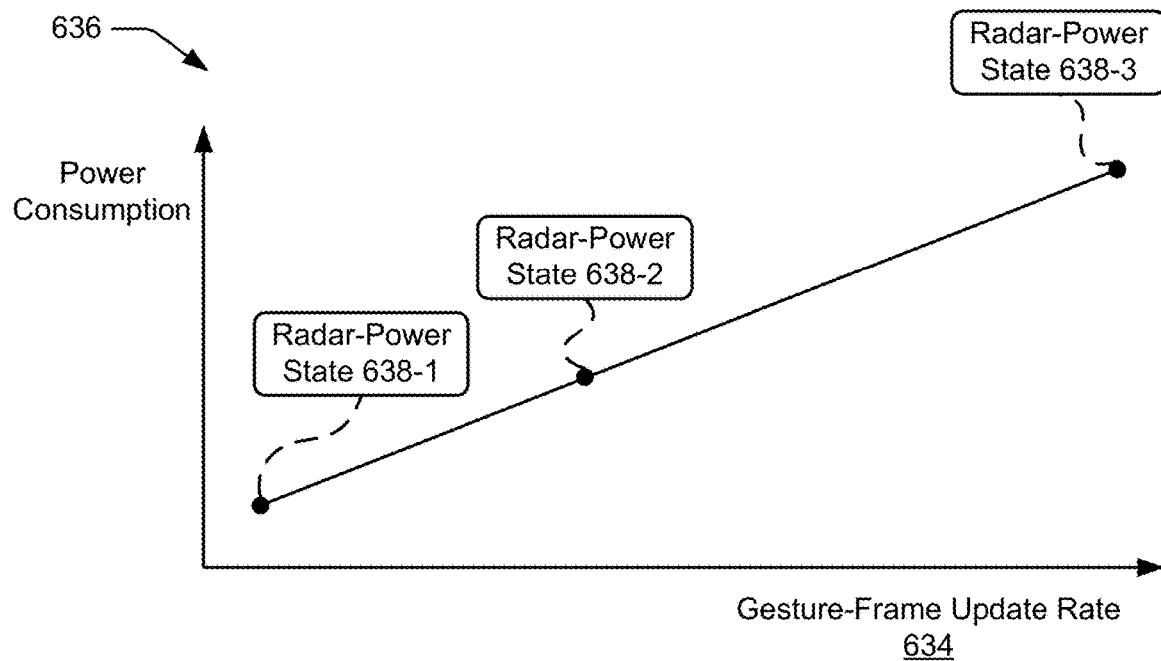
Figure 3:
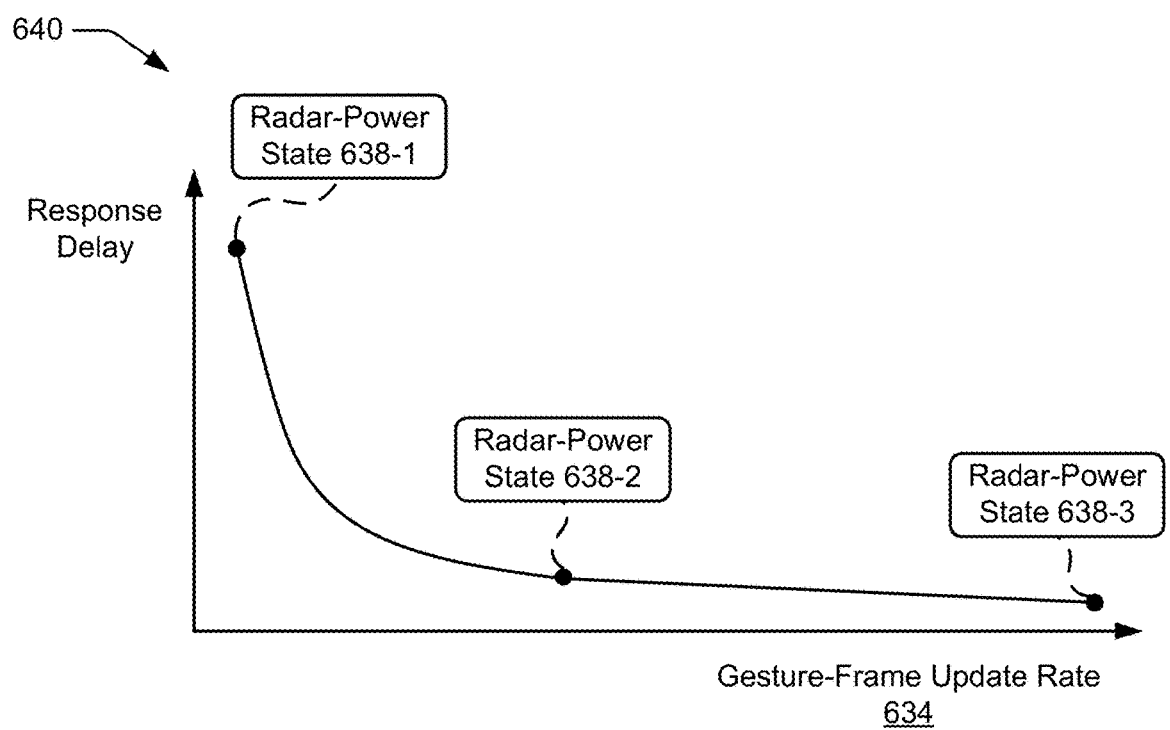
Figures 4, 6:
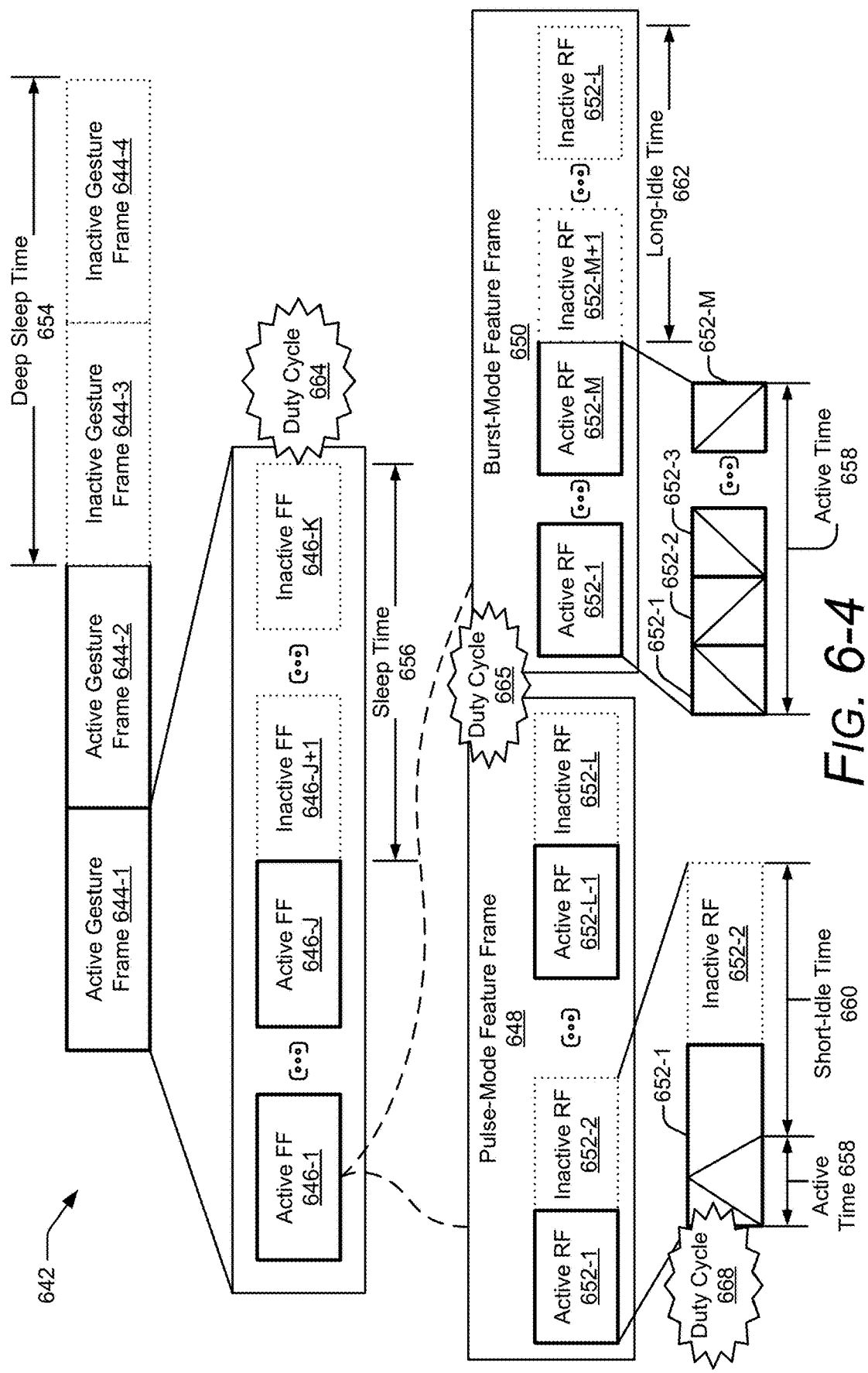

FIG. 6-1 illustrates an example implementation 600 of the radar system 104. In the example 600, the radar system 104 includes at least one of each of the following components: a communication interface 602, an antenna array 604, a transceiver 606, a processor 608, and a system media 610 (e.g., one or more computer-readable storage media). The processor 608 can be implemented as a digital signal processor, a controller, an application processor, another processor (e.g., the computer processors 402 of the UE 102) or some combination thereof. The system media 610, which may be included within, or be separate from, the computer-readable media 404 of the UE 102, includes one or more of the following modules: an attenuation mitigator 614, a digital beamformer 616, an angle estimator 618, a power-management module 620, or a gesture-recognition module 621. These modules can compensate for, or mitigate the effects of, integrating the radar system 104 within the UE 102, thereby enabling the radar system 104 to recognize small or complex gestures, distinguish between different orientations of the user (e.g., "reach"), continuously monitor an external environment, or realize a target false-alarm rate. With these features, the radar system 104 can be implemented within a variety of different devices, such as the devices illustrated in FIG. 4.

Using the communication interface 602, the radar system 104 can provide radar data to the radar manager 106. The communication interface 602 may be a wireless or wired interface based on the radar system 104 being implemented separate from, or integrated within, the UE 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the radar manager 106 for providing a user's intent to engage, disengage, or maintain engagement to the state manager 112.

Figure 7:
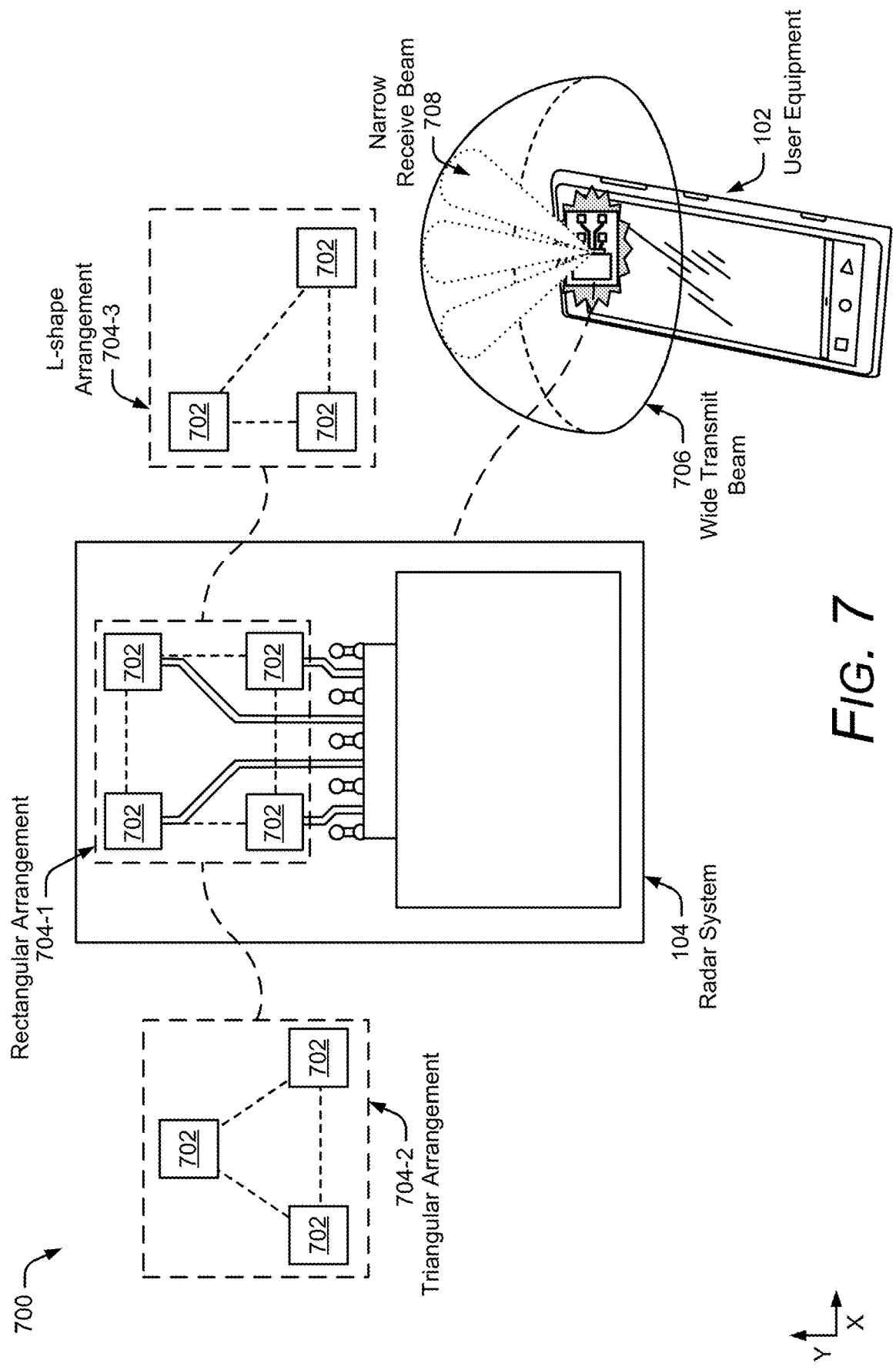
FIG. 7 illustrates example arrangements of receiving antenna elements for the radar system of FIG. 6-1.

The antenna array 604 includes at least one transmitting antenna element (not shown) and at least two receiving antenna elements (as shown in FIG. 7). In some cases, the antenna array 604 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 7.

FIG. 6-2 illustrates an example transceiver 606 and processor 608. The transceiver 606 includes multiple components that can be individually turned on or off via the power-management module 620 in accordance with an operational state of the radar system 104. Note that the power-management module 620 can be separate, integrated with, or under the control of the state manager 112, such as in cases where the state manager 112 is powering up or down components (e.g., the authentication system 114) used to authenticate a user. The transceiver 606 is shown to include at least one of each of the following components: an active component 622, a voltage-controlled oscillator (VCO) and voltage-controlled buffer 624, a multiplexer 626, an analog-to-digital converter (ADC) 628, a phase lock loop (PLL) 630, and a crystal oscillator 632. If turned on, each of these components consume power, even if the radar system 104 is not actively using these components to transmit or receive radar signals. The active component 622, for example, can include an amplifier or filter that is coupled to a supply voltage. The VCO 624 generates a frequency-modulated radar signal based on a control voltage that is provided by the PLL 630. The crystal oscillator 632 generates a reference signal for signal generation, frequency conversion (e.g., upconversion or downconversion), or timing operations within the radar system 104. By turning these components on or off, the power-management module 620 enables the radar system 104 to quickly switch between active and inactive operational states and conserve power during various inactive time periods. These inactive time periods may be on the order of microseconds (μs), milliseconds (ms), or seconds (s).

The processor 608 is shown to include multiple processors that consume different amounts of power, such as a low-power processor 608-1 and a high-power processor 608-2. As an example, the low-power processor 608-1 can include a processor that is embedded within the radar system 104 and the high-power processor can include the computer processor 402 or some other processor that is external to the radar system 104. The differences in power consumption can result from different amounts of available memory or computational ability. For instance, the low-power processor 608-1 may utilize less memory, perform fewer computations, or utilize simpler algorithms relative to the high-power processor 608-2. Despite these limitations, the low-power processor 608-1 can process data for less-complex radar-based applications, such as proximity detection or motion detection (based on radar data rather than inertial data). The high-power processor 608-2, in contrast, may utilize a large amount of memory, perform a large amount of computations, or execute complex signal processing, tracking, or machine-learning algorithms. The high-power processor 608-2 may process data for high-profile radar-based applications, such as gesture-recognition, facial recognition (for the authentication system 114), and provide accurate, high-resolution data through the resolution of angular ambiguities or distinguishing of multiple users and features thereof.

To conserve power, the power-management module 620 can control whether the low-power processor 608-1 or the high-power processor 608-2 are used to process the radar data. In some cases, the low-power processor 608-1 can perform a portion of the analysis and pass data onto the high-power processor 608-2. Example data may include a clutter map, raw or minimally processed radar data (e.g., in-phase and quadrature data or range-Doppler data), or digital beamforming data. The low-power processor 608-1 may also perform some low-level analysis to determine whether there is anything of interest in the environment for the high-power processor 608-2 to analyze. In this way, power can be conserved by limiting operation of the high-power processor 608-2 while utilizing the high-power processor 608-2 for situations in which high-fidelity or accurate radar data is requested by the radar-based application. Other factors that can impact power consumption within the radar system 104 are further described with respect to FIG. 6-1.

The gesture-recognition model 621 interprets gestures, such as touch-independent gestures, from radar data obtained by the radar system 104. The gestures can be two-dimensional gestures (e.g., performed near a surface where the radar system 104 outputs microwave emissions). The gestures may be three-dimensional gestures performed in the air.

Based on radar data, the gesture-recognition model 621 identifies cues, shapes and signs a user makes with their body, including their fingers, hands, eyes, head, mouth, etc. The gesture-recognition model 621 matches the user's movements to matching shapes, signs, and movements of predetermined gestures. In response to determining that the radar data matches a particular gesture, the gesture-recognition model 621 outputs an indication of the gesture to other components to perform a function, for example, to control an operating system or application function such as authenticating the user 120.

The gesture-recognition model 621 may be a machine-learned model, such as a neural network, that is trained to identify touch-independent gestures from radar data. For example, the gesture-recognition model 621 may be trained using training data that includes samples of radar data and corresponding portions of gestures that match the radar data. Based on the training data, the gesture-recognition model 621 determines rules to apply to samples of radar data received by the radar system 104 so that when similar radar data is received, the corresponding portions of gestures are identified and used to construct a gesture prediction. In executing the rules, the gesture-recognition model 621 can output an indication of a recognized gesture predicted from the radar data.

In some cases, the indication of the recognized gesture may be accompanied by a confidence or score. The confidence indicates a degree of confidence the radar data 104 has applied to the identified gesture. The gesture-recognition model 621 may adjust the confidence in an identified gesture based on the context. For instance, the gesture-recognition model 621 applies a high-confidence when detecting gestures in an environment where the user is not moving as opposed to a low-confidence when detecting similar gestures in an environment where the user is moving. The gesture-recognition model 621 may apply a low-confidence when detecting gestures in an environment where a large object is occluding the radar system 104 as opposed to a high-confidence when detecting similar gestures in an environment where the user is viewing the UE 102. An application or other component that relies on a detected gesture may discard or process the gesture depending on the confidence or score associated with the gesture. The described techniques and systems may apply the confidence or score to gate the gesture, so the gesture is discarded and not used to perform a function.

These and other capabilities and configurations, as well as ways in which entities of FIGS. 1, 2, 4, and 6-9 act and interact, are set forth in greater detail below. These entities may be further divided, combined, and so on. The environment 100 of FIG. 1 and the detailed illustrations of FIG. 2 through FIG. 9 illustrate some of many possible environments and devices capable of employing the described techniques. FIGS. 6-9 describe additional details and features of the radar system 104. In FIGS. 6-9, the radar system 104 is described in the context of the UE 102, but as noted above, the applicability of the features and advantages of the described systems and techniques are not necessarily so limited, and other embodiments involving other types of electronic devices may also be within the scope of the present teachings.

FIG. 7 illustrates example arrangements 700 of receiving antenna elements 702. If the antenna array 604 includes at least four receiving antenna elements 702, for example, the receiving antenna elements 702 can be arranged in a rectangular arrangement 704-1 as depicted in the middle of FIG. 7. Alternatively, a triangular arrangement 704-2 or an L-shape arrangement 704-3 may be used if the antenna array 604 includes at least three receiving antenna elements 702.

Due to a size or layout constraint of the UE 102, an element spacing between the receiving antenna elements 702 or a quantity of the receiving antenna elements 702 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 8 millimeters (mm) and an element spacing of 6.5 mm (e.g., the element spacing being 90% of the wavelength). Consequently, the conventional radar may be unable to detect targets that are beyond the 45-degree limits of the field of view. In contrast, the radar system 104 includes the digital beamformer 616 and the angle estimator 618, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 604, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 706. Either of these techniques enable the radar system 104 to illuminate a large volume of space. To achieve target angular accuracies and angular resolutions, however, the receiving antenna elements 702 and the digital beamformer 616 can be used to generate thousands of narrow and steered beams (e.g., 3000 beams, 7000 beams, or 9000 beams), such as the narrow receive beam 708. In this way, the radar system 104 can efficiently monitor the external environment and accurately determine arrival angles of reflections within the external environment.

Returning to FIG. 6-1, the transceiver 606 includes circuitry and logic for transmitting and receiving radar signals via the antenna array 604. Components of the transceiver 606 can include amplifiers, mixers, switches, analog-to-digital converters, filters, and so forth for conditioning the radar signals. The transceiver 606 can also include logic to perform in-phase/quadrature (I/Q) operations, such as modulation or demodulation. The transceiver 606 can be configured for continuous wave radar operations or pulsed radar operations. A variety of modulations can be used to produce the radar signals, including linear frequency modulations, triangular frequency modulations, stepped frequency modulations, or phase modulations.

The transceiver 606 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 618 to resolve angular ambiguities. The attenuation mitigator 614 or the angle estimator 618 may cause the transceiver 606 to utilize one or more frequency sub-spectra to improve performance of the radar system 104, as further described with respect to FIGS. 8 and 9. Some embodiments of the techniques are particularly advantageous, such as when the UE 102 is a handheld smartphone, the radar signals are in the 57 Ghz-64 Ghz band, a peak effective isotropic radiated power (EIRP) is in the range of 10 dBm-20 dBm (10 mW-100 mW), and an average power-spectral density is about 13 dBm/MHz, which has been found to suitably address radiation health and co-existence issues while also providing a nicely-sized "bubble" of radar detection (e.g., at least one meter and often up to or exceeding two meters in extent) near-around the smartphone and the user within which the described methods for authentication management through IMU and radar provided particularly good time-saving convenience while conserving power.

A power-management module 620 manages power usage to balance performance and power consumption. For example, the power-management module 620 communicates with the radar manager 106 to cause the radar system 104 to collect data using a predefined radar-power state. Each predefined radar-power state can be associated with a particular framing structure, a particular transmit power level, or particular hardware (e.g., the low-power processor 608-1 or the high-power processor 608-2 of FIG. 6-2). Adjusting one or more of these affects the radar system's 104 power consumption. Reducing power consumption, however, affects performance, such as a gesture-frame update rate and response delay, which are described below.

FIG. 6-3 illustrates an example relationship between power consumption, a gesture-frame update rate 634, and a response delay. In graph 636, radar-power states 638-1, 638-2, and 638-3 are associated with different levels of power consumption and different gesture-frame update rates 634. The gesture-frame update rate 634 represents how often the radar system 104 actively monitors the external environment by transmitting and receiving one or more radar signals. Generally speaking, the power consumption is proportional to the gesture-frame update rate 634. As such, higher gesture-frame update rates 634 result in larger amounts of power being consumed by the radar system 104.

In graph 636, the radar-power state 638-1 utilizes a smallest amount of power whereas the radar-power state 638-3 consumes a largest amount of power. As an example, the radar-power state 638-1 consumes power on the order of a few milliwatts (mW) (e.g., between approximately 2 mW and 4 mW) whereas the radar-power state 638-3 consumes power on the order of several milliwatts (e.g., between approximately 6 mW and 20 mW). In terms of the gesture-frame update rate 634, the radar-power state 638-1 uses an update rate that is on the order of a few hertz (e.g., approximately 1 Hz or less than 5 Hz) while the radar-power state 638-3 uses a gesture-frame update rate 634 that is on the order of tens of hertz (e.g., approximately 20 Hz or greater than 10 Hz).

Graph 640 depicts a relationship between the response delay and the gesture-frame update rate 634 for the different radar-power states 638-1 to 638-3. Generally speaking, the response delay is inversely-proportional to both the gesture-frame update rate 634 and the power consumption. In particular, the response delay exponentially decreases while the gesture-frame update rate 634 increases. The response delay associated with the radar-power state 638-1 may be on the order of hundreds of milliseconds (ms) (e.g., 1000 ms or more than 200 ms) while the response delay associated with the radar-power state 638-3 may be on the order of several milliseconds (e.g., 50 ms or less than 100 ms). For the radar-power state 638-2, the power consumption, gesture-frame update rate 634, and response delay are between that of the radar-power state 638-1 and the radar-power state 638-3. For instance, the radar-power state's 638-2 power consumption is approximately 5 mW, the gesture-frame update rate is approximately 8 Hz, and the response delay is between approximately 100 ms and 200 ms.

Instead of operating at either the radar-power state 638-1 or the radar-power state 638-3, the power-management module 620 dynamically switches between the radar-power states 638-1, 638-2, and 638-3 (and sub-states between each of these radar-power states 638) such that the response delay and the power consumption are managed together based on the activity within the environment. As an example, the power-management module 620 activates the radar-power state 638-1 to monitor the external environment or detect an approaching user. Later in time, the power-management module 620 activates the radar-power state 638-3 if the radar system 104 determines the user is showing an intent to engage or may be starting to do so, or starting to perform a gesture. Different triggers may cause the power-management module 620 to switch between the different radar-power states 638-1 through 638-3. Example triggers include motion or the lack of motion, appearance or disappearance of the user, the user moving into or out of a designated region (e.g., a region defined by range, azimuth, or elevation), a change in velocity of a motion associated with the user, an intent to engage determined by the radar manager 106 (e.g., a "reach" though some intents to engage require additional power, such as facial feature tracking), or a change in reflected signal strength (e.g., due to changes in radar cross section). In general, the triggers that indicate a lower probability of the user interacting with the UE 102 or a preference to collect data using a longer response delay may cause the radar-power state 638-1 to be activated to conserve power.

In general, the power-management module 620 determines when and how power can be conserved, and incrementally adjusts power consumption to enable the radar system 104 to operate within power limitations of the UE 102. In some cases, the power-management module 620 may monitor an amount of available power remaining and adjust operations of the radar system 104 accordingly (e.g., due to a low battery). For example, if the remaining amount of power is low, the power-management module 620 may continue operating in the radar-power state 638-1 instead of switching to either of the radar-power states 638-2 or 638-3.

Each power state 638-1 to 638-3 can be associated with a particular framing structure. The framing structure specifies a configuration, scheduling, and signal characteristics associated with the transmission and reception of the radar signals. In general, the framing structure is set up such that the appropriate radar data can be collected based on the external environment. The framing structure can be customized to facilitate collection of different types of radar data for different applications (e.g., proximity detection, feature recognition, or gesture recognition). During inactive times throughout each level of the framing structure, the power-management module 620 can turn off the components within the transceiver 606 in FIG. 6-2 to conserve power. An example framing structure is further described with respect to FIG. 6-4.

FIG. 6-4 illustrates an example framing structure 642. In the depicted configuration, the framing structure 642 includes three different types of frames. At a top level, the framing structure 642 includes a sequence of gesture frames 644, which can be in the active state or the inactive state. Generally speaking, the active state consumes a larger amount of power relative to the inactive state. At an intermediate level, the framing structure 642 includes a sequence of feature frames (FF) 646, which can similarly be in the active state or the inactive state. Different types of feature frames include a pulse-mode feature frame 648 (shown at the bottom-left of FIG. 6-4) and a burst-mode feature frame 650 (shown at the bottom-right of FIG. 6-4). At a low level, the framing structure 642 includes a sequence of radar frames (RF) 652, which can also be in the active state or the inactive state.

The radar system 104 transmits and receives a radar signal during an active radar frame (RF) 652. In some situations, the radar frames 652 are individually analyzed for basic radar operations, such as search and track, clutter-map generation, user location determination, and so forth. Radar data collected during each active radar frame 652 can be saved to a buffer after completion of the radar frame 652 or provided directly to the processor 608 of FIG. 6-1.

The radar system 104 analyzes the radar data across multiple radar frames 652 (e.g., across a group of radar frames 652 associated with an active feature frame 646) to identify a particular feature associated with one or more gestures. Example types of features include a particular type of motion, a motion associated with a particular appendage (e.g., a hand or individual fingers), and a feature associated with different portions of the gesture. To recognize a gesture performed by the user 120 during an active gesture frame 644, the radar system 104 analyzes the radar data associated with one or more active feature frames 646.

Depending upon the type of gesture, a duration of the gesture frame 644 may be on the order of milliseconds or seconds (e.g., between approximately 10 ms and 10 s). After the active gesture frames 644 occur, the radar system 104 is inactive, as shown by inactive gesture frames 644-3 and 644-4. A duration of the inactive gesture frames 644 is characterized by a deep sleep time 654, which may be on the order of tens of milliseconds or more (e.g., greater than 50 ms). In an example implementation, the radar system 104 can turn off all of the components within the transceiver 606 to conserve power during the deep sleep time 654.

In the depicted framing structure 642, each gesture frame 644 includes K feature frames 646, where K is a positive integer. If the gesture frame 644 is in the inactive state, all of the feature frames 646 associated with that gesture frame 644 are also in the inactive state. In contrast, an active gesture frame 644 includes J active feature frames 646 and K-J inactive feature frames 646, where J is a positive integer that is less than or equal to K. A quantity of feature frames 646 can be based on a complexity of the gesture and may include a few to a hundred feature frames 646 (e.g., K may equal 2, 10, 30, 60, or 100). A duration of each feature frame 646 may be on the order of milliseconds (e.g., between approximately 1 ms and 50 ms).

To conserve power, the active feature frames 646-1 to 646-J occur prior to the inactive feature frames 646-(J+1) to 646-K. A duration of the inactive feature frames 646-(J+1) to 646-K is characterized by a sleep time 656. In this way, the inactive feature frames 646-(J+1) to 646-K are consecutively executed such that the radar system 104 can be in a powered-down state for a longer duration relative to other techniques that interleave the inactive feature frames 646-(J+1) to 646-K with the active feature frames 646-1 to 646-J. Generally speaking, increasing a duration of the sleep time 656 enables the radar system 104 to turn off components within the transceiver 606 that require longer start-up times.

Each feature frame 646 includes L radar frames 652, where L is a positive integer that may or may not be equal to J or K. In some implementations, a quantity of radar frames 652 may vary across different feature frames 646 and may comprise a few frames or hundreds of frames (e.g., L may equal 5, 15, 30, 100, or 500). A duration of a radar frame 652 may be on the order of tens or thousands of microseconds (e.g., between approximately 30 µs and 5 ms). The radar frames 652 within a particular feature frame 646 can be customized for a predetermined detection range, range resolution, or Doppler sensitivity, which facilitates detection of a particular feature and gesture. For example, the radar frames 652 may utilize a particular type of modulation, bandwidth, frequency, transmit power, or timing. If the feature frame 646 is in the inactive state, all of the radar frames 652 associated with that feature frame 646 are also in the inactive state.

The pulse-mode feature frame 648 and the burst-mode feature frame 650 include different sequences of radar frames 652. Generally speaking, the radar frames 652 within an active pulse-mode feature frame 648 transmit pulses that are separated in time by a predetermined amount. In contrast, the radar frames 652 within an active burst-mode feature frame 650 transmit pulses continuously across a portion of the burst-mode feature frame 650 (e.g., the pulses are not separated by a predetermined amount of time).

Within each active pulse-mode feature frame 648, the sequence of radar frames 652 alternates between the active state and the inactive state. Each active radar frame 652 transmits a radar signal (e.g., chirp), which is illustrated by a triangle. A duration of the radar signal is characterized by an active time 658. During the active time 658, the components within the transceiver 606 are powered-on. During a short-idle time 660, which includes the remaining time within the active radar frame 652 and a duration of the following inactive radar frame 652, the radar system 104 conserves power by turning off components within the transceiver 606 that have a start-up time within a duration of the short-idle time 660.

An active burst-mode feature frame 650 includes M active radar frames 652 and L-M inactive radar frames 652, where M is a positive integer that is less than or equal to L. To conserve power, the active radar frames 652-1 to 652-M occur prior to the inactive radar frames 652-(M+1) to 652-L. A duration of the inactive radar frames 652-(M+1) to 652-L is characterized by a long-idle time 662. By grouping the inactive radar frames 652-(M+1) to 652-L together, the radar system 104 can be in a powered-down state for a longer duration relative to the short-idle time 660 that occurs during the pulse-mode feature frame 648. Additionally, the power management module 620 can turn off additional components within the transceiver 606 that have start-up times that are longer than the short-idle time 660 and shorter that the long-idle time 662.

Each active radar frame 652 within an active burst-mode feature frame 650 transmits a portion of a radar signal. In this example, the active radar frames 652-1 to 652-M alternate between transmitting a portion of the radar signal that increases in frequency and a portion of the radar signal that decreases in frequency.

The framing structure 642 enables power to be conserved through adjustable duty cycles within each frame type. A first duty cycle 664 is based on a quantity of active feature frames 646 (J) relative to a total quantity of feature frames 646 (K). A second duty cycle 665 is based on a quantity of active radar frames 652 (e.g., L/2 or M) relative to a total quantity of radar frames 652 (L). A third duty cycle 668 is based on a duration of the radar signal relative to a duration of a radar frame 652.

Consider an example framing structure 642 for the power state 638-1 that consumes approximately 2 mW of power and has a gesture-frame update rate 634 between approximately 1 Hz and 4 Hz. In this example, the framing structure 642 includes a gesture frame 644 with a duration between approximately 250 ms and 1 second. The gesture frame 644 includes thirty-one pulse-mode feature frames 648 (e.g., L is equal to 31). One of the thirty-one pulse-mode feature frames 648 is in the active state. This results in the duty cycle 664 being approximately equal to 3.2%. A duration of each pulse-mode feature frame 648 is between approximately 8 ms and 32 ms. Each pulse-mode feature frame 648 is composed of eight radar frames 652. Within the active pulse-mode feature frame 648, all eight radar frames 652 are in the active state. This results in the duty cycle 665 being equal to 100%. A duration of each radar frame 652 is between approximately 1 ms and 4 ms. An active time 658 within each of the active radar frames 652 is between approximately 32 μs and 128 μs. As such, the resulting duty cycle 668 is approximately 3.2%. This example framing structure 642 has been found to yield good performance results. These good performance results are in terms of good gesture recognition and presence detection while also yielding good power efficiency results in the application context of a handheld smartphone in a low-power state (e.g., low-power state 504-3).

Based on the framing structure 642, the power management module 620 can determine a time for which the radar system 104 is not actively collecting radar data. Based on this inactive time period, the power management module 620 can conserve power by adjusting an operational state of the radar system 104 and turning off one or more components of the transceiver 606, as further described below.

As noted, the power-management module 620 can conserve power by turning off one or more components within the transceiver 606 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Further, the power-management module 620 can modify transmission power of the radar signals by adjusting an amount of amplification provided by a signal amplifier. Additionally, the power-management module 620 can control the use of different hardware components within the radar system 104 to conserve power. If the processor 608 comprises a lower-power processor and a higher-power processor (e.g., processors with different amounts of memory and computational capability), for example, the power-management module 620 can switch between utilizing the lower-power processor for low-level analysis (e.g., detecting motion, determining a location of a user, or monitoring the environment) and the higher-power processor for situations in which high-fidelity or accurate radar data is requested by the radar manager 106 (e.g., for implementing the high-power state 504-1 of the authentication system 114 for authenticating a user using radar data).

In addition to the internal power-saving techniques described above, the power-management module 620 can also conserve power within the UE 102 by activating or deactivating other external components or sensors that are within the UE 102, either alone or at a command of the authentication system 114. These external components may include speakers, a camera sensor, a global positioning system, a wireless communication transceiver, a display, a gyroscope, or an accelerometer. Because the radar system 104 can monitor the environment using a small amount of power, the power-management module 620 can appropriately turn these external components on or off based on where the user is located or what the user is doing. In this way, the UE 102 can seamlessly respond to the user and conserve power without the use of automatic shut-off timers or the user physically touching or verbally controlling the UE 102.

Figure 8:
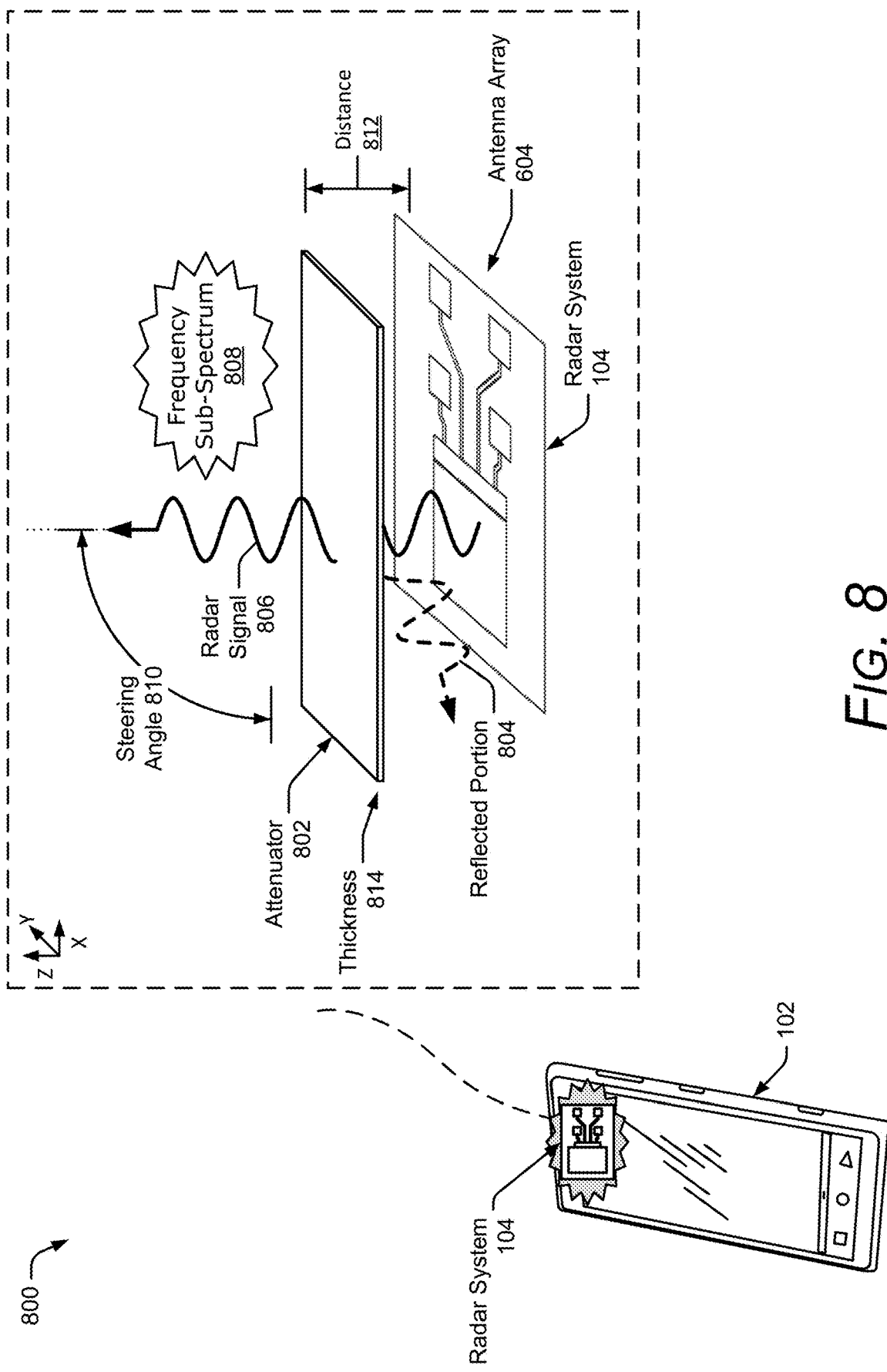
FIG. 8 illustrates additional details of an example implementation of the radar system of FIG. 6-1.

FIG. 8 illustrates additional details of an example implementation 800 of the radar system 104 within the UE 102. In the example 800, the antenna array 604 is positioned underneath an exterior housing of the UE 102, such as a glass cover or an external case. Depending on its material properties, the exterior housing may act as an attenuator 802, which attenuates or distorts radar signals that are transmitted and received by the radar system 104. The attenuator 802 may include different types of glass or plastics, some of which may be found within display screens, exterior housings, or other components of the UE 102 and have a dielectric constant (e.g., relative permittivity) between approximately four and ten. Accordingly, the attenuator 802 is opaque or semi-transparent to a radar signal 806 and may cause a portion of a transmitted or received radar signal 806 to be reflected (as shown by a reflected portion 804). For conventional radars, the attenuator 802 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 806 (e.g., a frequency sub-spectrum 808 or a steering angle 810) or attenuation-dependent characteristics of the attenuator 802 (e.g., a distance 812 between the attenuator 802 and the radar system 104 or a thickness 814 of the attenuator 802) are adjusted to mitigate the effects of the attenuator 802. Some of these characteristics can be set during manufacturing or adjusted by the attenuation mitigator 614 during operation of the radar system 104. The attenuation mitigator 614, for example, can cause the transceiver 606 to transmit the radar signal 806 using the selected frequency sub-spectrum 808 or the steering angle 810, cause a platform to move the radar system 104 closer or farther from the attenuator 802 to change the distance 812, or prompt the user to apply another attenuator to increase the thickness 814 of the attenuator 802.

Appropriate adjustments can be made by the attenuation mitigator 614 based on pre-determined characteristics of the attenuator 802 (e.g., characteristics stored in the computer-readable media 404 of the UE 102 or within the system media 610) or by processing returns of the radar signal 806 to measure one or more characteristics of the attenuator 802. Even if some of the attenuation-dependent characteristics are fixed or constrained, the attenuation mitigator 614 can take these limitations into account to balance each parameter and achieve a target radar performance. As a result, the attenuation mitigator 614 enables the radar system 104 to realize enhanced accuracy and larger effective ranges for detecting and tracking the user that is located on an opposite side of the attenuator 802. These techniques provide alternatives to increasing transmit power, which increases power consumption of the radar system 104, or changing material properties of the attenuator 802, which can be difficult and expensive once a device is in production.

Figure 9:
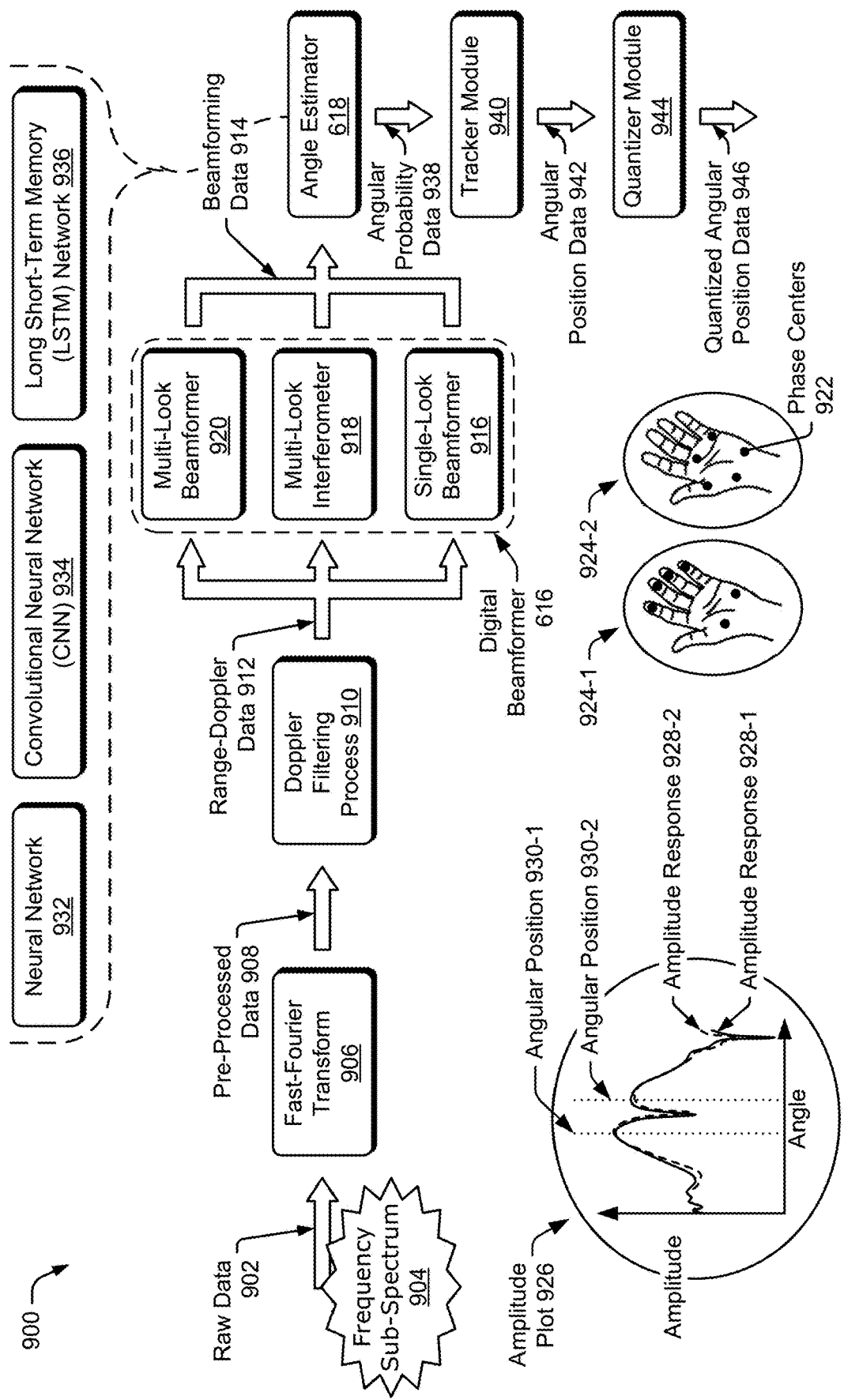
FIG. 9 illustrates an example scheme that can be implemented by the radar system of FIG. 6-1.

FIG. 9 illustrates an example scheme 900 implemented by the radar system 104. Portions of the scheme 900 may be performed by the processor 608, the computer processors 402, or other hardware circuitry. The scheme 900 can be customized to support different types of electronic devices and radar-based applications (e.g., the radar manager 106), and also enables the radar system 104 to achieve target angular accuracies despite design constraints.

The transceiver 606 produces raw data 902 based on individual responses of the receiving antenna elements 702 to a received radar signal. The received radar signal may be associated with one or more frequency sub-spectra 904 that were selected by the angle estimator 618 to facilitate angular ambiguity resolution. The frequency sub-spectra 904, for example, can be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 902 contains digital information (e.g., in-phase and quadrature data) for a period of time, different wavenumbers, and multiple channels respectively associated with the receiving antenna elements 702. A Fast-Fourier Transform (FFT) 906 is performed on the raw data 902 to generate pre-processed data 908. The pre-processed data 908 includes digital information across the period of time, for different ranges (e.g., range bins), and for the multiple channels. A Doppler filtering process 910 is performed on the pre-processed data 908 to generate range-Doppler data 912. The Doppler filtering process 910 may comprise another FFT that generates amplitude and phase information for multiple range bins, multiple Doppler frequencies, and for the multiple channels. The digital beamformer 616 produces beamforming data 914 based on the range-Doppler data 912. The beamforming data 914 contains digital information for a set of azimuths and/or elevations, which represents the field of view for which different steering angles or beams are formed by the digital beamformer 616. Although not depicted, the digital beamformer 616 may alternatively generate the beamforming data 914 based on the pre-processed data 908 and the Doppler filtering process 910 may generate the range-Doppler data 912 based on the beamforming data 914. To reduce a quantity of computations, the digital beamformer 616 may process a portion of the range-Doppler data 912 or the pre-processed data 908 based on a range, time, or Doppler frequency interval of interest.

The digital beamformer 616 can be implemented using a single-look beamformer 916, a multi-look interferometer 918, or a multi-look beamformer 920. In general, the single-look beamformer 916 can be used for deterministic objects (e.g., point-source targets having a single-phase center). For non-deterministic targets (e.g., targets having multiple phase centers), the multi-look interferometer 918 or the multi-look beamformer 920 are used to improve accuracies relative to the single-look beamformer 916. Humans are an example of a non-deterministic target and have multiple phase centers 922 that can change based on different aspect angles, as shown at 924-1 and 924-2. Variations in the constructive or destructive interference generated by the multiple phase centers 922 can make it challenging for conventional radar systems to accurately determine angular positions. The multi-look interferometer 918 or the multi-look beamformer 920, however, perform coherent averaging to increase an accuracy of the beamforming data 914. The multi-look interferometer 918 coherently averages two channels to generate phase information that can be used to accurately determine the angular information. The multi-look beamformer 920, on the other hand, can coherently average two or more channels using linear or non-linear beamformers, such as Fourier, Capon, multiple signal classification (MUSIC), or minimum variance distortion-less response (MVDR). The increased accuracies provided via the multi-look beamformer 920 or the multi-look interferometer 918 enable the radar system 104 to recognize small gestures or distinguish between multiple portions of the user (e.g., facial features).

The angle estimator 618 analyzes the beamforming data 914 to estimate one or more angular positions. The angle estimator 618 may utilize signal processing techniques, pattern matching techniques, or machine-learning. The angle estimator 618 also resolves angular ambiguities that may result from a design of the radar system 104 or the field of view the radar system 104 monitors. An example angular ambiguity is shown within an amplitude plot 926 (e.g., amplitude response).

The amplitude plot 926 depicts amplitude differences that can occur for different angular positions of the target and for different steering angles 810. A first amplitude response 928-1 (illustrated with a solid line) is shown for a target positioned at a first angular position 930-1. Likewise, a second amplitude response 928-2 (illustrated with a dotted line) is shown for the target positioned at a second angular position 930-2. In this example, the differences are considered across angles between −180 degrees and 180 degrees.

As shown in the amplitude plot 926, an ambiguous zone exists for the two angular positions 930-1 and 930-2. The first amplitude response 928-1 has a highest peak at the first angular position 930-1 and a lesser peak at the second angular position 930-2. While the highest peak corresponds to the actual position of the target, the lesser peak causes the first angular position 930-1 to be ambiguous because it is within some threshold for which conventional radars may be unable to confidently determine whether the target is at the first angular position 930-1 or the second angular position 930-2. In contrast, the second amplitude response 928-2 has a lesser peak at the second angular position 930-2 and a higher peak at the first angular position 930-1. In this case, the lesser peak corresponds to the target's location.

While conventional radars may be limited to using a highest peak amplitude to determine the angular positions, the angle estimator 618 instead analyzes subtle differences in shapes of the amplitude responses 928-1 and 928-2. Characteristics of the shapes can include, for example, roll-offs, peak or null widths, an angular location of the peaks or nulls, a height or depth of the peaks and nulls, shapes of sidelobes, symmetry within the amplitude response 928-1 or 928-2, or the lack of symmetry within the amplitude response 928-1 or 928-2. Similar shape characteristics can be analyzed in a phase response, which can provide additional information for resolving the angular ambiguity. The angle estimator 618 therefore maps the unique angular signature or pattern to an angular position.

The angle estimator 618 can include a suite of algorithms or tools that can be selected according to the type of UE 102 (e.g., computational capability or power constraints) or a target angular resolution for the radar manager 106. In some implementations, the angle estimator 618 can include a neural network 932, a convolutional neural network (CNN) 934, or a long short-term memory (LSTM) network 936. The neural network 932 can have various depths or quantities of hidden layers (e.g., three hidden layers, five hidden layers, or ten hidden layers) and can also include different quantities of connections (e.g., the neural network 932 can comprise a fully-connected neural network or a partially-connected neural network). In some cases, the CNN 934 can be used to increase computational speed of the angle estimator 618. The LSTM network 936 can be used to enable the angle estimator 618 to track the target. Using machine-learning techniques, the angle estimator 618 employs non-linear functions to analyze the shape of the amplitude response 928-1 or 928-2 and generate angular probability data 938, which indicates a likelihood that the user or a portion of the user is within an angular bin. The angle estimator 618 may provide the angular probability data 938 for a few angular bins, such as two angular bins to provide probabilities of a target being to the left or right of the UE 102, or for thousands of angular bins (e.g., to provide the angular probability data 938 for a continuous angular measurement).

Based on the angular probability data 938, a tracker module 940 produces angular position data 942, which identifies an angular location of the target. The tracker module 940 may determine the angular location of the target based on the angular bin that has a highest probability in the angular probability data 938 or based on prediction information (e.g., previously-measured angular position information). The tracker module 940 may also keep track of one or more moving targets to enable the radar system 104 to confidently distinguish or identify the targets. Other data can also be used to determine the angular position, including range, Doppler, velocity, or acceleration. In some cases, the tracker module 940 can include an alpha-beta tracker, a Kalman filter, a multiple hypothesis tracker (MHT), and so forth.

A quantizer module 944 obtains the angular position data 942 and quantizes the data to produce quantized angular position data 946. The quantization can be performed based on a target angular resolution for the radar manager 106. In some situations, fewer quantization levels can be used such that the quantized angular position data 946 indicates whether the target is to the right or to the left of the UE 102 or identifies a 90-degree quadrant the target is located within. This may be sufficient for some radar-based applications, such as user proximity detection. In other situations, a larger number of quantization levels can be used such that the quantized angular position data 946 indicates an angular position of the target within an accuracy of a fraction of a degree, one degree, five degrees, and so forth. This resolution can be used for higher-resolution radar-based applications, such as gesture-recognition, or in implementations of the attention state or the interaction state as described herein. In some implementations, the digital beamformer 616, the angle estimator 618, the tracker module 940, and the quantizer module 944 are together implemented in a single machine-learning module.

Among the advantages of the described implementations, including implementations in which radar is used to determine a user's intent to engage, disengage, or maintain engagement, and further including implementations in which radar is used to detect user action that is categorized as an indication of a user intent to engage or interact with the electronic device, either of which might alternatively be achievable using the on-device camera that is provided with most modern smartphones, is that the power usage of the radar system is substantially less than the power usage of the camera system, while the propriety of the results can often be better with the radar system than with the camera system. For example, using the radar system described hereinabove, the desired user-intention detection can be achieved at average power ranging from single-digit milliwatts to just a few dozen milliwatts (e.g., 10 mW, 20 mW, 30 mW or 40 mW), even including the processing power for processing the radar vector data to make the determinations. At these low levels of power, it would be readily acceptable to have the radar system 104 enabled at all times. As such, for example, with the smartphone radar system in the always-enabled state, the desired delightful and seamless experience presently described can still be provided for a user that has been sitting across the room from their smartphone for many hours.

In contrast, the optical cameras provided with most of today's smartphones typically operate at hundreds of milliwatts of power (e.g., an order of magnitude higher than 40 mW, which is 400 mW). At such power rates, optical cameras would be disadvantageous because they would significantly reduce the battery life of most of today's smartphones, so much so as to make it highly impractical, if not prohibitive, to have the optical camera in an always-on state. An additional advantage of the radar system is that the field of view can be quite large, readily enough to detect a user walking up from any direction even when lying flat and face-up on a table (for many typical implementations in which the radar chip is facing outward in the same general direction as the selfie camera) and, furthermore, by virtue of its Doppler processing ability can be highly effective (especially at operating frequencies near 60 GHz) in detecting even relatively subtle movements of moving bodies from the variety of directions.

Additionally, the radar system can operate in environments in which the performance of the camera system is reduced or restricted. For example, in lower-light environments, the camera system may have a reduced ability to detect shape or movement. In contrast, the radar system performs as well in lower light as in full light. The radar system can also detect presence and gestures through some obstacles. For instance, if the smartphone is in a pocket or a jacket or pair of pants, a camera system cannot detect a user or a gesture. The radar system, however, can still detect objects in its field, even through a fabric that would block the camera system. An even further advantage of using a radar system over an onboard video camera system of a smartphone is privacy, because a user can have the advantages of the herein described delightful and seamless experiences while at the same time not needing to be worried that there is a video camera taking video of them for such purposes.

The entities of FIGS. 1, 2, 4, and 6-9 may be further divided, combined, used along with other sensors or components, and so on. In this way, different implementations of the UE 102, with different configurations of the radar system 104 and the sensors 108, can be used to implement radar-based gesture-recognition with context-sensitive gating and other context-sensitive controls. The example operating environment 100 of FIG. 1 and the detailed illustrations of FIGS. 2-9 illustrate but some of many possible environments and devices capable of employing the described techniques.

Example Methods

This section illustrates example methods, which may operate separately or together in whole or in part. Various example methods are described, each set forth in a subsection for ease of reading; these subsection titles are not intended to limit the interoperability of each of these methods one with the other.

Authentication Management

Figure 10:
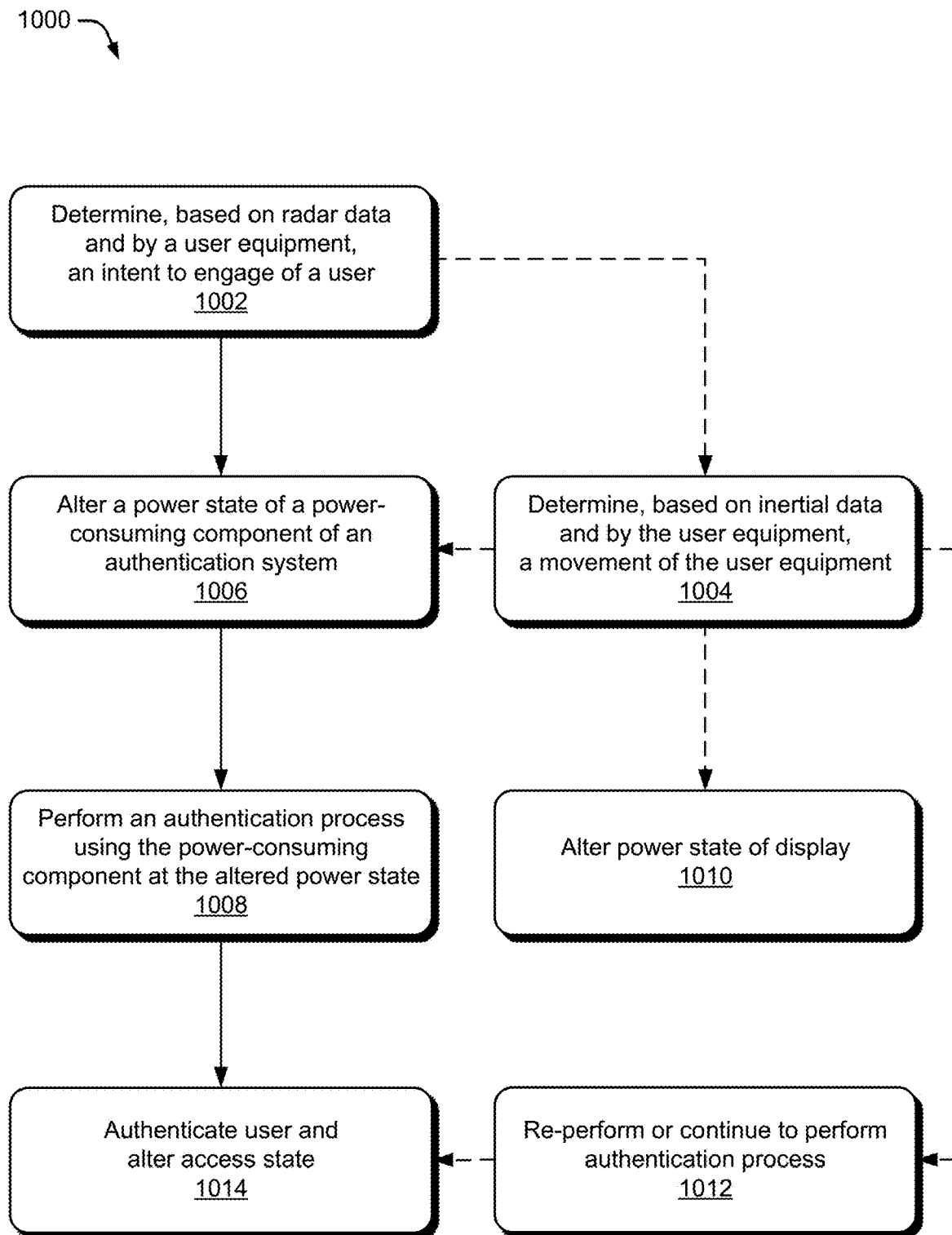
FIG. 10 illustrates an example method for authentication management through IMU and/or radar.

FIG. 10 depicts an example method 1000 for managing authentication through IMU and radar and is one example of managing power states for a user equipment. The method 1000 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in other figures, reference to which is made for example only. The techniques are not limited to performance by one entity or multiple entities operating on one device.

At 1002, an intent to engage of a user is determined, based on radar data and by a user equipment, the intent to engage indicating that the user intends to engage with the user equipment. As noted above, the intent to engage can be indicated by determining that the user 120 is reaching toward the UE 102, looking at the UE 102, or leaning toward or orienting their or their body toward the UE 102, to name just three examples.

At 1004, alternatively or in addition to the determination of the intent to engage through the radar data, a movement of the user equipment is determined based on inertial data. This movement can indicate the user's 120 picking up the UE 102, touching the UE 102, and other movements as noted above.

At 1006, responsive to the determination of the intent to engage and, in some cases, the determination of movement of the user equipment, a power state of a power-consuming component of an authentication system is altered. The power state of the power-consuming component is altered from a first power state to a second power state, the second power state consuming greater power than the first power state. This alteration can be based on solely the intent to engage determined using the radar data or also through the movement determined through the inertial data. Furthermore, the power state of the power-consuming component or other powered components can be further raised based on the movement determination. As noted above, this movement determination may confirm the user's 120 intent to engage, also provide an intent to engage, or otherwise add speed and/or robustness to the determination to add power, resources, and so forth to the authentication system. Note that, in some cases, components of an authentication system remain powered even when a user has not been determined to be intending to engage. In such a case, the techniques act to perform an authentication process responsive to the intent to engage being determined. In such a case latency is reduced even if power is not conserved for that process. The techniques can, however, refrain from using resources not associated with the authentication system, thereby conserving power in other ways.

The power state to which the power-consuming component of the authentication system is altered may or may not be sufficient to enable the authentication system to perform an authentication process on the user. In some cases, the second power state of the power-consuming component is not the high-power state 504-1. In such a case, the second power state is the intermediate-power state 504-2 as noted above. This intermediate-power state 504-2, in some cases, is sufficient for performance of the power-consuming component, such as a camera that includes an intermediate-power state that is still capable of providing sensor data for authentication without fully powering up (e.g., capturing an image of a user in full light rather than in darkness, etc.). Another example is the display 116, which can be powered to accept touch input for a password without powering the display's luminosity to full power. Another case includes the radar system 104, where at a fairly close range of a user's face to the radar system 104, full power is not required to provide sufficiently-accurate facial features to the authentication system 114.

In some cases, the powering up of the component is an intermediate step, such as a warm-up sequence, that may prepare the component or simply reduce latency by giving the component additional time. In such a case, the state manager 112 can determine not to proceed to high-power, such as if an intent to disengage is determined prior to the component being ready to authenticate, the user 120 moving the UE 102 thereby preventing authentication (e.g., into a pocket), and so forth. In some cases, the powering is an intermediate step that is then fully powered responsive to determining that the user 120 has moved the UE 102, illustrated at 1004, and thus to a power sufficient to perform the authentication process. This warm-up sequence powers the component to the intermediate-power state 504-2 and then, after some short period of time, the component is powered sufficient to be used in the authentication process (e.g., to the high-power state 504-1). In such a case, the component is at high-power (or nearly so) while in a post-warm-up sequence following the warm-up sequence. For components that consume substantial power if left on when not needed, but also require a noticeable amount of time to power-up, such as some infrared or near-infrared (IR, NIR) sensors, an intermediate-power state during which a warm-up sequence is performed can save substantial power or reduce noticeable and potentially user-experience-damaging latency.

Example power-consuming components of an authentication system are described above, such as face-unlock sensors 212 of the authentication system 114 of FIG. 1, a touchscreen of the display 116, the radar system 104, and the processor 608 (e.g., high-power processor 608-2). For specific details on the many potential power-consuming components of a facial-recognition system for authentication, see FIG. 2 and its description.

At 1008, an authentication process is performed by the authentication system. In doing so, the authentication system 114 uses the power-consuming component at the altered power state, such as the second power state or a third, higher-power state. The authentication process is effective to authenticate the user or determine that the user is not authenticated, indicating that access to the UE 102 should not be permitted. As noted, the authentication process can be through facial recognition, finger-print reading, password or other credential entry through a touch or audio interface (e.g., touch-screen data-entry component of the display 112), and so forth. The authentication process compares identifying features of the user or credentials with some secure storage of comparable features or credentials to determine the user's identity as authentic, and thus permitted access to the UE 102. This can be as simple as comparing a six-digit password entered through the display's touch screen, or require greater computations and system complexity, such as determining facial features based on sensor data received from the power-consuming component and comparing the determined facial features to a facial-feature library. While not required, this facial-feature library can be stored local to the UE 102 and created during a facial-feature initialization by the UE 102 with the authentication system 114. Furthermore, this library can be securely stored at the UE 102, such as in the form of an embedding on a secure chip integral with the UE 102. This is one way in which privacy of the user 120 can be maintained.

Throughout this disclosure examples are described where a computing system (e.g., the UE 102, a client device, a server device, a computer, or other type of computing system) may analyze information (e.g., radar, inertial, and facial-recognition sensor data) associated with a user, such as the just-mentioned facial features at operation 1008. The computing system, however, can be configured to only use the information after the computing system receives explicit permission from the user of the computing system to use the data. For example, in situations where the UE 102 analyzes sensor data for facial features to authenticate the user 102, individual users may be provided with an opportunity to provide input to control whether programs or features of the UE 102 can collect and make use of the data. The individual users may have constant control over what programs can or cannot do with sensor data. In addition, information collected may be pre-treated in one or more ways before it is transferred, stored, or otherwise used, so that personally-identifiable information is removed. For example, before the UE 102 shares sensor data with another device (e.g., to train a model executing at another device), the UE 102 may pre-treat the sensor data to ensure that any user-identifying information or device-identifying information embedded in the data is removed. Thus, the user may have control over whether information is collected about the user and the user's device, and how such information, if collected, may be used by the computing device and/or a remote computing system.

Returning to the method 1000, at 1010, alternatively or in addition, the power state of a display is altered responsive to determining that the user equipment has moved or is moving. This alteration can be to power up a touch-input reception capability of the display or to simply change the visual presentation of the display. One example includes adding luminosity to the display 116 so that, which a user touches the UE 102, the user sees that the UE 102 is aware of the user's intent and thus, presumably, is preparing to engage with the user 120. Similarly, the UE 102 may do so responsive to the intent to engage determined at 1002.

In some cases, the authentication process is performed for some period of time or iterations without success (e.g., some pre-set number or time period). In such a case, the method 1000 can continue by re-performing the authentication process or continue the process responsive to the determination of the movement at 1004, shown at 1012. This alternative is shown with some of the dashed-line arrows in FIG. 10.

At 1014, responsive to the authentication process of the user at 1008 (or re-performance at 1012) being successful, the user is authenticated, and an access state of the UE 102 is altered. This alteration can increase the access of the UE 102 to high-access state from a low, no, or intermediate-access state, and in such a case, the UE 102 is "unlocked." This high-access state (e.g., the high-access state 502-1 of FIG. 5) is not required, however. Some levels of authentication can reserve access, power, or information for subsequent authentication. Examples include authenticating the user for use of some but not all of the applications and/or accounts of the UE 102 (e.g., accounts to purchase music, bank accounts, etc.), and requiring additional authentication for those reserved access accounts and applications. For example, in addition to the high-access state 502-1, the state manager 112 can cause the UE 102 to be placed in the high-information state 506-1. Examples of this alteration to the information state include presenting a last-engaged-with application or webpage, including at a last-engaged-with portion, such as on page four of a ten-page article on a webpage, or half-way into a song or video that reproduces where the user 120 was last engaged or authenticated with the UE 102. The state manager 112 may alter these states quickly and seamlessly, responsive to authentication of the user 120.

Figure 11:
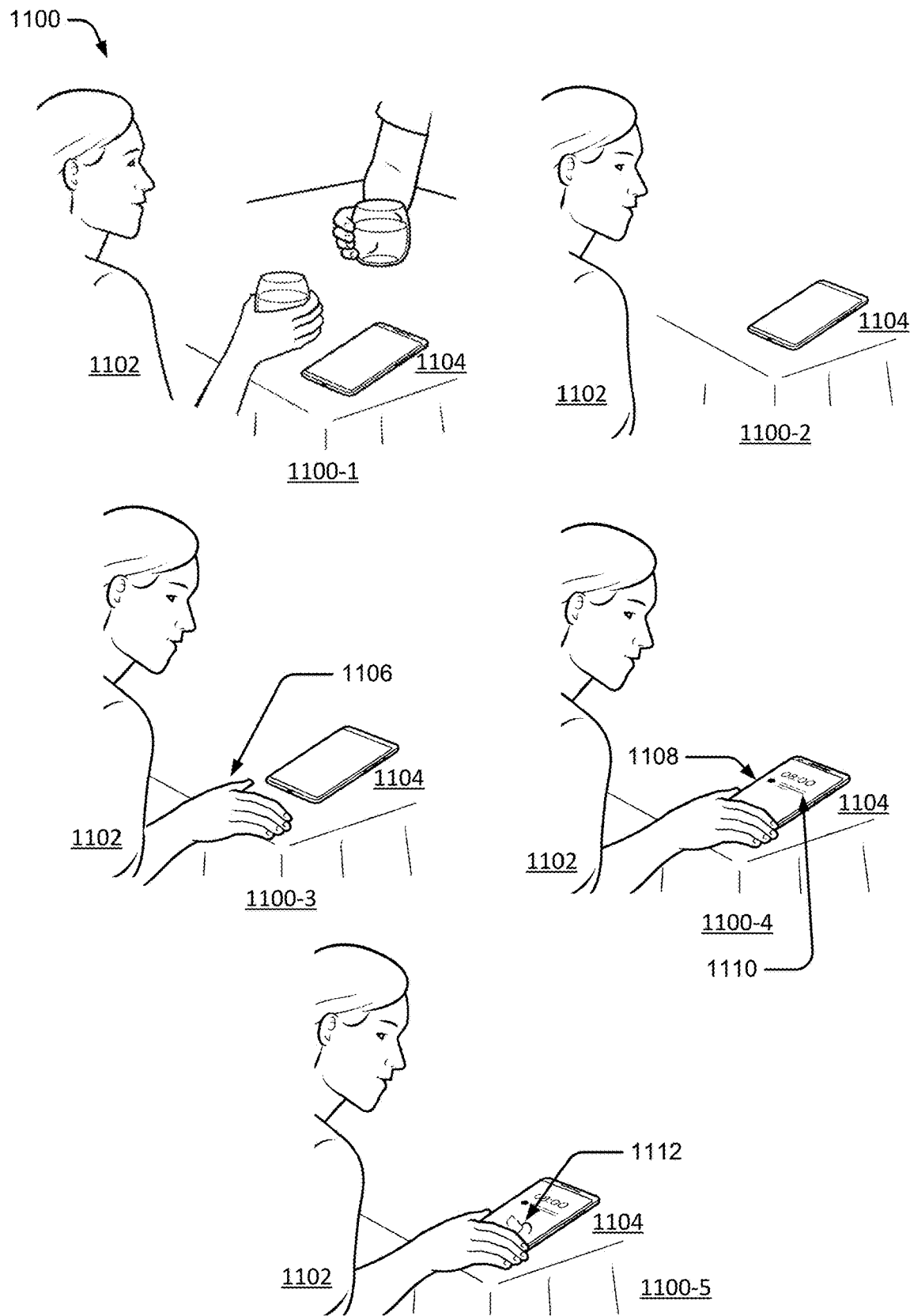
FIG. 11 illustrates an example scenario for authentication management.

By way of example, consider one embodiment of the application of method 1000 to scenario 1100 illustrated in FIG. 11. The scenario 1100 includes five portions, each one chronologically following the prior portion. At a first portion of the scenario 1100, shown at scenario portion 1100-1, a user 1102 is not looking at, touching, or otherwise engaged with a smartphone 1104. Assume here that the smartphone 1104 is in low-access, low-power, and low-information states 501-3, 504-3, and 506-3, respectively (e.g., the smartphone 1104 appears to be switched off, but has sufficient power to determine an intent to engage). This scenario portion 1100-1 is assumed to be the situation prior to the operation of the method at 1002 in FIG. 10. A second portion is shown at 1100-2, during which the user 1102 turns toward and looks at, but does not touch, the smartphone 1104. At this point, the techniques, at operation 1002, determine, based on radar data, that the user 1102 intends to engage with the smartphone 1104. This intent to engage is determined without use of a reach movement but is instead based on the user 1102 looking toward and orienting their body toward the smartphone 1104. The techniques make this determination through the radar manager 106 at operation 1002, which passes the determination to the state manager 112. Following this, the state manager 112, at operation 1006, alters a power state of a power-consuming component (the face-unlock sensor 212) of the authentication system 114. Note that this is done well before the user reaches toward or picks up the smartphone 1104, reducing latency and causing the authentication system 114 to be ready to authenticate the user.

Assume also, that over the next half of a second, while the power-consuming component is powering up, the user 1102 moves closer to, and reaches toward the smartphone 1104 (the reach shown with hand 1106). This is shown at a third portion 1100-3. At this point the authentication system 114 performs an authentication process (operation 1008) but assume that the authentication process is unsuccessful for some number of iterations and/or a period of time. The techniques may cease the attempts to authenticate the user 1102, and thereby save power. Here, however, as shown at portion 1100-4, the user 1102 touches the smartphone 1104. This is determined, at operation 1004, to be movement of the smartphone 1104 through inertial data sensed by the sensors 108 of FIG. 1. This movement determination is passed to the state manager 112. Based on this movement, the state manager 112 continues to cause the authentication system 114 to attempt to authenticate the user 1102, as illustrated by operation 1012 of method 1000. Further still, at the operation 1010, and also based on the movement, the state manager 112 illuminates a display 1108 of the smartphone 1104. This illumination, or powering up of the display 1108, can be performed at the scenario portion 1100-2, 1100-3, or 11004, but here is shown responsive to determining the user's 1102 touch of the smartphone 1104 (shown with time and notification information at 1110). By so doing, the user 1102 is given feedback that the smartphone 1104 is aware that the user 1102 is intending to engage.

As noted, the state manager 112 causes the authentication system 114 to continue the authentication process and, through these continued attempts, authenticates the user 1102. This is shown at portion 1100-5, resulting in the smartphone 1104 being at different states, high-access, high-power, and high-information states 502-1, 504-1, and 506-1, respectively, with the high-access state 502-1 shown with the display 1108 presenting an unlock icon 1112. These state levels can be raised automatically by the state manager 112, providing a seamless user experience for the user 1102.

In this example scenario 1100 the inertial data provided by the sensors 108 causes the state manager 112 to ascertain, with a higher level of confidence and therefore justifying the additional power, that the user 1102 intends to engage with the smartphone 1104 and therefore that the user 1102 wants to be authenticated. This is but one example scenario showing how inertial data from an IMU and radar data from a radar system can be used to authenticate a user quickly, easily, and with reduced power consumption.

Reducing High-Level States

Figure 12:
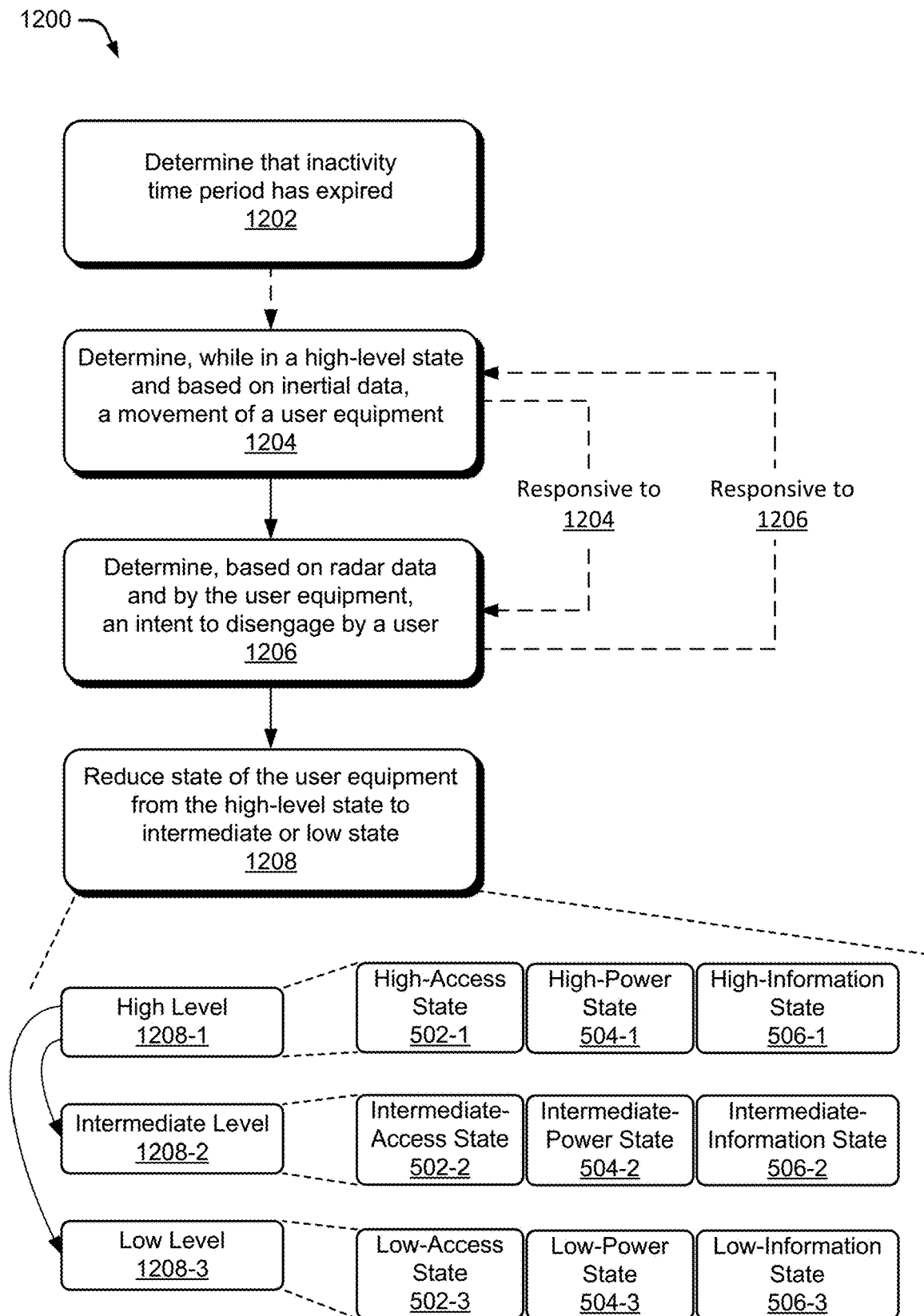
FIG. 12 illustrates an example method for reducing a state of a user equipment.

FIG. 12 depicts an example method 1200 for reducing a high-level state through IMU and radar. The method 1200 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods, including with other methods set forth in this document (e.g., methods 1000, 1400, 1700, and 1800). In portions of the following discussion, reference may be made to the example operating environment 100 of FIG. 1 or to entities or processes as detailed in other figures, reference to which is made for example only. The techniques are not limited to performance by one entity or multiple entities operating on one device.

Optionally, at 1202 and prior to operations 1204 or 1206, an inactivity time period is determined to have expired. In contrast to some other, conventional techniques that rely solely on expiration of a time period, method 1200 may use or refrain from using an inactivity time period to reduce a high-level state for a user equipment. While this inactivity timer is not required, use of a timer, even if a short-timer, in some cases saves power. In more detail, an inactivity timer starts when a last user action with a user equipment is received, such as when a last touch to a touch screen or button, audio command, or gesture input was received by the user equipment. Note that while some conventional techniques use a timer solely, and because of this conventional timers often last minutes (e.g., one, three, five, or ten minutes), the method 1200 can use a time period that is relatively short, such as one half, one, three, five, ten, or twenty seconds. By so doing, the likelihood of the user equipment exposing information, making inappropriate access available, and so forth is very low, while use of a short inactivity time period can operate to save some amount of power by refraining from performing operations of 1204 and/or 1206 for the inactivity time period.

At 1204, a movement is determined, during a high-level state of a user equipment during which a user is interacting or has recently interacted with the user equipment. The movement manager 110 determines this movement based on inertial data received from the sensors 108, which is integral with the UE 102. As shown with the dashed-lined arrow, this operation can optionally be responsive to operation 1206 and/or 1202 (not shown). This determined movement can be one or more of the various movements set forth above, such a movement indicating that the user 120 is picking up the UE 102, walking with, placing down, putting in a pocket or enclosure, or simply touching near to or touching the UE 102. In some cases, the movement manager 110 determines that a movement is or is not sufficient to alter a state of the UE 102, and thus pass to the state manager 112. Examples include those noted above, such as not overcoming a threshold movement, those caused by ambient vibrations, and those that, while movement, are not a sufficient change to an ongoing movement. Thus, the movement manager 110 can determine that the UE 102 is moving as the user 120 walks along with the UE 102, but that movement can be determined not to be a change sufficient to indicate a potential that the user 120 may be disengaging from the UE 102. Another way to look at this is that movement can be based on a change and not simply a current moving of the UE 102. Example changes include moving and then not moving, such as a user walking with the UE 102 and placing it down on a table. While the inertial data from the sensors 108 might not catch the user 120 placing the UE 102 on the table, the determination that the inertial data shows little to no movement when there was movement immediately prior (the user 120 walking with the UE 102) may still be determined as movement at operation 1204 based on this immediately-prior movement.

In more detail, the techniques can tailor a user equipment's state to the user's engagement. Thus, in some cases the user equipment is in a high-level state (or states) due to the user being highly engaged with the user equipment. For example, the method 1200 may determine prior to operations 1204 or 1206 that the user is interacting with the user equipment. This determination of the user's engagement can be based on prior radar data indicating an intent to engage by the user, based on audio or touch input from the user, a command or input received from the user and through the audio or touch sensor, a successful authentication process, and so forth.

At 1206, an intent to disengage is determined based on radar data and by the user equipment. The radar manager 106 receives radar data from the radar system 104 and, using this radar data, determines whether the user intends to disengage from the UE 102. This intent to disengage includes the various types set forth above, such as a hand retraction of the user 120 from the UE 102, a facial orientation change relative to the UE 102, the user 120 turning away from or orienting their or their back to the UE 102, and so forth.

As shown with the dashed-lined arrow, this operation 1206 can optionally be responsive to operation 1204 (and/or 1202, not shown). In these cases, the state manager 112 or the radar manager 106 acts to conserve power by refraining from determining the user's 120 intent to disengage until the movement is determined, and vice-versa for the movement determination at 1204. By so doing, power can be conserved. Thus, the power-management module 620 can be directed by the techniques to keep the radar system 104 at reduced power until the movement is determined at 1204. Once movement is determined, the state manager 112 causes the power-management module 620 to power-up the radar system 104 in preparation to determine whether the user 120 is acting in a manner indicating an intent to disengage.

At 1208, the high-level state of the user equipment is reduced to an intermediate-level or low-level state, responsive to the determination of the movement and/or the intent to disengage. In more detail, see an example high-level state 1208-1, which can be one or multiple states involving access, power, or information, e.g., those illustrated in FIG. 5 (the high-access state 502-1, the high-power 504-1, or the high-information state 506-1). The state manager 112, responsive to determination of movement or an intent to disengage, or both, determines to reduce one or more of the states of the UE 102. This is illustrated in FIG. 12 with arrows showing a reduction from the high-level 1208-1 to an intermediate level 1208-2 or a low-level 1208-3. These are but two of various granularities of power, access, and information. As illustrated in FIG. 5, the intermediate level 1208-2 and the low-level 1208-3 include the intermediate-access state 502-2, the intermediate-power state 504-2, and the intermediate-information state 506-2, each of which is described above. The low-level 1208-3 is illustrated with three low states, the low-access state 502-3, the low-power state 504-3, and the low-information state 506-3. These states are described in detail above. Note that any one, two, or all three of these states can be reduced by the state manager 112 at operation 1208, either each to a same level or differing levels. Thus, the state manager 112 may reduce the high-access state 502-1 to an intermediate or low state, and keep the power state and the information state at high or a mix of levels. Similarly, the state manager 112 may reduce the power state 504 to the low-power state 504-3 while keeping the UE 102 at the high-access state 502-1 (e.g., "unlocked").

Figure 13:
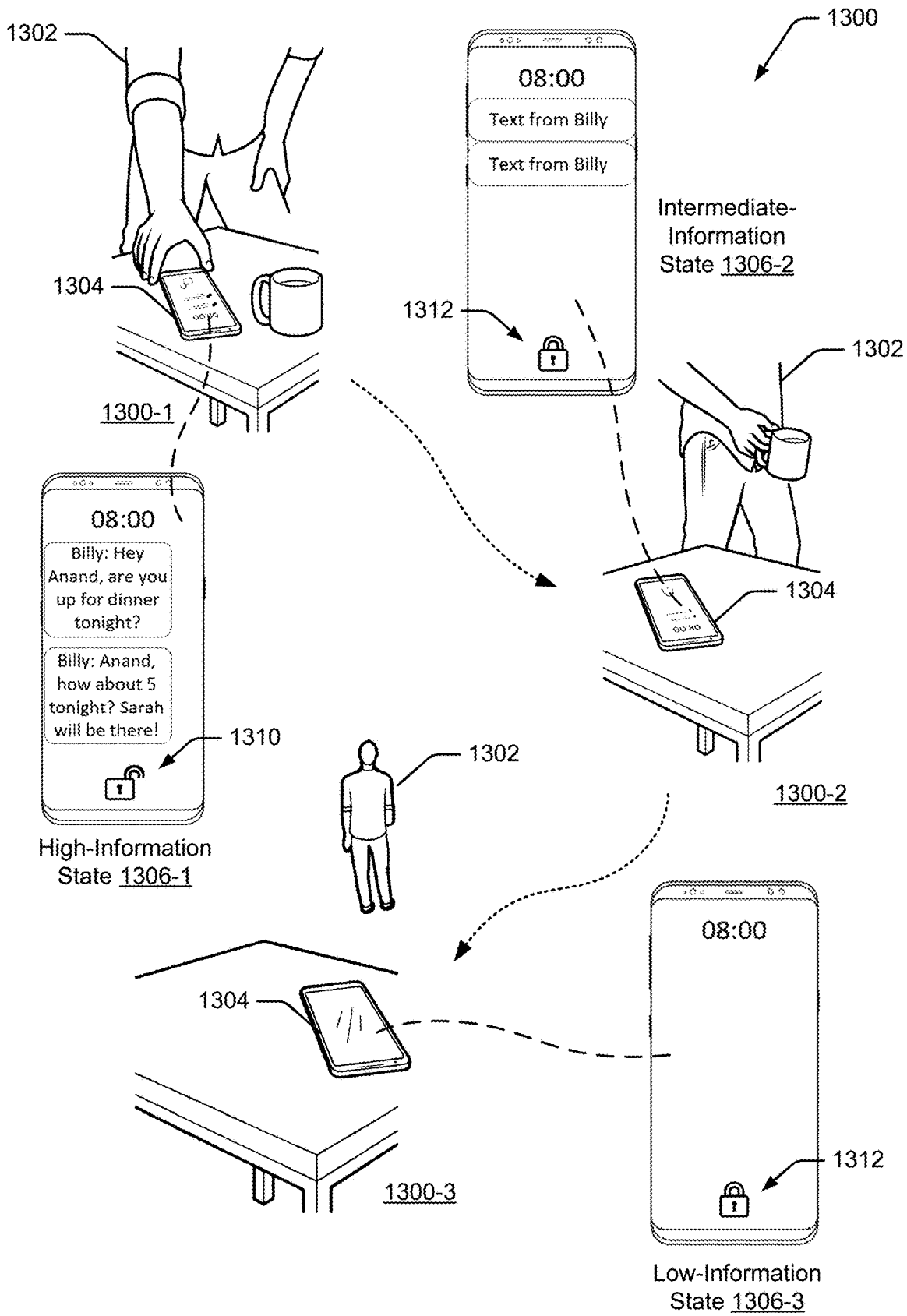
FIG. 13 illustrates an example scenario for reducing a state of a user equipment.

By way of example, consider the application of method 1200 to scenario 1300 illustrated in FIG. 13. The scenario 1300 includes three portions, each one chronologically following the prior portion. Prior to the first portion of the scenario 1300, assume that user 1302 is actively engaged with smartphone 1304 and that the smartphone 1304 is in high-level states, namely power, access, and information states. At the first portion, shown at scenario portion 1300-1, the user 1302 walks up to a table, and places the smartphone 1304 on the table. At operation 1204, the sensors 108 receive inertial data either for the touching of the smartphone 1304 on the table or a lack of inertial data when, previous to being placed on the table, inertial data indicated movement (based on the user 1302 walking with the smartphone 1304). Based on either or both of these inertial data, the movement manager 110 determines a movement for the smartphone 1304 and passes this determination to the radar manager 106 and/or the state manager 112.

Assume that the radar manager 106 provides the radar field 118 (not shown for visual brevity, see FIG. 1 for an example) either immediately responsive to the movement data or was already doing so, and therefore receives radar data indicating the user's 1302 body position and so forth. Based on this radar data, the radar manager 106 determines for a first iteration (and likely multiple others) that, at operation 1206 for the body, arm, and hand placement, the user 1302 is not intending to disengage at the scenario portion 1300-1. This is due to the user 1302 having a body orientation toward the smartphone 1304 and the user's hand and arm being oriented toward the smartphone 1304. Because of this, a high-information state 1306-1 is not altered.

At the scenario portion 1300-2, however, assume that roughly two seconds later, the user 1302 picks up their coffee cup and begins to walk away while turning their body away from the smartphone 1304. At this point, the radar manager 106 determines that the user 1302 is intending to disengage from the smartphone 1304 based on the body orientation of the user 1302 being turned partly away from the smartphone 1304, and the user's 1302 arm and hand oriented toward the coffee cup and not the smartphone 1304. The radar manager 106 passes this determination to the state manager 112.

At operation 1208, responsive to receiving the movement and intent to disengage determinations, the state manager 112 reduces the information state of the smartphone 1304 from the high-information state 1306-1 shown at scenario portion 1300-1 to the intermediate-information state 1306-2. These example information states are shown with information displayed at scenario portion 1300-1 showing content from two text messages and a time of day. Immediately at the user 1302 turning their body and picking up their coffee cup, the information state is reduced to the intermediate-information state 1306-2, shown with the time of day and reduced information about the text messages (shown with the name of the sender but no context). This intermediate amount of information can be useful to the user 1302, as the user 1302 may change their mind about engaging, or want to look back at the smartphone 1304 to see if a new notification has arrived, such as a text from a different person.

Also, or instead of showing the intermediate-information state 1306-2, and as part of operation 1208, the state manager 112 may proceed to a low level either immediately or after first being at an intermediate state. Here assume that the state manager 112, responsive to additional determinations by the radar manager 106 indicating that the user 1302 intends to disengage or a higher confidence level thereof (e.g., here shown with a high confidence as the user 1302 is now a few meters away and has their back fully turned to the smartphone 1304), reduces the information state further to the low-information state 1306-3, shown as scenario portion 1300-3 presenting only a current time of day.

While this example shows changes to an information state, access and power may also or instead be changed. This is shown in part with an unlock icon 1310 shown at scenario portion 1300-1, indicating a high level of access (e.g., the high-level access 502-1 of FIG. 5). At the scenario portion 1300-2 after the state manager 112 receives the movement data and the intent to disengage, the state manager 112 reduces the access to a low level, which is indicated to the user with the lock icon 1312. Further still, power states can be altered, such as by reducing a luminosity of the smartphone's 1304 display (not shown) at the scenario portions 1300-2 and/or 1300-3.

Maintaining an Authenticated State

Figure 14:
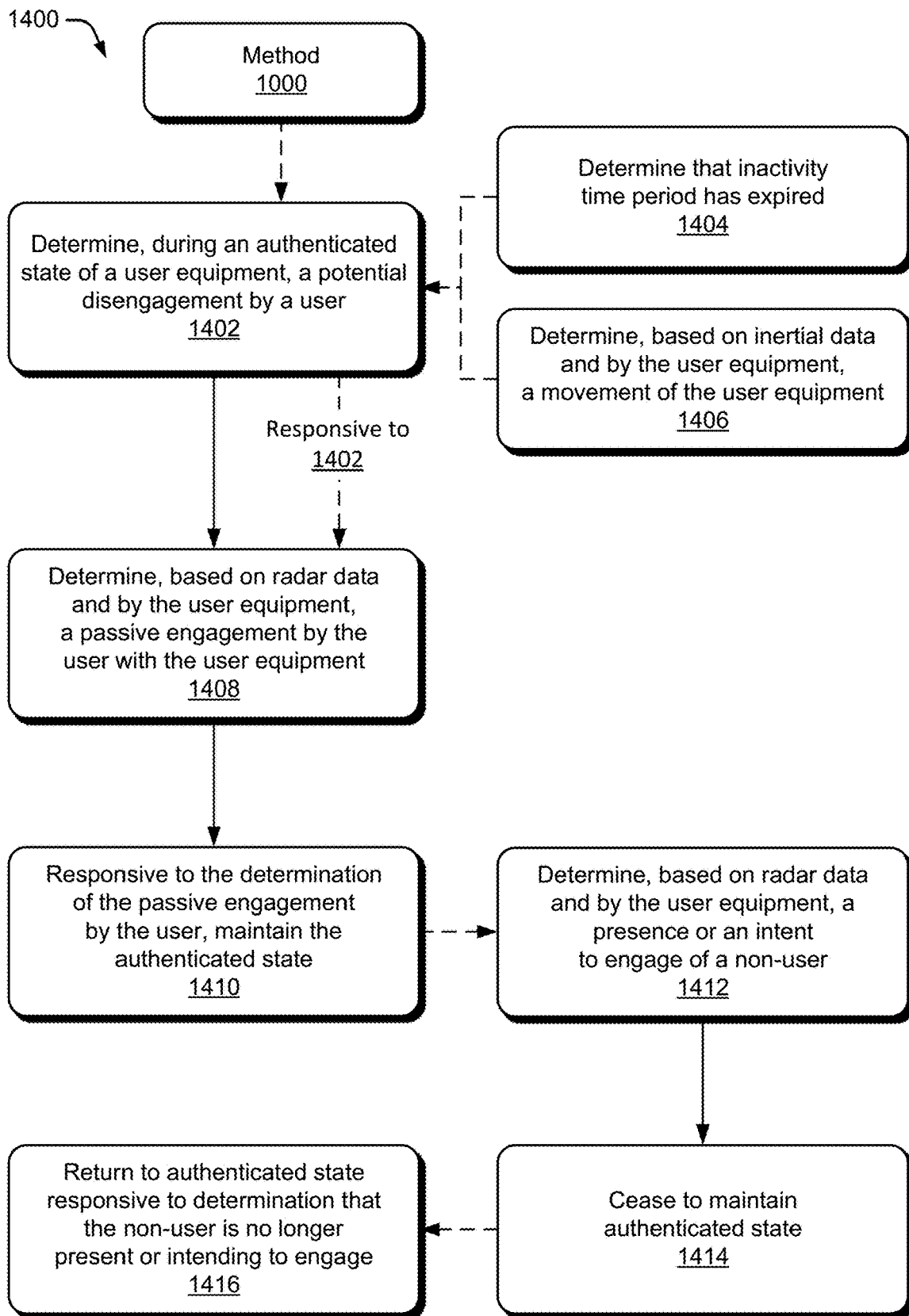
FIG. 14 illustrates an example method for maintaining an authenticated state.

FIG. 14 depicts an example method 1400 for maintaining an authenticated state. The method 1400 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods, including with other methods set forth in this document (e.g., methods 1000, 1200, 1700, and 1800). In portions of the following discussion, reference may be made to the example operating environment 100 of FIG. 1 or to entities or processes as detailed in other figures, reference to which is made for example only. The techniques are not limited to performance by one entity or multiple entities operating on one device.

Prior to discussing method 1400, note that any of the methods described above, in whole or in part, can be combined with method 1400. Consider, for example, the performance of method 1000 in FIG. 10. This method 1000 describes one example of authentication management resulting in authentication of a user. Responsive to this authentication, the user equipment enters into an authenticated state. This state is described in greater detail above. Thus, the method 1000 (or some other manner of authentication of a user) is performed prior to method 1400.

At 1402, during an authenticated state of a user equipment, a potential disengagement by a user of the user equipment is determined. This determination of a potential disengagement by a user can include determining an intent to disengage by the user, as noted above, and other determinations set forth below. Also, as noted above, the authenticated state permits access, by the user, of one or more of the data, applications, functions, accounts, or components of the user equipment. Examples of an authenticated state include the high-access state 502-1 and the intermediate access state 502-2 noted in FIG. 5 above. While either of these access states can be permitted by the UE 102 when in the authenticated state (often based on a user preference or an operating system default setting), the authenticated state assumes a previous authentication of the user. A user-selected preference or setting, however, can permit a high or intermediate access of the UE 102 without authentication. Thus, while the authenticated state may include access permitted by the high and intermediate access states noted above, the high and intermediate access are not necessarily authenticated states.

As illustrated in FIG. 14, determination of the potential disengagement can be performed, optionally, responsive to (or through performing) operation 1404 or operation 1406, as well as other manners described herein, such as through determining an intent to disengage at operation 1206 of method 1200. At 1404, expiration of an inactivity time period is determined. As noted above, this inactivity time period can start when a last user action is received, an active engagement with the user equipment ends (or is last received), or when a last intent to engage was determined. For example, an inactivity timer (e.g., a time period) begins when a user last touches a touch-sensitive display or button, a last-received audio command is spoken, or a last-determined touch-independent gesture (e.g., a gesture determined using the radar system 104 noted above) is performed.

At 1406, a movement of the user equipment is determined based on inertial data of an inertial measurement unit (IMU) integral with the user equipment. Example movements and inertial data are described above, such as inertial data received from the sensors 108 of FIG. 1. Thus, a movement determination is one way in which the method may determine that a user is potentially disengaging, such as by placing the UE 102 in a locker, bag, or pocket (though placing in a bag or pocket may later be determined to be a passive engagement, noted below).

At 1408, a passive engagement by the user with the user equipment is determined based on radar data. This determination of a passive engagement can be responsive to determination at 1402 of the potential disengagement (shown with a dashed-line arrow), or it can be independent of, or coincident with, that determination. Performing operation 1408 responsive to the determination of the potential disengagement can, in some cases, save power or reduce latency. For example, the method 1400 may power-up components of the radar system 104 (see also FIGS. 6-1 and 6-2) responsive to the determination of a potential disengagement. This can save power as noted above or give additional time for the radar system 104 to prepare to determine whether the user is passively engaged with the radar system 104.

In the context of FIG. 1, the radar manager 106 determines that the user 120 is passively engaged with the UE 102. This passive engagement can be determined by the radar manager 106 in multiple ways, which can be exclusive or overlap one with the other. For example, the radar manager 106 can determine that the user is passively engaged based on the radar data indicating that a hand of the user 120 is holding the user equipment 102 at an orientation at which the display 116 of the user equipment 102 is maintained. Thus, if the user 120 is holding the UE 102 steady (or steady enough to view content or permit another person to view content) the user 120 is passively engaged. Other examples of determining passive engagement are described above, including the user 120 looking at or orienting their or their body toward the UE 102.

Furthermore, the radar manager 106 can determine passive engagement based on the radar data indicating that the user 120 is present, such as by being within two meters of the UE 102. Other distances can also or instead be used, such as 1.5 meters, one meter, or even one half of one meter. In effect, the radar manager 106 can determine that the user 120 is passively engaged by being roughly within reach of the UE 102. The radar manager 106 may do so explicitly by indicating that the user 120 is passively engaged, or simply pass information indicating a distance from the UE 102, to the state manager 112. The state manager 112 then determines passive engagement based on the proximity of the user 120 and, in some cases, context, such as other people (or lack thereof), whether or not the user 120 is in a vehicle (car, bus, train), at a desk, and so forth. A user sitting in their or their home, for example, may have a larger permitted distance than the user sitting in a crowded coffee shop or train.

At 1410, responsive to the determination of the passive engagement by the user with the user equipment, the authenticated state is maintained. This maintaining of the authenticated state can continue until another potential disengagement is determined, or for some time period, after which method 1400 can again be performed. One example of an authenticated state is the high-access state 502-1 of FIG. 5. In many situations this authenticated state is an unlock state for the UE 102, but in some other cases the authenticated state permits some but not all access to the UE 102, such as the above-described intermediate-access state 502-2.

This maintaining of the authenticated state for the UE 102 does not require that other states be maintained. For example, in cases where the user 120 is within two meters of the UE 102, but may or may not be looking toward or oriented toward the UE 102, the state manager 112 can reduce a power state or information state of the UE 102, such as from the high-power state 504-1 and the high-information state 506-1 to intermediate or low power or information states noted in FIG. 5. If, however, the passive engagement includes the user looking at the UE 102, the power or information states can also be maintained, such as to continue to present, through the display 116, content to the user 120.

Optionally, the method 1400 can proceed to operation 1412, in which a presence or an intent to engage of a non-user is determined based on radar data. This radar data can be the same or later-received radar data, such as radar data from the radar system 104 received some number of seconds or minutes after the radar data on which the passive engagement was based. Thus, at 1412 the radar manager 106 determines that a non-user is present or intends to engage with the UE 102. If a non-user, therefore, reaches for the UE 102, or looks at the display 116 of the UE 102, the radar manager 106 can determine this presence or intent, and pass it to the state manager 112.

At 1414, responsive to the determination that the non-user is present or intends to engage with the user equipment, the maintenance of the authenticated state is ceased. Thus, if a non-user walks up, reaches for, or looks at the display 116 of the UE 102, the state manager 112 ceases to maintain the authenticated state (or actively de-authenticates) the UE 102. Along with this cessation, the state manager 112 may also reduce other states, such as an information state effective to reduce or eliminate information presented to the non-user. Assume, for example, that an authenticated user is reading a private email on the subway train. If a person sitting behind their looks at the display, possibly to read the private email, the state manager 112 can lock the UE 102 and cease to display the private email. This can be performed quickly and seamlessly, further improving the privacy of a user.

At 1416, optionally after ceasing to maintain the authenticated state, the method can be returned to the authenticated state responsive to a determination that the non-user is no longer present or no longer intending to engage. Continuing the example above, when the non-user in the subway train looks away from the display 116 of the UE 102, the state manager 112 may re-authenticate the user 120 through an authentication process or simply by switching back to the authentication state without re-authenticating. Thus, the user 120 can simply go back to the previous states immediately on cessation of the condition that caused the de-authentication. While some authentication processes, such as the system and process described herein, are both fast and power-efficient, not performing an authentication process can be faster and more-power-efficient. On returning to the authenticated state, the state manager 112 can return the information state to the prior level and at content matching the content last presented to the user 120. In this example, when the non-user looks away, the display 116 presents the private email at a same location last presented by the UE 102 to the user 120. By so doing, seamless management of authentication and improved information privacy is provided to users. Note that a selection by the user 120 can override operations of the techniques, such as a user selection to de-authenticate. In some cases, the user 120 simply turns off the UE 102, which is permitted by the methods described herein.

Figure 15:
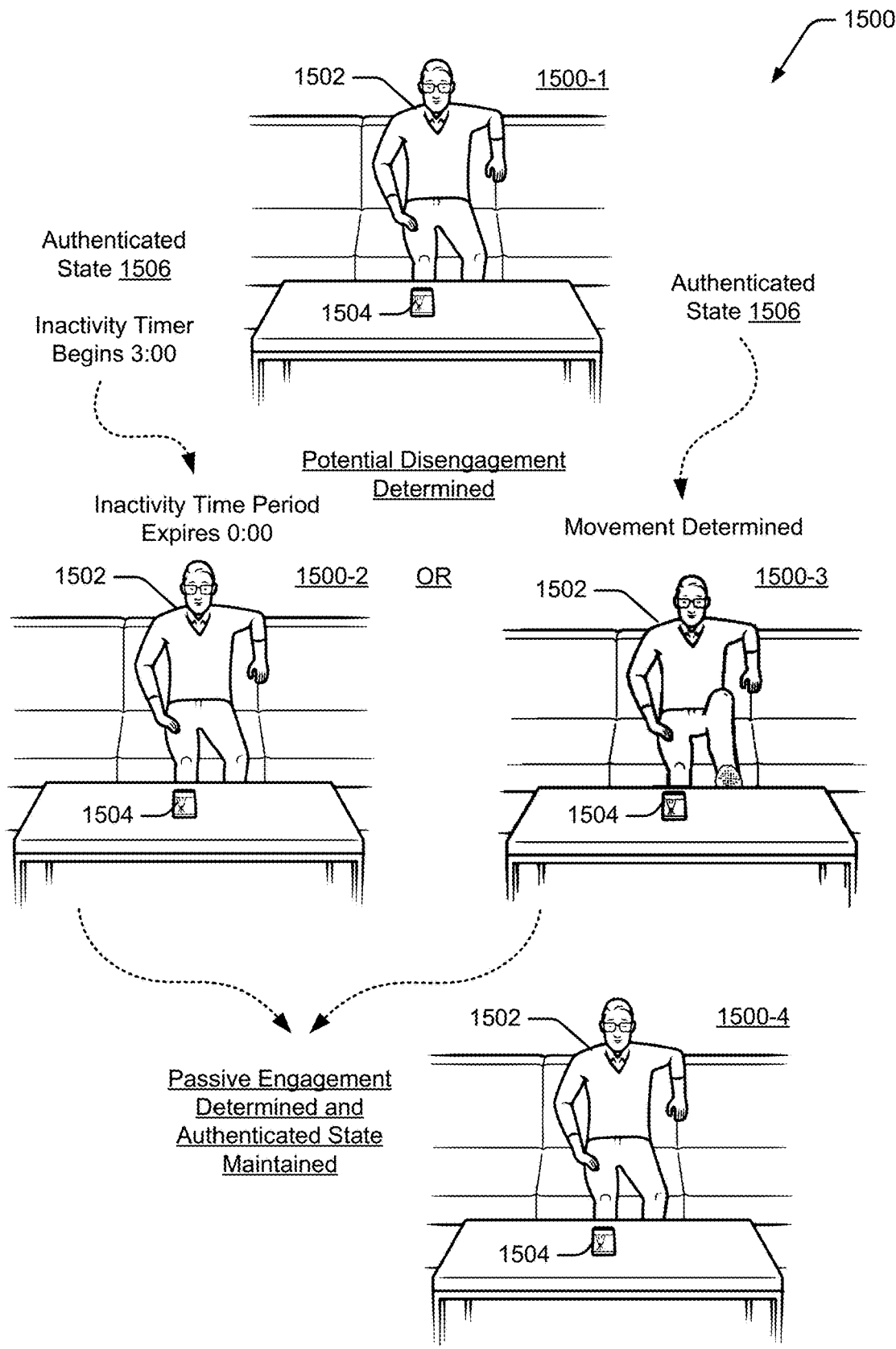
FIG. 15 illustrates an example scenario for maintaining an authenticated state.

Consider another example illustrated in FIG. 15 through a scenario 1500. The scenario 1500 includes four portions. At a first portion 1500-1, assume that a user 1502 has been authenticated to the smartphone 1504, such as through credential or facial-feature analysis, and thus that the smartphone 1504 is in an authenticated state 1506. This authenticated state 1506 allows the user 1502 access to the smartphone 1504, which is shown through the user 1502 accessing content of the smartphone 1504 by watching a television program about volcanic eruptions.

The scenario 1500 is shown diverging along two different paths. In one path an inactivity timer begins when the user 120 ceases to touch or provide input to the smartphone 1504, which here is when the user 120 relaxes to watch the television program. In another case an inactivity timer can begin or not, but a potential disengagement will be determined without its expiration. Thus, at scenario portion 1500-2, after three minutes of inactivity, the inactivity timer expires. Returning to FIG. 14, operation 1402 determines that a potential disengagement by the user has occurred, due to the inactivity time period expiring at operation 1404. For the second path shown at scenario portion 1500-3, operation 1402 determines that a potential disengagement by the user has occurred by determining, based on inertial data, that a movement of the smartphone 1504 has occurred through performing operation 1406. The cause of this movement is the user 1502 putting their foot on the edge of the table on which the smartphone 1504 is resting.

The radar manager 106, responsive to either of these determinations of a potential disengagement, determines, based on radar data, that the user 1502 is passively engaged with the smartphone 1504. This operation is performed at 1408. Here assume that the user's 1502 presence or their looking at the smartphone 1504 are determined, either of which indicates that the user 1502 is passively engaged.

In response, at operation 1410, the state manager 112 maintains the authenticated state. All of this can be performed seamlessly and without the user 1502 noticing that it has been performed. As shown in scenario portion 1500-4, the smartphone 1504 simply continues to present the television program through either path.

Figure 16:
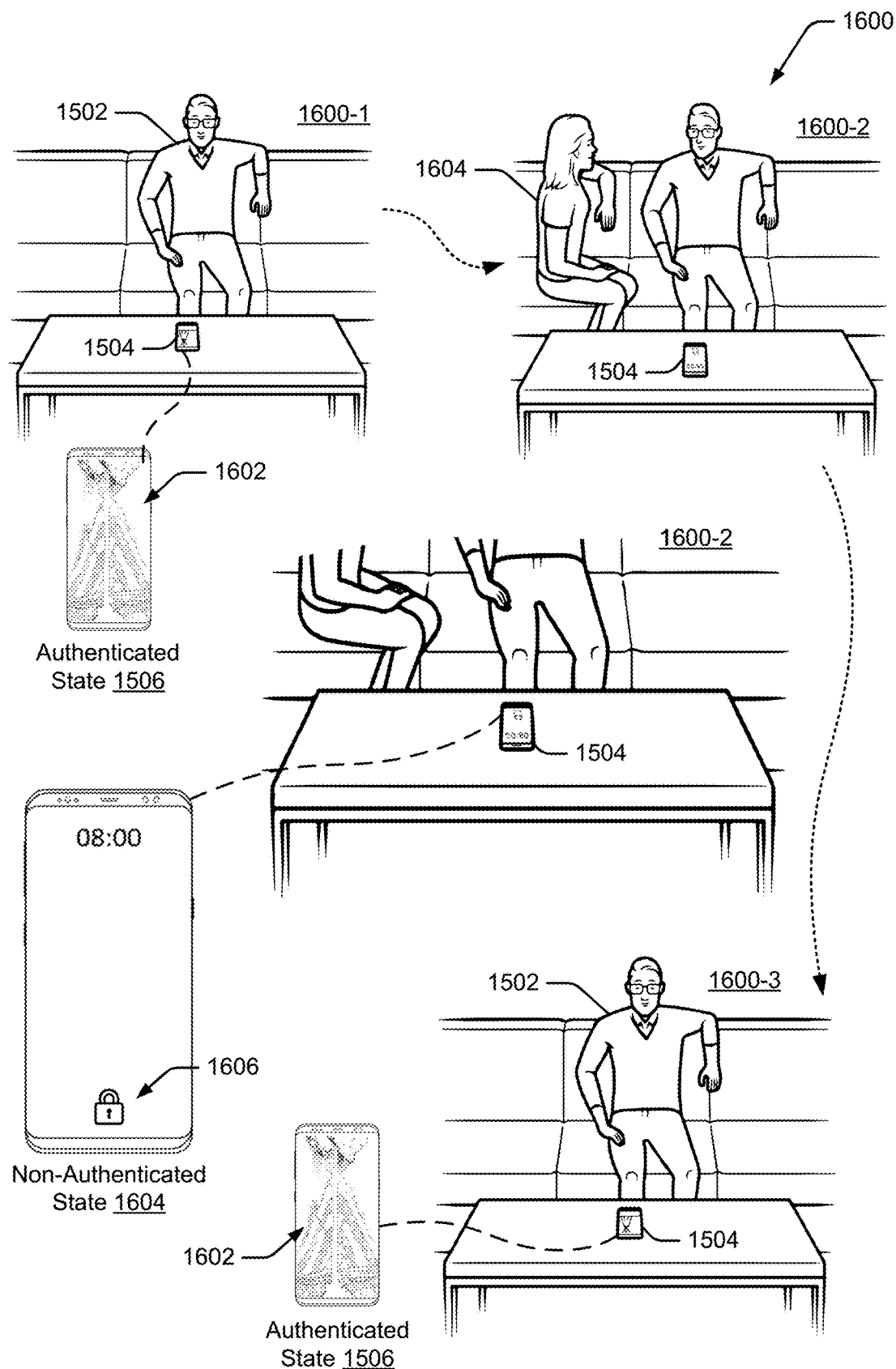
FIG. 16 illustrates another example scenario for maintaining an authenticated state.

Consider another scenario 1600 of FIG. 16, which can follow the scenario 1500 or be an alternative, stand-alone scenario. The scenario 1600 includes three scenario portions, in a first scenario portion 1600-1, the user 1502 is watching the television program about volcanoes, similarly, to as shown in FIG. 15, here marked at content 1602 of the smartphone 1504. The smartphone 1504 is in an authenticated state during this presentation of the program, such as the authenticated state 1506 noted in FIG. 15.

At scenario portion 1600-2, however, a non-user 1604 sits down on the couch with the user 1502. This non-user 1604 is a colleague of the user 1502 and so the user 1502 turns their head and begins talking to the non-user 1604. These actions of the user 1502 can be considered a potential disengagement, either turning their head or talking or both, as noted above. If considered a potential disengagement by the user 1502, the state manager 112 reduces the state of the smartphone 1504, such as to reduce the access state or the information state, noted in FIGS. 5 and 12 (e.g., operations 1206 and 1208 of method 1200).

Assume, however, that the radar manager 106 determines, through operation 1412 of method 1400 and based on radar data, the presence of the non-user 1604. Based on this presence of the non-user 1604, the state manager 112 ceases to maintain the authenticated state 1506 after the state manager 112 previously acted to maintain the authenticated state of the smartphone 1504 (e.g., through operation 1410 shown in FIG. 15). Thus, the state manager 112 can cause the smartphone 1504 to be reduced to a non-authenticated state 1604, shown at an expanded view of the scenario portion 1600-2. This change is shown to the user 1502 through a lock icon 1606, as well as by ceasing to present the content 1602.

At scenario portion 1600-3, the non-user 1604 has left and the user 1502 returns to looking at the smartphone 1504. The radar manager 106 determines that the non-user 1604 is no longer present, indicates this determination to the state manager 112, which then returns the smartphone 1504 to the authenticated state 1506. Note that the state manager 112 may also require a determination that the user 1502 is intending to engage with the smartphone 1504 or may simply return to the authenticated state based on the non-user 1604 leaving the presence of the smartphone 1504. Note also that the techniques described in this document can return a user to the spot at which they left off, seamlessly, thereby providing an excellent user experience. This is shown in FIG. 16 with the state manager 112 returning the smartphone 1504 to a same television program and at a same or nearly a same point that was last presented to the user 1502. For some embodiments the techniques allow the user, in a setup screen or similar device configuration screen, to dictate whether, at step 1416, the smartphone 1504 will return to the authenticated state responsive to the determination that the non-user is no longer present or intending to engage, versus whether the smartphone 1504 will stay in a non-authenticated state until a more rigorous authentication process using a power-consuming component of an authentication system (e.g., step 1006, supra) is carried out. Stated differently, the techniques can provide a user-selected setting, through a setup or similar device configuration, that causes the smartphone 1504 to remain de-authenticated once there has been the taint of a non-user, even if the taint is no longer there.

Gesture-Recognition Management

Figure 17:
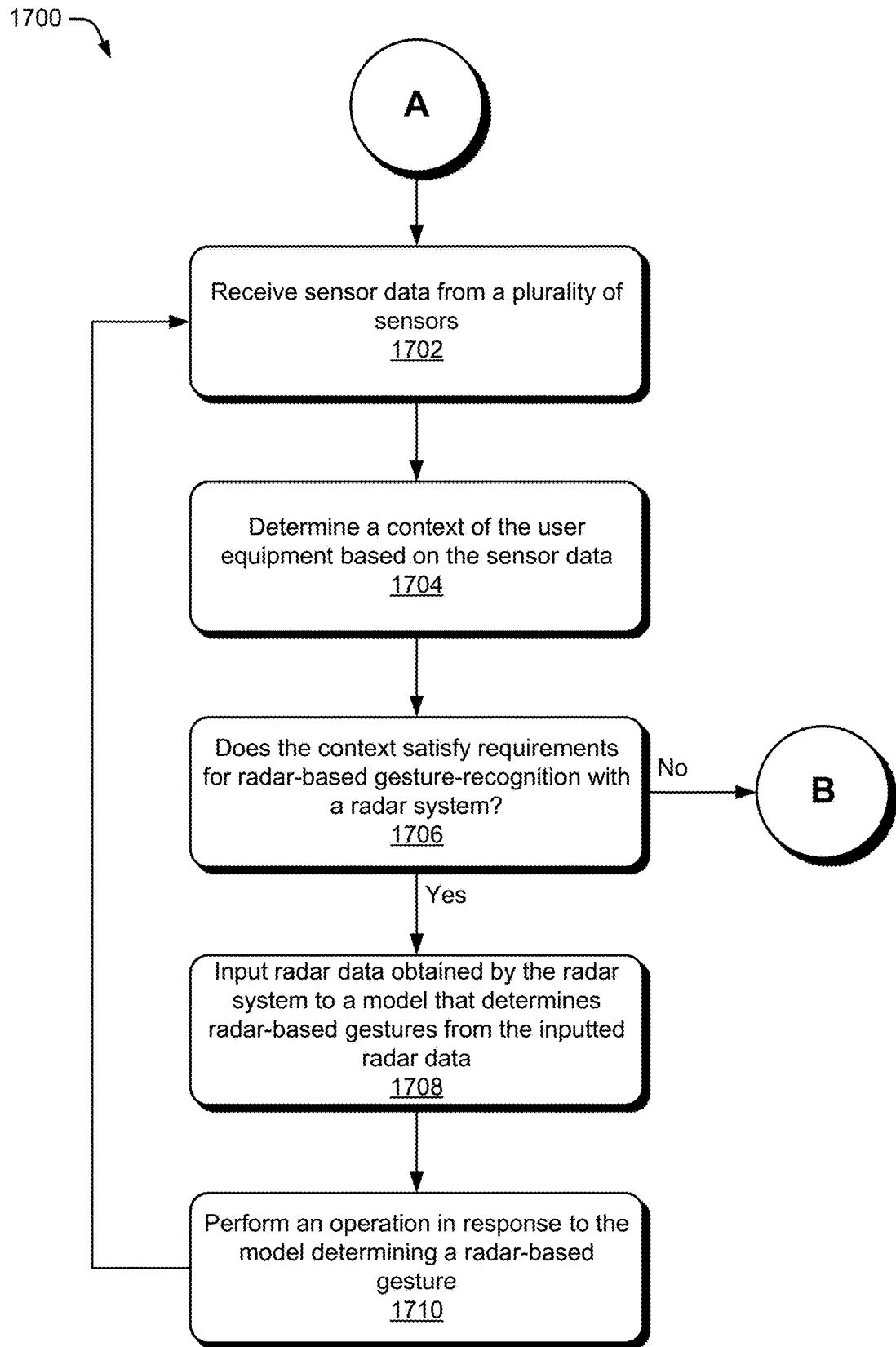
FIG. 17 illustrates an example method for radar-based gesture-recognition with context-sensitive gating and other context-sensitive controls.

FIG. 17 depicts an example method 1700 for radar-based gesture-recognition with context-sensitive gating and other context-sensitive controls. The method 1700 is shown as a set of blocks that specify operations performed but are not necessarily limited to the order or combinations shown for performing the operations by the respective blocks. Further, any one or more of the operations may be repeated, combined, reorganized, or linked to provide a wide array of additional and/or alternate methods, e.g., methods 1000, 1200, 1400, and 1800. In portions of the following discussion, reference may be made to the example operating environment 100 of FIG. 1 or to entities or processes as detailed in other figures, reference to which is made for example only. The techniques are not limited to performance by one entity or multiple entities operating on one device.

At operation 1702, sensor data from a plurality of sensors 108 is received. For example, the proximity sensor 208 generates sensor data that is indicative of proximity to an object (e.g., the radar system 104 configured as a proximity sensor by operating in a proximity mode). The IMU 408 can produce sensor data indicating movement and other sensors 108 can generate other sensor data that is used to define a context.

The radar system 104 may be operable in a low-power, proximity mode (e.g., the low-power state 504-3) to generate sensor data of sufficient resolution and quality for detecting proximity. The radar system 104 can also operate in a high-power, gesture-recognition mode (e.g., the high-power state 504-1) to generate improved sensor data relative to the sensor data produced in a proximity mode. In gesture-recognition mode, the sensor data generated by the radar system 104 is a higher-resolution or greater quality than in proximity mode because the sensor data is used for more complex gesture-recognition tasks. The sensor data received from the plurality of sensors at operation 1702 may indicate course movement and proximity whereas the sensor data collected from the radar system 104 to perform radar-based gesture-recognition may indicate more-precise movement, proximity, or occlusion.

The sensor data can indicate proximity as a binary measurement of an object, or as a variable measurement further specifying closeness to the object. Proximity can indicate whether the radar system 104 or other part of the UE 102 is occluded by the object (meaning that the user 120 relative to the UE 102 or vice-versa are occluded by the object), a greater amount of presence indicating occlusion and a lesser amount of presence indicating little or no occlusion. The sensor data can define movements effective to determine a position, speed, acceleration, velocity, rotation, orientation, or other movement or positioning characteristics of the UE 102.

At operation 1704, a context of the UE is determined. The sensor data obtained at operation 1702 indicates an operating environment of the UE 102 as the user 120 interacts with the UE 102. The sensor data may include patterns or signatures indicating whether a movement is intentional or unintentional. The UE 102 can include, or access, machine-learned activity classifiers trained using machine learning to recognize patterns or signatures in sensor data that correspond to particular user activities or device contexts. The machine-learned activity classifiers output notifications to applications and other subscribers that use activity recognition to perform other tasks. Accelerations or vibrations identified in movement data correspond to similar vibrations and accelerations that the IMU 408 or other of the sensors 108 records as sensor data when the user 120 is walking or otherwise moving with the UE 102.

Recognized activities or movements can indicate different contexts. Examples of contexts include a walking context, a cycling context, a driving context, a riding context, or other activity context corresponding to a recognized activity. The movements can indicate position and orientation, as well as movement or lack of movement, typically observed when the user 120 is viewing or holding the UE 102. Lack of movement can indicate a seated context, a stationary context, an unused context, or a stowed context. Opposite movements can correspond to opposite activities, for example, certain movements can indicate the user is picking up the UE 102 and opposite or different movements can indicate the user putting the UE 102 down.

At operation 1706, whether the context satisfies requirements for radar-based gesture-recognition is determined. The UE 102 may determine the context satisfies the requirements if sensor data from the sensors 108 (e.g., the proximity sensor 208 and the IMU 408) overtime matches sensor data the UE 102 expects to detect when radar-based gesture-recognition are typically received. The UE 102 may determine the opposite is true when the context does not satisfy the requirements for radar-based gesture-recognition and prevent or otherwise discard gestures recognized by the radar system 104.

For example, the UE 102 can condition radar-based gesture-recognition on a current context of the UE 102. The context satisfies the requirements for radar-based gesture-recognition if the user 120 is holding the UE 102 while walking but not if the user 120 is not holding the UE 102 while walking. Carrying the UE 102 in a pocket or backpack while walking, however, is not a context that satisfies the requirements for radar-based gesture-recognition (except in cases where gesture detection through an intervening material is permitted).

A stowed context is when sensor data indicates the UE 102 is positioned in: a pocket of clothing worn by the user 120, a compartment in a backpack, briefcase, or suitcase, a storage bin in an airplane, taxi, automobile, boat, bus, or train, a console or glove box of a vehicle, or other enclosure. A holding or carrying context is identified when the sensor data indicates the user 120 is holding the UE 102. A stationary context is evident from sensor data indicating the UE 102 is not being held, motionless, or substantially not moving relative to a surface on which the UE 102 rests. A traveling context indicates the UE 102 is moving, regardless whether the UE 102 is being held or stowed, for example, if the user 120 is walking, driving, cycling, or otherwise moving with the UE 102.

The context satisfies requirements of radar-based gesture-recognition based in part on whether the UE 102 is traveling, being held, or stowed. For example, being held and traveling is a context where the radar system 104 recognizes radar-based gestures, however, being stowed and traveling may not be a context where the radar system 104 recognizes radar-based gestures.

The satisfaction of the context can further depend on orientation, specifically, carrying orientation. If the user 120 is walking and holding the UE 102, the context may still not satisfy the requirements for radar-based gesture-recognition if the user is not holding the UE 120 in a particular way. For example, the user 120 holding the UE 102 in landscape and/or in a portrait-down orientation (e.g., the touch screen of the UE 102 pointed near the ground) while the user 120 is walking may not satisfy the requirements for radar-based gesture-recognition as the user 120 is likely not wanting to interact with the UE 102 in this context. Conversely, the user 120 holding the UE 102 in a different orientation (e.g., portrait-up with the touch screen of the UE 102 pointed towards the sky or the user's 120 face) while walking may satisfy the requirements for radar-based gesture-recognition as the user 120 is likely viewing the touchscreen of the UE 102 while walking.

The UE 102 can condition radar-based gesture-recognition on whether or how the user 120 is holding the UE 102. For example, the context satisfies the requirements for radar-based gesture-recognition if the user 120 is not holding the UE 102 while cycling or driving, such as if the UE 102 is in a stationary context, fixed to a mounting bracket on a bike frame or attached to an automobile air vent or dash, while cycling or driving. A similar cycling or driving context where the user is holding the UE 102, however, may not satisfy the requirements of radar-based gesture-recognition.

Radar-based gesture-recognition can be conditioned by the UE 102 based on occlusion from, or proximity to, an object. For example, in response to detecting proximity to an object while the UE 102 is already in stowed or stationary contexts, the radar system 104 enables gesture-recognition model 621. The opposite may be true in response to detecting occlusion by an object while the UE 102 is already in stowed or stationary contexts, the radar system 104 disables gesture-recognition model 621 in this case. For example, the UE 102 placed face-up (touch-screen up) on a flat service may be a stationary context where proximity to an object or no occlusion is detected and therefore gesture recognition is enabled. The UE 102 placed face-down (touch-screen down) on the flat surface is an opposite stationary context where occlusion is detected and therefore gesture recognition is gated.

Significant motion can condition the gesture-recognition model 621. If the UE 102 is in a significant-motion context where the UE 102 experiences frequent or strong movements or changes in movement, the context may be less suitable for radar-based gesture-detection. For example, if the user 120 carrying the UE 102 in their hand goes for a run, the radar system 104 gates the gesture-recognition model 621 to ensure the radar system 104 does not incorrectly trigger any gesture-conditioned events.

The radar system 104 can apply different sensitivity levels for different types of gestures or for different types of contexts. Contexts with significant motion may trigger gating for most radar-based gestures whereas contexts with less motion may trigger gating only some of the radar-based gestures. As an example, the radar system 104 may recognize course-control (e.g., whole-hand) gestures in a high-vibration manufacturing context, however the same context may not be suitable for particular fine-control (e.g., individual finger) radar-based gestures where the UE 102 or the user 120 is unsteady and moving. Rather than attempt to recognize fine-control radar-based gestures in the high-vibration context, the radar system 104 gates the gesture-recognition feature for fine-control gestures while continuing to recognize course-control gestures in the same context. The radar system 104 applies a different sensitivity level to the fine-control gestures so they get triggered more easily than the course-control gestures do. The radar system 104 applies a different sensitivity level to the course-control gestures to avoid being triggered as easily as the fine-control gestures do.

In a marine context, the user 120 interacts with the UE 102 as a passenger on a boat. The user 120 may hold the UE 102 or the UE 102 may be a computing device built into the boat. The boat moves with ocean waves. In a stormy environment, the radar system 104 can recognize that certain radar-based gestures may be hard to recognize when the UE 102 is undergoing large changes in pitch or orientation and gate the radar-based gestures rather than risk outputting a false-positive. When the stormy environment calms and variations in pitch and orientation subside, the radar system 104 automatically stops gating and enables the radar-based gestures that had been gated during the storm.

The radar system 104 can gate all radar-based gestures for a particular context, or only gate certain types of radar-based gestures. For example, for a reach-and-grab gesture, specifically reach-to-pick-up the UE 102, the radar system 104 can reduce false positives to the face-authentication system 114 by recognizing from the sensor data when the user 120 reaches and then picks up the UE 102 to trigger the face-authentication system 114. This, as opposed to triggering the face-authentication system 114 in response to recognizing just the reach. The radar system 104 can gate a radar-based gesture for answering a telephone call when the sensor data indicates the UE 102 is in a quiet or noisy environment, or an environment with an intermittent communications signal. The radar system 104 automatically un-gates and enables the telephone-answering radar-based gesture when the radar system 104 determines the UE 102 is in an office location or on a desk near a laptop computer where the user 120 is likely to want to answer the telephone using the gesture-recognition model 621.

The UE 102 can condition radar-based gesture-recognition on whether the context indicates the user 120 is holding the UE 102, whether the context indicates the user 120 is walking or both. The context satisfies the requirements for touch-independent gesture-recognition if the UE 102 determines the user 120 is holding the UE 102 and the user 120 is walking. The context does not satisfy the requirements for touch-independent gesture-recognition if the UE 102 determines the user 120 is not holding the UE 102 and the user 120 is walking. The UE 102 may determine the context satisfies the requirements if sensor data from the proximity sensor 208 and the IMU 408 overtime match sensor data the UE 102 expects to detect when the user 120 is walking and holding the UE 102. The UE 102 may determine the opposite is true when the context does not satisfy the requirement and discard gestures recognized by the radar system 104.

In a reach-grab context, the user 120 reaches over the UE 102 as the UE 102 is lying face-up on a table. The user 120 may be reaching to grab the UE 102. The user 120 may be reaching to grab something beyond the UE 102. Determining the context does not satisfy the requirements for radar-based gesture-recognition at 1706 can be in response to determining the user 120 is not picking up the UE 102 after an object comes into proximity of the UE 102. If the user does not grab and pick up the UE 102 after reaching (e.g., the user 120 coming into proximity), the UE 102 gates the output from the gesture-recognition model 621 (e.g., to prevent an authentication algorithm from executing a face-authentication) preventing a subscriber (e.g., an application, a component, a system service) from obtaining an indication of a gesture. Determining the context satisfies the requirements for radar-based gesture-recognition at 1706 can be in response to determining the user 120 is picking up the UE 102 after an object comes into proximity of the UE 102. If the user does grab and pick up the UE 102 after reaching, the UE 102 enables the output from the gesture-recognition model 621 (e.g., to enable the authentication algorithm from executing the face-authentication) enabling the subscriber to obtain the indication of the gesture. Using context-sensitive gating and other context-sensitive controls in this way reduce reach-and-grab false-positives.

Other of the sensors 108, such as ambient light sensors, barometers, location sensors, optical sensors, infrared sensors, or the like, can provide signals to the UE 102 to further define the context of the UE 102 to improve gesture-recognition and other described techniques. At 1706, determining the context satisfies the requirements for radar-based gesture-recognition can be in response to location information, time of day, barometric pressure, ambient light, ambient audio, and other sensor information for defining a context for gating or not-gating the radar system 104. For example, a context that specifies the UE 102 as being near the location of a movie theatre and in low-light conditions, while detecting loud and frequent ambient noises, is not a context suitable for radar-based gesture-recognition. Whereas, near a rail station, while detecting low-lighting conditions and loud ambient noises, is a context suitable for radar-based (e.g., touch-independent) gesture-recognition.

At operation 1706, when the context does not satisfy requirements for radar-based gesture-recognition with the radar system, radar data obtained by the radar system is gated and the method proceeds to B (described below in the description of FIG. 18). When the context satisfies requirements for radar-based gesture-recognition with a radar system at operation 1706, the radar data obtained by the radar system is input to a model that determines radar-based gestures from the inputted radar data at operation 1708.

At 1708, inputting the radar data obtained by the radar system 104 into the gesture-recognition model 621 causes the gesture-recognition model 621 to perform gesture-recognition techniques. The radar system 104 may operate in a high-power gesture-recognition mode for obtaining radar data that is of sufficient resolution, frequency, detail, and quality for radar-based (e.g., touch-independent) gesture-recognition. The radar system 104 may further operate in other modes, including a proximity mode, or a standby-mode. If multiple-mode-operations are supported, the radar system 104 can continue to operate in one or more modes, even if a different mode is disabled. For instance, disabling radar-based gesture-recognitions may have no impact on radar-based collision-avoidance operations performed by the radar system 104. Some examples of the radar system 104 may not be multimodal and therefore, disabling radar-based gesture-recognition can disable the radar system 104 in its entirety.

In addition to being context-sensitive, the gesture-recognition model 621 may adjust gating sensitivity based on identity of a subscriber. The subscriber can be an application, service, or component that receives the output from the gesture-recognition model 621. For example, the gesture-recognition model 621 provides an interface from which an application or component of the UE 102 (e.g., the authentication system 114, an operating system function or service, an application, a driver) registers with the gesture-recognition model 621 and is assigned an identity. The subscriber indicates a gating-sensitivity to apply for different contexts. The subscriber may indicate a type of gesture or type of radar-based gesture to apply the gating. For example, an operating system may provide access to a function through a widget on a lock screen user interface of the UE 102. The widget may recognize radar-based gestures and may subscribe to the gesture-recognition output from the gesture-recognition model 621. In some contexts, the output from the gesture-recognition model 621 is gated to prevent an indication of a gesture from being used by the subscriber. The output from the gesture-recognition model 621 is permitted in other contexts and an indication of the gesture is sent to the subscriber. In some contexts, the output from the gesture-recognition model 621 can be gated for one subscriber but not gated for another. For example, that same gesture-recognition that is used by the widget-subscriber in a particular context may be unusable by a different subscriber that elects to gate gestures for that context. A face-authentication application for example may be unable to use the gesture information in certain conditions but the widget on the lock screen can.

The gesture-recognition model 621 selects a gating-sensitivity at operation 1406, based on the identity of the subscriber. The gesture-recognition model 621 determines, based on the gating-sensitivity associated with the identity of the subscriber, whether the context satisfies the requirements for radar-based gesture-recognition with the radar system 104.

At 1710, an operation is performed in response to the model determining a radar-based (e.g., touch-independent) gesture. An output from the gesture-recognition model 621 can indicate a gesture recognized from the radar data and output an indication of the gesture to a subscriber.

The UE 102 may provide user-interface feedback of a gating state of the radar system 104. The UE 102 can output an audible or visual indication to a user, such as audible or visual alert (e.g., "you are moving the device too much and the radar cannot sense your gesture"), controlling a lighting element of the UE 102, providing haptic feedback, or providing some other user-interface feedback. The UE 102 may output an indication of the gating state as being "gating" or "not gating" to indicate whether the UE 102 is gating the output from the gesture-recognition model 621 or not. The indication of the gating state can indicate a reason for gating (e.g., providing an indication of a contextual or environmental characteristic that makes gating necessary). The indication of the gating state can indicate a level of gating (e.g., see FIG. 18 for example levels of gating including soft-gating, hard-gating, and no gating).

The UE 102 can vary a user interface and provide user-interface feedback in other ways. For example, if the UE 102 is being used, a display is on, and the UE 102 is operating in a high-power state, user-interface feedback being output from the UE 102 may depend only on sensor data from motion sensors or other non-radar sensors. If the display is off or the UE 102 is in a lower-power state, it may be prohibitive to operate the motion sensor or other non-radar based sensor in an always-enabled state. The UE 102 may refrain from monitoring the motion sensors or other non-radar sensors except in contexts that satisfy requirements for touch-independent gesture-recognition. In this way, the user-interface feedback is conditioned on whether the gesture-recognition model 621 can determine a radar-based gesture.

For example, the UE 102 can provide a "gesture" user-interface feedback element when soft or hard-gating the radar system 104 and/or when gating ceases and radar-based gesture-recognition resumes. A gesture user-interface feedback element is a user-perceivable element, such as a visual element that appears on an active area of a display. A gesture feedback element can also be (or include) a light element that is not on the display, a haptic element (e.g., a vibration element), and/or an audio element (e.g., a user-perceivable sound), may be presented at or along an edge of a display, and may have any of a variety of shapes, sizes, colors, and other visual parameters or properties. Examples of the other visual parameters or properties include luminosity, color, contrast, shape, saturation, or opaqueness.

Gesture-Recognition Gating

Figure 18:
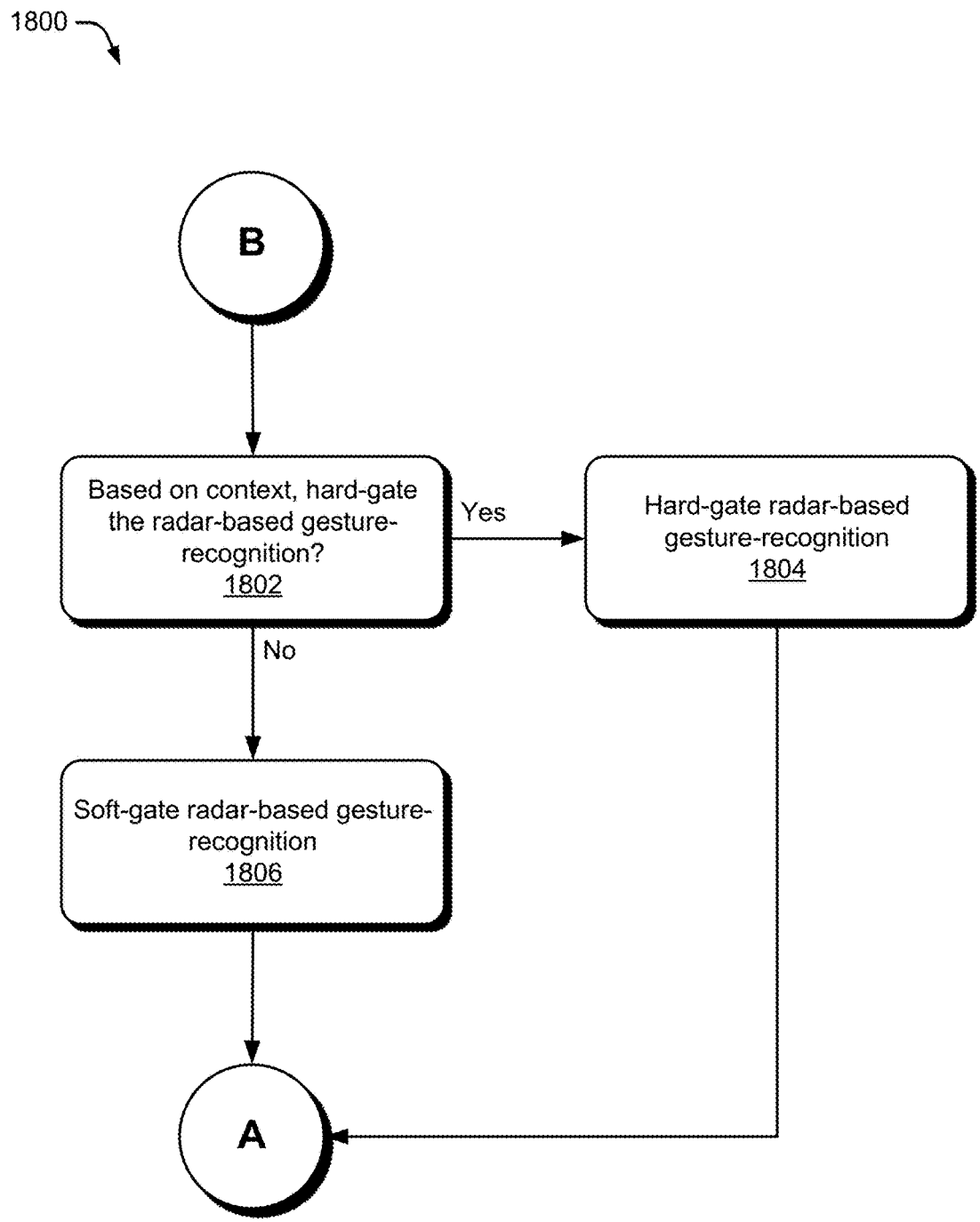
FIG. 18 illustrates an example method for radar-based gesture-recognition with context-sensitive gating and other context-sensitive controls.

FIG. 18 depicts an example method 1800 for radar-based gesture-recognition with context-sensitive gating and other context-sensitive controls. The method 1800 is shown as a set of blocks that specify operations performed but are not necessarily limited to the order or combinations shown for performing the operations by the respective blocks. Further, any one or more of the operations may be repeated, combined, reorganized, or linked to provide a wide array of additional and/or alternate methods, e.g., methods 1000, 1200, 1400, and 1700. In portions of the following discussion, reference may be made to the example operating environment 100 of FIG. 1 or to entities or processes as detailed in other figures, reference to which is made for example only. The techniques are not limited to performance by one entity or multiple entities operating on one device.

There are two common scenarios for performing the operations 1802, 1804, and 1806 to employ gating of a radar-based detection system. One scenario is when the radar system 104 is covered or occluded by an object. The radar system 104 may be occluded or covered when the UE 102 is lying face down on a surface, or is in a pocket, a purse, a bag, or other enclosure. The other scenario is when the UE 102 is experiencing significant motion. For example, if the user 120 carrying the UE 102 in their hand goes for a run, the UE 102 should not incorrectly interpret touch-independent gestures with the radar system 104.

At 1802, whether to hard-gate radar-based gesture-recognition by the radar system 104 is determined. A context is determined, indicating whether the radar system is occluded (e.g., from a user) by an object. The UE 102 selects from multiple levels of gating based on the context, including hard-gating and soft-gating, and then gates the gesture-recognition model 621 accordingly.

As used herein, the term "soft-gating" references an operation that blocks indications of radar-based gestures, from being output by the radar system 104 and to subscribers. Unlike hard-gating where the radar system 104 operates in a low-power mode or intermediate-power mode, soft-gating occurs without regard to power levels of the radar system 104. Soft-gating can occur by disabling the output from the gesture-recognition model 621, and in other cases, soft-gating happens from disabling the input to the gesture-recognition model 621. The gesture-recognition model 621 may continue to recognize radar-based gestures during soft-gating. However, during soft-gating, the radar system 104 does not share the recognized gestures with subscribers (e.g., applications, threads, activities, user interface objects). The subscribers do not receive indications of recognized gestures for their use in performing higher-level functions.

During soft-gating, the gesture-recognition model 621 can be shielded from radar data collected by the radar system 104, and in other times during soft-gating, a radar-based gesture determination is made by the gesture-recognition model 621 anyway but used internally by the radar system 104, for some other purpose, e.g., a system service or hidden function. During soft-gating, the UE 102 may still perform lower-level support functions based on indications of gestures recognized by the gesture-recognition model 621, however, the support functions may be transparent to subscribers and users of the UE 102. Support functions include learning, understanding, and acting upon gestures, even during a gating-context, to minimize potential latency from soft-gating the gesture-recognition model 621 in the future.

Contrast soft-gating with the term "hard-gating" which, as used herein, refers to an operation that triggers the radar system 104 to function in a state during which the radar system 104 does not recognize gestures from radar data. The gesture-recognition model 621 is disabled during hard-gating. During hard-gating, the radar system 104 can be used for other tasks besides gesture-recognition. Depending on whether the UE 102 needs the radar system 104 for any other capability, other parts of the radar system 104 may or may not be disabled during a hard-gating context as well. Thus, while the radar system 104 may continue to perform other functions unrelated to radar-based gesture-recognition, such as obstacle avoidance, the gesture-recognition model 621 of the radar system 104 does not output indications of recognized gestures when being hard-gated, thereby offering some power consumption savings over soft-gating or not at all gating the radar system 104. In addition to providing savings in power consumption, hard-gating is particularly useful for improving a user-experience by preventing subscribers of the radar system 104 from performing higher-level functions in response to false or unintended input.

The UE 102 may have improved latency recovering from an inactive gesture-recognition state if the UE 102 is soft-gating the radar system 104. With hard-gating, increased latency in recovering from an inactive gesture-recognition state (e.g., where the gesture-recognition feature of the radar system 104 may be powered-off) is offset by power saved from not executing complex gesture-recognition functions or disrupting high-level functions from false inputs. That is, while hard-gating the radar system 104 prevents unnecessary power consumption interpreting gestures from radar data during contexts when the UE 102 is unlikely to receive input from a user, the UE 102 may be slower than if the radar system 104 were soft-gated to transition back to a normal operating mode when gating is no longer necessary.

At 1804, the UE 102 performs hard-gating by setting the radar system 104 to an intermediate-power or low-power mode for outputting no data or other data that is unusable by the gesture-recognition model 621 for determining the touch-independent gesture. When the radar system 104 is occluded, an output from the radar system 104 is hard-gated at 1804 by disabling the gesture-recognition model 621.

At 1802, e.g., when the radar system 104 is not occluded, the output from the radar system is soft-gated at 1806. The UE 102 soft-gates the radar system 104 by refraining from inputting the radar data obtained by the radar system 104 to the gesture-recognition model 621. Alternatively, the UE 102 soft-gates the radar system 104 by preventing the gesture-recognition model 621 from outputting indications of recognized gestures.

The radar system 104 can transition between no-gating, soft-gating, and hard-gating depending on the context, during subsequent execution of the operations 1700 and 1800. For example, after soft-gating or hard-gating the radar system 104, the method of FIG. 18 returns to "A" and the start of operations 1700 of FIG. 17. If after soft-gating the radar system, at 1706, 1802 it is determined that the context indicates the radar system 104 is occluded by proximity to the object, the radar system 104 is hard-gated.

Gating Sensitivity

Figure 19:
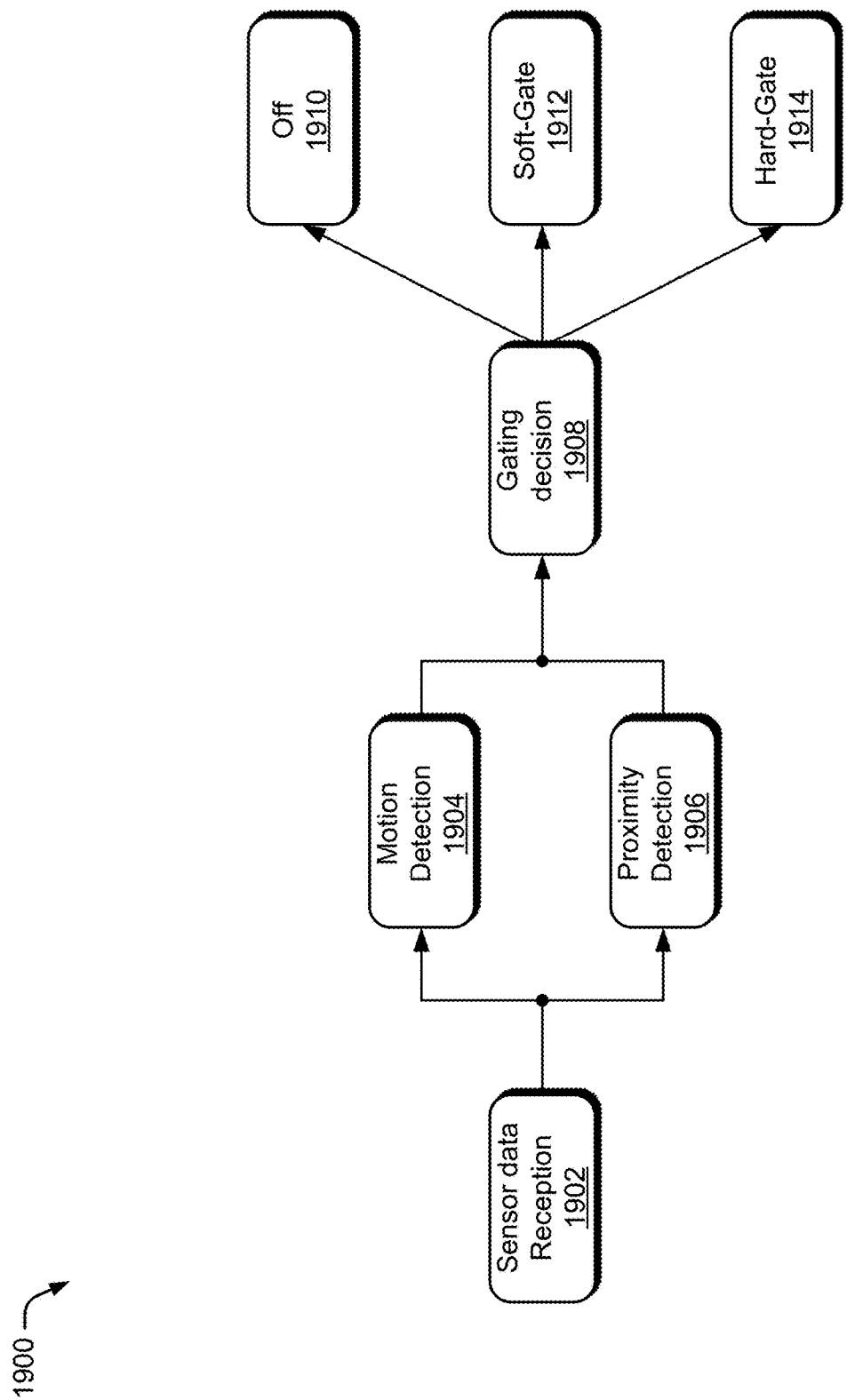
FIG. 19 illustrates a decision tree that implements the methods of the FIGS. 17 and 18.

FIG. 19 illustrates a decision tree that implements the methods of FIGS. 17 and 18. Portions of the scheme 1900 may be performed by the processor 608, the computer processors 402, or other hardware circuitry. The scheme 1900 can be customized to support different types of electronic devices and radar-based applications.

Sensor data reception 1902 occurs as the UE 102 performs the operation 1702. From the operation 1702, the UE 102 uses the sensor data to execute motion detection 1904 and proximity-detection algorithms on the sensor data to develop a context during operations 1704, including determining whether the radar system 104 is occluded, or increased rate of motion is determined.

The sensitivity of the motion detection 1904 and the proximity detection 1906 can be selected to balance motion-gating behavior while being able to reject device motion. Two common scenarios illustrate a need for sensitivity adjustments. A first scenario is if the user 120 is slowly walking with the UE 102 carried at the user's side and swinging past their body. Without persistent gating, the first scenario could cause significant false triggering. A second scenario is if the user 120 lifts the UE 102 to act. When lifting the UE 102 (from the side, from a table, from a pocket, etc.) to interact, the subsequent detection of natural body motions should invoke a rapid gating response from the UE 102. A lower gating sensitivity is needed for the response to be satisfyingly swift and not cause any delayed interference for the user. The gating decision 1908 is made during operation 1706, which leads to one of three gating modes: off 1910, soft-gate 1912, or hard-gate 1914. For further details about varying gating sensitivity, see the section "Movement Based Gating" and description of FIG. 21 below.

Gating State Machine

Figure 20:
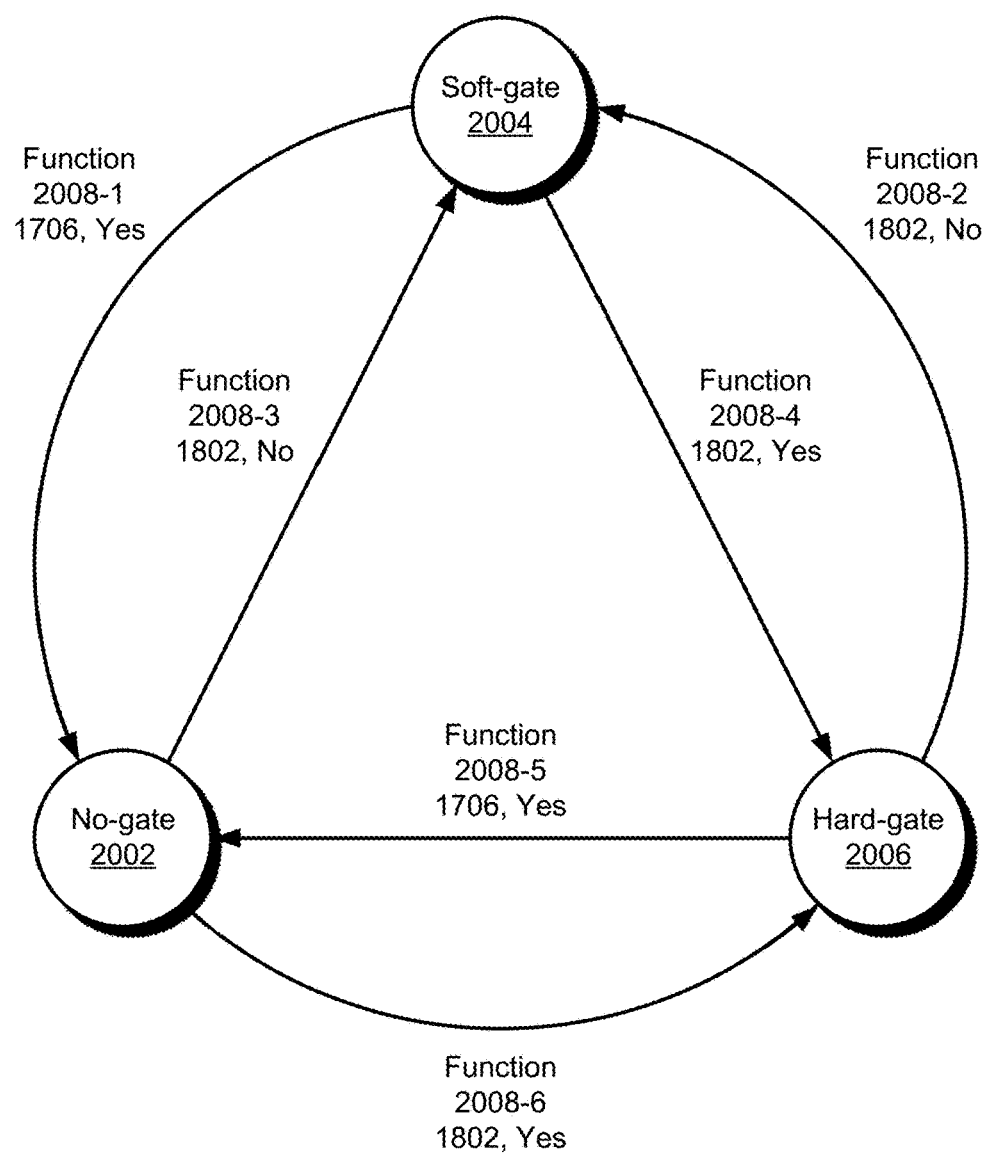
FIG. 20 illustrates a state diagram for a state machine that implements the methods of the FIGS. 17 and 18.

FIG. 20 illustrates a state diagram for a state machine 2000 that implements the methods of the FIGS. 17 and 18. The state machine 2000 is a gating state machine and may execute as part of the radar system 104.

The state machine 2000 includes multiple states 2002, 2004, and 2006, each linked by respective context-sensitive transition functions 2008-1 through 2008-6 (collectively "functions 2008"). Each of the functions 2008 receives at least a portion of the sensor data, or a derivation thereof, as variable inputs. For ease of description, the state machine 2000 includes only three states: 2002, 2004, and 2006. In other examples, more than three states are used by the state machine 2000. The state machine 2000 transitions between the states 2004, 2006, and based on the functions 2008.

The state machine 2000 includes a no-gating state 2002 in which radar-based gesture-recognition with the radar system 104 is enabled. A soft-gating state 2004 is where radar-based gesture-recognition with the radar system 104 is enabled but results of the radar-based gesture-recognition are withheld from applications and other subscribers executing at the UE 102. For a hard-gating state 2006, the radar-based gesture-recognition functionality of the radar system 104 is disabled, although other functions of the radar system 104 may remain enabled (e.g., the radar system 104 can execute a collision-avoidance function during hard-gating when gesture-recognition is disabled).

Each of the functions 2008 computes a respective contextual score indicating compatibility between a current context and each of the states 2002, 2004, and 2006. For example, the function 2008-3 computes a contextual score indicating whether, based on sensor data that defines a current context, the state machine 2000 should transition to the soft-gate state 2004. The function 2008-6 computes a contextual score indicating whether, based on the sensor data that defines the current context, the state machine 2000 should transition to the hard-gate state 2006. The state machine 2000 transitions from the no-gate state 2000 to either the soft-gate state 2004 or the hard-gate state 2006, based on which of the two states 2004 or 2006 has a contextual score that satisfies a transition threshold. If each of the functions 2008-3 and 2008-6 compute a contextual score that satisfies a transition threshold to transition the state machine 2000 to a next state, the state machine 2000 may transition to the next state with the highest contextual score.

When in the no-gating state 2002, the state machine 2000 of the radar system 104 receives sensor data from the sensors 108. The functions 2008-3 and 2008-6 take the sensor data as inputs and compute contextual scores indicating whether the sensor data satisfies the requirements for entering the soft-gating state 2004 or the hard-gating state 2006, respectively. The function 2008-3 corresponds to a "No" outcome from the operation 1802 of FIG. 18. The function 2008-6 corresponds to a "Yes" outcome from the operation 1802 of FIG. 18. If neither contextual score out of the functions 2008-3 and 2008-6 satisfies a respective transition threshold, the state machine 2000 remains in the no-gating state 2002.

In a context where the sensor data indicates the user 120 is holding the UE 102 and viewing the UE 102, the state machine 2000 keeps the radar system 104 in a gesture-recognition mode operating in the no-gating state 2002. If the user 120 looks away from the UE 102 to talk to another person without dropping the UE 102 or maintaining the UE 102 substantially steady, the function 2008-3 may compute a contextual score that exceeds a respective transition threshold for transitioning to the soft-gating state 2004. The UE 102 may want to remain ready to resume detecting radar-based user inputs, so in a situation such as this where the user temporarily disengages from the UE 102, the UE 102 can quickly return to the no-gating state 2002 if the user 120 looks back to the UE 102; soft-gating thereby enhances the user experience with the UE 102. The state machine 2000 transitions to the soft-gating state 2004 and continues to enable radar-based gesture recognition with the radar system 104, however the state machine 2000 prevents the radar system 104 from outputting results of the gesture-recognitions to applications executing at the UE 102.

Starting from the no-gating state 2002 again, in a slightly different context where the sensor data indicates the user 120 looking away from the UE 102 to talk to another person while also dropping the UE 102 to the user's 120 side, or otherwise not maintaining the UE 102 substantially steady. The function 2008-6 may compute a contextual score that exceeds a respective transition threshold for transitioning to the hard-gating state 2006. The radar system 104 can continue to perform other radar operations for the UE 102, however the radar-based gesture-recognition function of the radar system 104 is disabled in the hard-gating state. Hard-gating thereby promotes power savings, placing the radar state 104 in a state where gesture-recognition is disabled, when gesture-recognition is not likely to be needed.

After transitioning to the soft-gating state 2004, updated sensor data is received from the sensors 108 and the radar system 104. The state machine 2000 computes a respective contextual score using the functions 2008-1 and 2008-4. The function 2008-1 corresponds to a "Yes" outcome from the operation 1706 of FIG. 17. The function 2008-4 corresponds to a "Yes" outcome from the operation 1802 of FIG. 18. If the contextual score of the function 2008-1 exceeds a transition threshold for transitioning to the no-gating state 2002, the state machine 2000 transitions to the no-gating state 2002. If the contextual score of the function 2008-4 exceeds a transition threshold for transitioning to the hard-gating state 2006, the state machine 2000 transitions to the hard-gating state 2006. If both contextual scores of the functions 2008-1 and 2008-1 exceed their respective transition thresholds, the state machine 2000 may transition to the state 2002 or 2006, which is associated with a higher-contextual score than the contextual score of the other function. Assume the contextual score of the function 2008-4 exceeds the contextual score of the function 2008-1 and the transition threshold associated with transitioning from the soft-gating state 2004 to the hard-gating state 2006.

After transitioning to the hard-gating state 2006, updated sensor data is received from the sensors 108 and the radar system 104. The state machine 2000 computes a respective contextual score using the functions 2008-2 and 2008-5. The function 2008-2 corresponds to a "No" outcome from the operation 1802 of FIG. 18. The function 2008-5 corresponds to a "Yes" outcome from the operation 1706 of FIG. 17. If the contextual score of the function 2008-5 exceeds a transition threshold for transitioning to the no-gating state 2002, the state machine 2000 transitions to the no-gating state 2002. If the contextual score of the function 2008-2 exceeds a transition threshold for transitioning to the soft-gating state 2004, the state machine 2000 transitions to the soft-gating state 2004. If both contextual scores of the functions 2008-2 and 2008-5 exceed their respective transition thresholds, the state machine 2000 may transition to the state 2002 or 2004 which is associated with a higher-contextual score than the contextual score of the other function.

The state machine 2000 can be machine-learned or driven based on inferences made by a machine-learned model. The machine-learned model is trained to predict a suitable gating state for the radar system 104, based on sensor data or other input that defines a current context. For example, the functions 2008 can be machine-learned rules or applications or the machine-learned model to a current context to compute a contextual score. Said differently, each of the functions 2008 can be a machine-learned model, or instance of a machine-learned model, trained to predict the next radar state or a contextual score equating the current context to a next radar state.

Other Context-Sensitive Controls

As described above in great detail, the radar system 104 relies on context of the UE 102 and an awareness of the user's 120 location and position to gate the radar system 104 or not gate the radar system 104. These same techniques that apply to context-sensitive gating can apply to other context-sensitive controls that rely on the radar system 104 and radar functionality.

The UE 102 can also use the radar system 104 and other of the sensors 108 to predict the user's 120 intent to engage. The context of the UE 102 can be relative to the user 120, indicating the distance from the UE 102 to the user 120, indicating whether the user 120 is moving toward or away from the UE 102, indicating whether the user 120 is reaching for the UE 102, and the posture or orientation of the user 120 related to the UE 102.

The radar system 104 reconfigures how gesture-recognition, proximity detection, and other radar functions are performed, to adapt each radar function to best suit a current context. For example, the distances and sensitivities programmed into the functions 2008 for transitioning between the different states 2002, 2004, and 2006 of the state machine 2000 when the user 120 and the UE 102 are in a medium-sized room may not be appropriate in some contexts. If the user 120 and UE 102 are in a smaller room, an automobile, or even in the medium-sized room with a different quantity of people than originally predicted, the functions 2008 for transitioning between the different states 2002, 2004, and 2006 change or adapt to fit the new context. Said differently, the state machine 2000 can include transition functions, such as the functions 2008, which dynamically change criteria based on changes in context. The results of the functions 2008 may likewise change accordingly. Based on input from an available signal, sensor, or other data, the state machine 2000 can adjust parameters to the functions 2008 and thereby adjust the functionality of the UE 102. As mentioned above, the functions 2008 may be machine-learned models or portions of a machine-learned model, trained to predict a confidence or score that a particular state is suited for a current context. The following are some non-limiting examples of how the radar system 104 dynamically adapts radar functions to best suit a current context.

The state machine 2000 can pause (e.g., soft-gate, hard-gate) the radar system 104 (or put the radar system 104 in a sleep mode) based on inertial data generated by an IMU of the sensors 108. Inertial data indicating the UE 102 is moving in a way that may reduce the accuracy or efficiency of the radar system's 104 ability to perform other radar functions, not only radar-based gesture-recognition. The inertial data from the IMU can include X, Y, and Z-axis movement information. The state machine 2000 combines the three movements into a floating-point value that the state machine 2000 inputs into the functions 20008 for transitioning between the states 2002, 2004, and 2006.

The state machine 2000 controls the radar system 104 (or put the radar system 104 in a sleep mode) based on other non-IMU sensor data generated by the sensors 108 as-well, or any other useful information generated by any other data source. For example, the UE 102 may include a calendar application, a clock application, location services, proximity services, communication services, financial services, or any other contextual data source. A subscriber application executing at the UE 102 may provide the radar system 104 with contextual information just as the subscriber application may receive indications of gesture-inputs recognized by the radar system 104.

All of these potential sources of information can feed the state machine 2000 and the functions 2008 to determine whether the radar system 104 should be paused or gated. Additionally, the system can know what applications are running, which can further refine the contextual awareness of the UE 102 and help the UE 102 make a decision regarding the pause mode.

Contextual awareness by the radar system 104 further enables the UE 102 to change a number of available radar states or modes, depending on context. For example, in an automobile context, the radar system 104 need only be in a no-gating or soft-gating mode, because maximum responsiveness without regard to power consumption is a desirable characteristic of the UE 102 when in an automobile mode (if on the automobile's power). Only two states are necessary, for example, because the radar system 104 assumes the user 120 is only a few feet away (confined to the automobile) so hard-gating when the user is not present or to save power when not likely to be interacting with the UE 102 is not necessary.

The contextual awareness by the radar system 104 relies on dynamic functions 2008 or even machine-learned models to adjust the trigger parameters between gating states, and other radar modes of the radar system 104, such as the size of an awareness zone or a recognition zone, the sensitivity to changes in distance or speed of reaches or other gestures, etc. Other functionality of the radar system 104 can be context-based. Consider a user alone in an automobile versus a user on a subway or in a crowded meeting room. The radar system 104 can determine radar-based gestures using different sensitivities, feedback, and features, because certain settings such as these may be more effective in different contexts.

Contextual awareness for controlling the radar system 104 can be useful in other ways. For example, in response to detecting the UE 102 in a stowed context, e.g., on a bicycle, the radar system 104 may automatically configure itself for crash avoidance radar mode and di sable gesture-recognition.

The radar system 104 may be more effective when stable. If the sensor data from the sensors 108 indicates the UE 102 is shaking or vibrating at too high a magnitude or frequency of shake or vibration, the radar system 104 automatically disables radar-based gesture-recognition and other radar functionality. This saves a lot of unnecessary computing and measurement cycles because when the UE 102 is not stable and shaking, the radar system 104 does not likely provide useful results.

A contextual information source to the UE 102 can be remote to the UE 102, for example, a sensor or input component of a computerized watch that is paired with the UE 102 can be a further source of sensor information that supplements the sensor data collected from the sensors 108. In this case, the radar system 104 may gate or otherwise control the radar functionality based on sensor data from a communicatively coupled watch. The sensor data could include heart-rate information. When the user's heart-rate exceeds a particular threshold for indicating exercise or intense physical movement, the radar system 104 may disable the radar-based gesture recognition or other feature of the radar system 104 as the user is not likely to be gesturing at the UE 102 when exercising.

An ambient light sensor from the sensors 108 captures sensor data indicating when the context of the UE 102 is in a low-lit area. In such a context, the radar system 104 operates under an assumption that the user 120 will have a hard time interacting with the UE 102 and therefore the radar system 104 makes its interface more forgiving to sloppy inputs.

A proximity sensor from the sensors 108, e.g., an optical proximity sensor, can trigger the radar system 104 to switch-off or enter a state during which gesture-recognition is disabled, when the radar system 104 is occluded. Wireless signals, power connections, network connections, and other connections to the UE 102 can provide additional contextual information for controlling the radar system 104. In response to detecting a charging cable, docking station, or wireless charging system powering the UE 102, the radar system 104 refrains from entering the hard-gating state 2006 as the UE 102 does not need to deal with power consumption when charging and the user 120 would more likely want a faster response rate from the radar system 104. In a related example, when connected to a wireless charging system, the radar system 104 may disable much of its capability to avoid interfering with wireless chargers. The radar system 104 may operate in an inactive mode to avoid interfering with communications and other signals transmitted or received by the UE 102.

The radar system 104 can be operatively coupled to one or more of the sensors 108 and trigger in response to interrupts or information received directly from the sensors 108. For example, a near-field-communication unit or NFC sensor can trigger the radar system 104 to enter a no-gating mode when the NFC is processing a payment or other authentication gesture.

The radar system 104 can switch-on or switch-off in coordination with other input components. For example, the user 120 may provide input to a touchscreen of the UE 102, and while detecting an input at the touchscreen, the radar system 104 may disable gesture-recognition. In other cases, the radar system 104 enhances the touchscreen functionality by remaining switched-on and sending information about recognized gestures to an input decoder that processes touchscreen data and radar data simultaneously to infer user intent. In this way, the radar system 104 and a touchscreen can recognize typing at soft-keyboard or other input to a GUI, even if the user 120 wears gloves while providing touch input, which can interfere with some presence-sensitive screens.

The radar system 104 can control radar functions based on other contextual information, including temperature, humidity, pressure, etc. The radar system 104 may use certain settings to account for performance variations that can occur for variations in meteorological conditions. Using voice or sound information, the radar system 104 can control the radar functions, activating or deactivating features based on voice commands.

Movement-Based Gating

Figure 21:
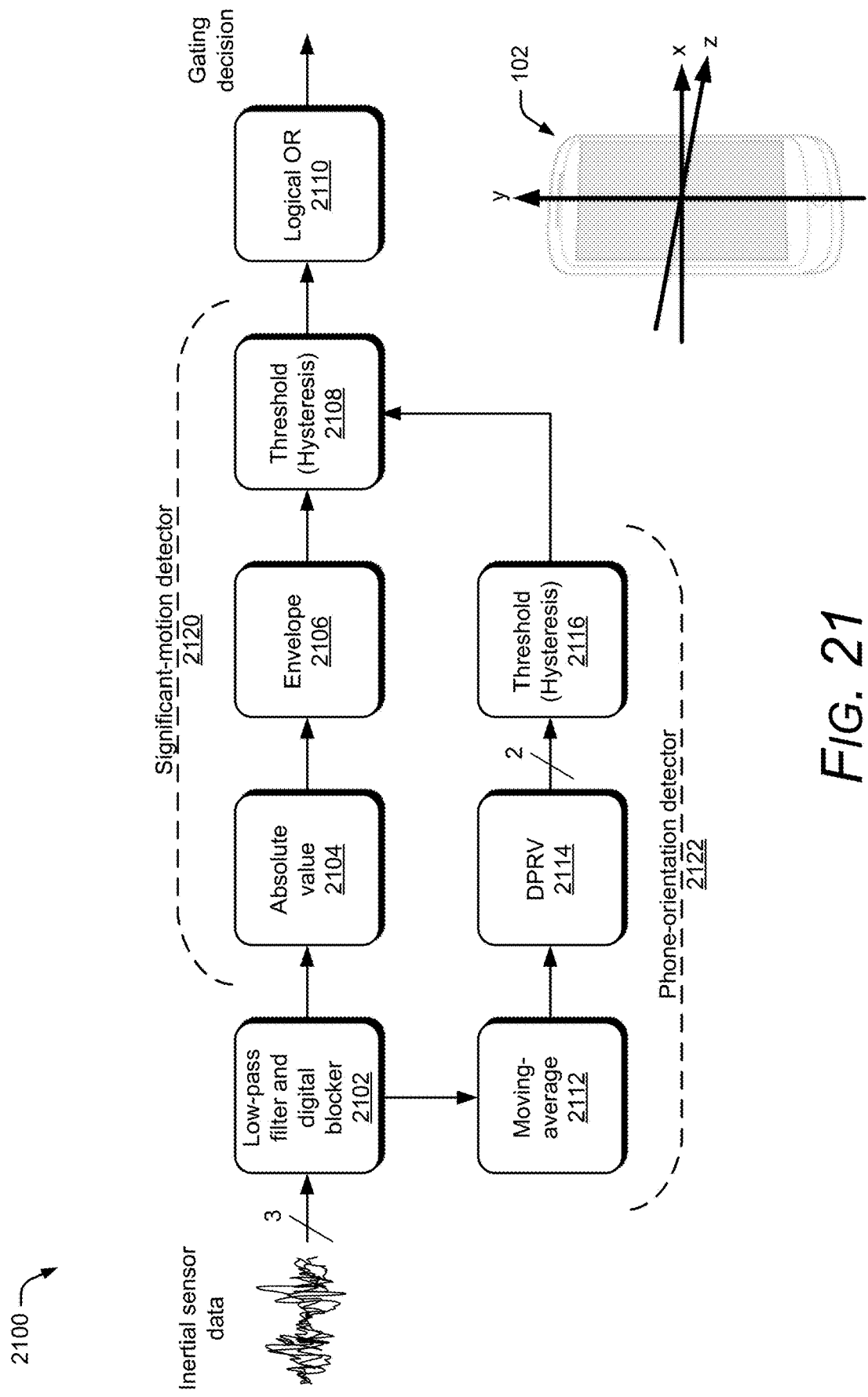
FIG. 21 illustrates a block diagram for implementing movement-based gating of radar-based gesture-recognition.

FIG. 21 illustrates a block diagram 2100 for implementing movement-based gating of radar-based gesture-recognition. Portions of the block diagram 2100 may be performed by the processor 608, the computer processors 402, or other hardware circuitry. The block diagram 2100 can be customized to support different types of electronic devices and radar-based applications.

The block diagram 2100 includes a low-pass filter (e.g., a fourth-order Butterworth filter) and digital blocker 2102. The inertial sensor data (e.g., from the IMU 408) is filtered for all three axes (e.g., X, Y, and Z). Filtering may occur at a different rate than the rate of output from the IMU 408. For example, the IMU 408 outputs accelerations at fifty hertz, yet the low-pass filter and digital blocker 2102 filters the accelerations at twelve hertz. The low-pass filter and digital blocker 2102 output acceleration measurements to a significant-motion detector 2120 and a phone-orientation detector 2122.

The significant-motion detector 2120 determines an absolute value for the inertial sensor data for each of the axes (e.g., X, Y, and Z) using an absolute value component 2104. An envelope component 2106 buffers the filtered and normalized acceleration measurements, for evaluation by an adjustable threshold component 2108 that detects significant motion relative to historically observed motion over time (hysteresis).

The phone-orientation detector 2122 determines the orientation of the UE 102. The sensitivity of the gating function applied to the radar system 104 varies according to changes in the orientation of the UE 102. The sensitivity of the gating function is also based an amount of movement of the UE 102 given the orientation.

A moving-average component 112 calculates average motion per each of the axes (e.g., X, Y, and Z). A "dot product with reference vector" (DPRV) component 2114 determines values from the average motions that are representative of orientation and movement of the UE 102. The orientation and movement values are received by an adjustable threshold component 2116. If the orientation and movement values received by the adjustable threshold component 2116 indicate a particular orientation or movement, the adjustable threshold component 2116 sets the adjustable threshold component 2108 to a high sensitivity or a low sensitivity. For example, if the phone-orientation detector 2122 determines that the UE 102 is likely in landscape or a portrait-down orientation, the threshold component 2108 may be set by the threshold component 2116 to a high sensitivity so the radar system 104 is gated more of often to prevent small movements or changes in orientation from being used in gesture-recognition. If the phone-orientation detector 2122 determines that the UE 102 is likely in a different orientation, the threshold component 2108 may be set by the threshold component 2116 to a lower-sensitivity so the radar system 104 is gated less often and to enable even small movements or changes in orientation to be used in gesture-recognition. In other words, the output from the adjustable threshold 2116 may act like a switch that directs the adjustable threshold of 2108 to have a high or low sensitivity depending on movement and orientation.

The output of the block diagram 2100 is a gating decision determined from a combination of the significant-motion detector 2120 and the phone-orientation detector 2122. A logical OR component 2110 outputs a particular value depending on whether to gate the radar system 104 or not. Depending on the gating decision from the logical OR component 2110, the radar system 104 may soft-gate or not gate an output.

The sensitivity of the significant-motion detector 2120 is tied to the phone-orientation detector 2122 to balance the motion-gating behavior of the radar system 104 while also being able to reject device motion. Slowly walking with the UE 102 carried at the user 120's side and swinging past their body can cause significant false triggering without adjusting gating sensitivity of the radar system 104 as described above. If the user 120 lifts the UE 102 to act (from the side, from a table, from a pocket, etc.) the subsequent detection of natural body motions should invoke a rapid gating response from the UE 102 and as such, a lower gating sensitivity is needed for the response from the radar system 104 to be satisfyingly swift and not cause any delayed annoyance for the user 120.

EXAMPLES

In the following paragraphs, examples are provided.

Example 1. A method comprising: receiving, from a plurality of sensors of a user equipment, sensor data; determining, based on the sensor data, a context of the user equipment; determining whether the context satisfies requirements for radar-based gesture-recognition; and responsive to determining that the context does not satisfy the requirements for radar-based gesture-recognition, gating the radar system to prevent the radar system from outputting indications of radar-based gestures to application subscribers of the user equipment.

Example 2. The method of example 1, wherein gating the radar system comprises hard-gating the radar system by triggering the radar system to function in a state during which the radar system does not recognize gestures from radar data.

Example 3. The method of example 2, wherein hard-gating the radar system is further responsive to determining that the context indicates that the radar system is occluded by an object.

Example 4. The method of example 1, wherein gating the radar system comprises soft-gating the radar system by triggering the radar system to function in a state during which the radar system does not output indications of the radar-based gestures.

Example 5. The method of example 4, wherein soft-gating the radar system is further responsive to determining that the context indicates that the radar system is not occluded by the object.

Example 6. The method of example 4, wherein soft-gating the radar system to prevent the radar system from outputting the indications of the radar-based gestures to the application subscribers of the user equipment does not prohibit the radar system from recognizing the radar-based gestures from radar data.

Example 7. The method of example 4, further comprising: after soft-gating the radar system, determining that the context indicates the radar system is occluded the object; and responsive to determining that the context indicates the radar system is occluded by the object, hard-gating the radar system by triggering the radar system to function in a state during which the radar system does not recognize gestures from radar data.

Example 8. The method of example 1, wherein the context is a first context and the sensor data is first sensor data, the method further comprising: receiving, from the plurality of sensors, second sensor data; determining, based on the second sensor data, a second context of the user equipment; determining whether the second context satisfies the requirements for radar-based gesture-recognition; responsive to determining that the second context satisfies the requirements for radar-based gesture-recognition, inputting radar data obtained by the radar system to a model that determines radar-based gestures from the inputted radar data; and performing an operation in response to the model determining a radar-based gesture, the operation associated with the determined radar-based gesture.

Example 9. The method of example 8, wherein inputting the radar data obtained by the radar system to the model for radar-based gesture-recognition comprises refraining from gating the radar system and setting the radar system to an active state for radar-based gesture-recognition.

Example 10. The method of any of examples 1 through 9, wherein the radar system is configured as a proximity sensor for generating at least a portion of the sensor data.

Example 11. The method of any of examples 1 through 10, wherein determining whether the context satisfies the requirements for radar-based gesture-recognition with the radar system comprises determining whether the context indicates a user is holding the user equipment or whether the context indicates the user is walking.

Example 12. The method of example 11, further comprising: determining the context does not satisfy the requirements for radar-based gesture-recognition in response to determining the user is not holding the user equipment and the user is walking; or in response to determining the radar system is occluded by an object.

Example 13. The method of example 11, further comprising: determining, based on whether the sensor data indicates a particular movement, whether the user is holding the user equipment, how the user is holding the user equipment, or whether the user is walking.

Example 14. The method of any of examples 1 through 13, further comprising: determining an identity of an application-subscriber of the radar-based gesture-recognition; selecting, based on the identity of the subscriber, a gating-sensitivity for determining whether the context satisfies the requirements for radar-based gesture-recognition, wherein determining whether the context satisfies the requirements for radar-based gesture-recognition with the radar system is based on the gating-sensitivity associated with the identity of the subscriber.

Example 15. The method of example 14, wherein the gating-sensitivity is specific to a type of radar-based gesture preselected by one of the application subscribers.

Example 16. The method of any of examples 1 through 15, further comprising: changing a state of the user equipment in response to the model determining a radar-based gesture, the state of the user equipment including an access-state, a power state, or an information state.

Example 17. The method of any of examples 1 through 16, wherein determining whether the context satisfies requirements for radar-based gesture-recognition comprises executing a state machine comprising multiple states linked by respective context-sensitive transition functions that receive at least a portion of the sensor data as variable inputs.

Example 18. The method of example 17, wherein the state machine comprises a no-gating state in which radar-based gesture-recognition with the radar system is enabled, a soft-gating state in which the radar-based gesture-recognition with the radar system is enabled but results of the radar-based gesture-recognition are withheld from applications and other subscribers executing at the user equipment, and a hard-gating state in which the radar-based gesture-recognition is disabled.

Example 19. The method of any of examples 1 through 18, wherein the plurality of sensors comprise an inertial measurement unit.

Example 20. The method of any of examples 1 through 19, wherein the plurality of sensors exclude camera sensors.

Example 21. The method of any of examples 1 through 20, wherein the plurality of sensors include a proximity sensor, an ambient light sensor, a microphone, or a barometer.

Example 22. The method of example 21, wherein the proximity sensor is an optical proximity sensor.

Example 23. An apparatus comprising: a radar system that detects radar-based gestures on behalf of application subscribers; an inertial measurement unit that receives inertial sensor data; and a state machine that transitions between multiple states for controlling the radar system based on the inertial sensor data and context-sensitive transition functions, the state machine including: a no-gating state in which the state machine enables the radar system to output indications of the radar-based gestures to the application subscribers; a soft-gating state in which the state machine prevents the radar system from outputting the indications of the radar-based gestures to the application subscribers; and a hard-gating state in which the state machine prevents the radar system from detecting the radar-based gestures.

Example 24. The apparatus of example 23, wherein at least one of the context-sensitive transition functions receives at least a portion of the inertial sensor data as variable input.

Example 25. The apparatus of example 23 or 24, wherein the state machine enables the radar system to detect the radar-based gestures while prevented from outputting the indications of the radar-based gestures to the application subscribers.

Example 26. The apparatus of any of examples 23-25, wherein: a first function from the context-sensitive transition functions outputs a first contextual score indicating whether, based on the inertial sensor data, to transition from the no-gating state to the soft-gating state; and the state machine transitions from the no-gating state to the soft-gating state in response to determining that the first contextual score satisfies a first threshold.

Example 27. The apparatus of example 26, wherein: a second function from the context-sensitive transition functions outputs a second contextual score indicating whether, based on the inertial sensor data, to transition from the no-gating state to the hard-gating state; and the state machine transitions from the no-gating state to the hard-gating state in response to determining that the second contextual score satisfies a second threshold.

Example 28. The apparatus of example 27, wherein the state machine transitions from the no-gating state to the hard-gating state in response to determining that the second contextual score satisfies the second threshold and the second contextual score exceeds the first contextual score.

Example 29. The apparatus of example 28, wherein the state machine transitions from the no-gating state to the soft-gating state in response to determining that the first contextual score satisfies the first threshold and the first contextual score exceeds the second contextual score.

Example 30. The apparatus of any of the examples 23-29, wherein the apparatus consumes a different amount of electrical power when the state machine operates in the soft-gating state than when the state machine operates in the hard-gating state.

Example 31. The apparatus of any of the examples 23-30, wherein the apparatus consumes more electrical power from the detecting the radar-based gestures when the state machine operates in the soft-gating state than when the state machine operates in the hard-gating state.

Example 32. The apparatus of any of the examples 23-31, wherein at least one of the context-sensitive transition functions outputs a contextual score based on a comparison between a position, orientation, or movement inferred from the inertial sensor data and a position, orientation, or movement threshold.

Example 33. The apparatus of any of the examples 23-32, wherein a first function from the context-sensitive transition functions outputs a contextual score based on whether the radar system is occluded by an object.

Example 34. The apparatus of example 33, wherein the state machine transitions from the no-gating state to the soft-gating state in response to the contextual score indicating that the apparatus is not occluded by the object.

Example 35. The apparatus of any of the examples 33 or 34, wherein the state machine transitions from the no-gating state to the hard-gating state in response to the contextual score indicating that the apparatus is occluded by the object.

Example 36. The apparatus of any of the claims 23-35, wherein at least one of the context-sensitive transition functions receives at least a portion of the inertial sensor data as variable input after filtering the inertial sensor data through a low-pass filter.

Example 37. The apparatus of any of the claims 23-36, wherein at least one of the context-sensitive transition functions receives an indication of an orientation of the apparatus as variable input and the state machine transitions between multiple states for controlling the radar system based on the inertial sensor data, the context-sensitive transition functions, and the orientation.

Example 38. The apparatus of any of the claims 23-37, wherein at least one of the context-sensitive transition functions receives an indication of proximity from the apparatus to an object as variable input and the state machine transitions between multiple states for controlling the radar system based on the inertial sensor data, the context-sensitive transition functions, and the proximity.

Example 39. A user equipment comprising the apparatus of any one of the examples 23 through 38 and a processor configured to execute the state machine.

Example 40. A system comprising means to execute the state machine of the apparatus of any of the examples 23 through 38.

CONCLUSION

Although implementations of techniques for, and apparatuses enabling, radar-based gesture-recognition with context-sensitive gating and other context-sensitive controls have been described in language specific to features and/or methods, it is to be understood that the subject of the appended claims is not necessarily limited to the specific features or methods described. Rather, the specific features and methods are disclosed as example implementations enabling radar-based gesture-recognition with context-sensitive gating and other context-sensitive controls.

What is claimed is:

1. An apparatus comprising:
   a radar system that detects radar-based gestures on behalf of application subscribers;
   an inertial measurement unit that produces inertial data; and
   a state machine configured to transition between multiple states for controlling the radar system based on the inertial data and one or more context-sensitive transition functions, the multiple states including:
   a no-gating state in which the state machine enables the radar system to output indications of the radar-based gestures to the application subscribers;
   a soft-gating state in which the state machine prevents the radar system from outputting the indications of the radar-based gestures to one or more of the application subscribers by shielding a gesture-recognition model from radar data collected by the radar system or by shielding one or more of the application subscribers from the output of the gesture-recognition model; and
   a hard-gating state in which the state machine prevents the radar system from detecting the radar-based gestures by disabling the gesture-recognition model.

2. The apparatus of claim 1, further comprising:
   a low-pass filter,
   wherein the inertial sensor data is filtered through the low-pass filter.

3. The apparatus of claim 1, wherein:
   the inertial data comprises an orientation of the device; and
   the state machine is further configured to transition between the multiple states based on the orientation of the device.

4. The apparatus of claim 1, further comprising:
   a proximity sensor that detects a proximity of an object to the apparatus,
   the state machine is further configured to transition between the multiple states based on the proximity of the object.

5. The apparatus of claim 1, wherein the state machine is further configured to:
   enter the no-gating state; and
   transition to the soft-gating state responsive to a first context-sensitive transition function of the context-sensitive transition functions producing a first contextual score that meets a first threshold.

6. The apparatus of claim 1, wherein the state machine is further configured to:
   enter the no-gating state; and
   transition to the hard-gating state responsive to a second context-sensitive transition function of the context-sensitive transition functions producing a second contextual score that meets a second threshold.

7. The apparatus of claim 1, wherein the state machine is further configured to:
   enter the no-gating state; and
   transition to the soft-gating state responsive to a first context-sensitive transition function of the context-sensitive transition functions producing a first contextual score that meets a first threshold and a second context-sensitive transition function of the context-sensitive transition functions producing a second contextual score that meets a second threshold, wherein the first contextual score is higher than the second contextual score.

8. The apparatus of claim 1, wherein the state machine is further configured to:
enter the no-gating state; and
transition to the soft-gating state responsive to a first context-sensitive transition function of the context-sensitive transition functions producing a first contextual score that meets a first threshold and a second context-sensitive transition function of the context-sensitive transition functions producing a second contextual score that meets a second threshold, wherein the first contextual score is lower than the second contextual score.

9. The apparatus of claim 1, wherein the soft-gating state causes the apparatus to consume more power than the hard-gating state.

10. The apparatus of claim 1, wherein:
at least one of the context-sensitive transition functions outputs a contextual score based on a comparison between a position, orientation, or movement inferred from the inertial data and a position, orientation, or movement threshold; and
the state machine is further configured to transition between the multiple states based on the contextual score.

11. The apparatus of claim 1, wherein:
one of the context-sensitive transition functions outputs a contextual score based on whether the radar system is occluded by an object; and
the state machine is further configured to transition between the multiple states based on the contextual score.

12. The apparatus of claim 11, wherein the state machine is further configured to:
enter the no-gating state; and
transition to the soft-gating state in response to the contextual score indicating that the apparatus is not occluded by the object.

13. The apparatus of claim 11, wherein the state machine is further configured to:
enter the no-gating state; and
transition to the hard-gating state in response to the contextual score indicating that the apparatus is occluded by the object.

14. A method of controlling a radar system of a device, the method performed by the device and comprising:
receiving inertial data from an inertial measurement unit of the device; and
configuring, based on the inertial data and via at least one or more context-sensitive transition functions, the device to one of multiple radar system gating states, the radar system detecting radar-based gestures on behalf of application subscribers, the application subscribers configured to receive an output from a gesture-recognition model, the multiple states including:
a no-gating radar system gating state in which the radar system is enabled to output indications of the radar-based gestures to the application subscribers;
a soft-gating radar system gating state in which the radar system is prevented from outputting the indications of the radar-based gestures to one or more of the application subscribers by shielding the gesture-recognition model from radar data collected by the radar system or by shielding one or more of the application subscribers from the output of the gesture-recognition model; and
a hard-gating radar system gating state in which the radar system is prevented from detecting the radar-based gestures by disabling the gesture-recognition model.

15. The method of claim 14, wherein;
the inertial data indicates an orientation of the device; and
the configuring is further based on the orientation of the device.

16. The method of claim 14, further comprising:
receiving an indication of proximity from the apparatus to an object,
wherein the configuring is further based on the proximity from the apparatus to the object.

17. The method of claim 14, wherein the configuring comprises:
configuring the device to the no-gating radar system gating state; and
configuring the device to the soft-gating radar system gating state responsive to a first context-sensitive transition function of the context-sensitive transition functions producing a first contextual score that meets a first threshold.

18. The method of claim 14, wherein the configuring comprises:
configuring the device to the no-gating radar system gating state; and
configuring the device to the hard-gating radar system gating state responsive to a second context-sensitive transition function of the context-sensitive transition functions producing a second contextual score that meets a second threshold.

19. The method of claim 14, wherein the configuring comprises:
configuring the device to the no-gating radar system gating state; and
configuring the device to the soft-gating radar system gating state responsive to a first context-sensitive transition function of the context-sensitive transition functions producing a first contextual score that meets a first threshold and a second context-sensitive transition function of the context-sensitive transition functions producing a second contextual score that meets a second threshold, wherein the first contextual score is greater than the second contextual score.

20. The method of claim 14, wherein the configuring comprises:
configuring the device to the no-gating radar system gating state; and
configuring the device to the hard-gating radar system gating state responsive to a first context-sensitive transition function of the context-sensitive transition functions producing a first contextual score that meets a first threshold and a second context-sensitive transition function of the context-sensitive transition functions producing a second contextual score that meets a second threshold, wherein the first contextual score is less than the second contextual score.

21. The apparatus of claim 1, wherein the hard-gating state in which the state machine prevents the radar system from detecting the radar-based gestures disables the gesture-recognition model by operating in a low-power mode or an intermediate-power mode, the low-power mode or the intermediate-power mode effective to disable the gesture recognition module.

22. The method of claim 14, wherein the configuring the device to the hard-gating radar system gating state in which the radar system is prevented from detecting the radar-based gesture disables the gesture-recognition model by causing the radar system to operate in a low-power mode or an intermediate-power mode, the low-power mode or the intermediate-power mode effective to disable the gesture recognition module.

* * * * *